(12) United States Patent
Hayashi et al.

(10) Patent No.: US 12,719,325 B2
(45) Date of Patent: Aug. 25, 2026

(54) COIL ASSEMBLY, ARMATURE AND ROTATING ELECTRIC MACHINE

(71) Applicant: DENSO CORPORATION, Kariya-city (JP)

(72) Inventors: Yuji Hayashi, Kariya-city (JP); Toshio Yamamoto, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 304 days.

(21) Appl. No.: 18/638,252

(22) Filed: Apr. 17, 2024

(65) Prior Publication Data

US 2024/0266895 A1 Aug. 8, 2024

Related U.S. Application Data

(63) Continuation of application No. PCT/JP2022/029544, filed on Aug. 1, 2022.

(30) Foreign Application Priority Data

Oct. 18, 2021 (JP) ................................ 2021-170429

(51) Int. Cl.
*H02K 3/28* (2006.01)
*H02K 11/21* (2016.01)
*H02K 21/14* (2006.01)

(52) U.S. Cl.
CPC ............... *H02K 3/28* (2013.01); *H02K 11/21* (2016.01); *H02K 21/14* (2013.01)

(58) Field of Classification Search
CPC .......... H02K 11/21; H02K 21/14; H02K 3/04; H02K 3/28
USPC .......................................................... 310/208
See application file for complete search history.

(56) References Cited

U.S. PATENT DOCUMENTS 7,391,138 B2 * 6/2008 Seguchi .................. H02K 3/28 310/201
8,148,870 B2 * 4/2012 Iki ......................... H02K 21/24 310/254.1
9,735,641 B2 * 8/2017 Sakaue ................... H02K 3/04
9,866,083 B2 * 1/2018 Tamura ................... H02K 3/28
(Continued)

FOREIGN PATENT DOCUMENTS

JP 2008-099429 A 4/2008
JP WO2013/187501 A1 2/2016
(Continued)

*Primary Examiner* — Alex W Mok
(74) *Attorney, Agent, or Firm* — Oliff PLC

(57) ABSTRACT

A coil assembly includes a band member and a plurality of coils. The band member is rolled along a circumferential direction into an annular shape and has a plurality of layers in a radial direction. The coils have vertical portions, and are located at predetermined positions in the circumferential direction and the radial direction on the band member and connected in a predetermined connection pattern. Moreover, the coil assembly further includes vertical-portion laminates constituted of the vertical portions of the coils which are radially laminated in a cross section of the band member and the coils taken along the radial direction. Each of the vertical-portion laminates is configured so that each radially-adjacent pair of the vertical portions constituting the vertical-portion laminate have different electric potentials when the coils are energized.

22 Claims, 52 Drawing Sheets

(56) References Cited

U.S. PATENT DOCUMENTS

| | | | | |
|---|---|---|---|---|
| 9,887,599 | B2 * | 2/2018 | Sakaue | H02K 1/16 |
| 10,153,674 | B2 * | 12/2018 | Tsuiki | H02K 3/28 |
| 10,355,547 | B2 * | 7/2019 | Hino | H02K 3/48 |
| 10,511,202 | B2 * | 12/2019 | Egashira | H02K 3/12 |
| 2020/0162003 | A1 | 5/2020 | Takahashi et al. | |
| 2020/0287452 | A1 | 9/2020 | Morita et al. | |
| 2020/0328639 | A1 | 10/2020 | Takahashi | |
| 2021/0234415 | A1 * | 7/2021 | Taniguchi | H02K 1/2791 |

FOREIGN PATENT DOCUMENTS

| | | | |
|---|---|---|---|
| JP | 2017-070140 | A | 4/2017 |
| JP | 2019-106865 | A | 6/2019 |
| JP | 2020-061907 | A | 4/2020 |

* cited by examiner

FIG.5

U PHASE

42U

44

NEUTRAL POINT

42V

42W

V PHASE

W PHASE

U13(16)
U12(16)
U11(16)
34B
34
34A
36
38
A1
B1
C1
A2
B2
C2
A3
B3
C3
A4
B4
C4
A5
B5
C5
A6
B6
C6
Z
C

Z
C
34
U11
U12
U13
U21
U22
U23
U31
U32
U33
U41
U42
U43
U51
U52
U53
A5
B5
C5
36
A2
B2
C2

R
C
32
46W
46V
46U
54B
54B
54B
R2
56
36
S2
S3
S1
R1
36
54A(34)
54A(34)
54A(34)
54A(34)

FIG.14
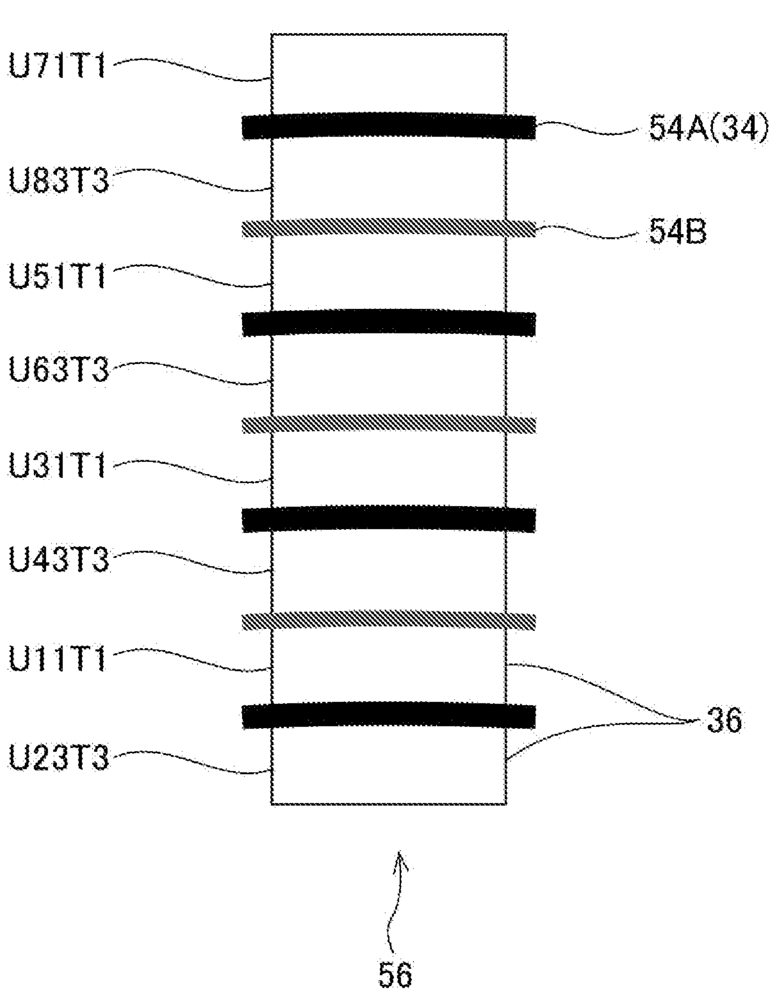
R
U71T1
54A(34)
U83T3
54B
U51T1
U63T3
U31T1
U43T3
U11T1
36
U23T3
56

FIG.15
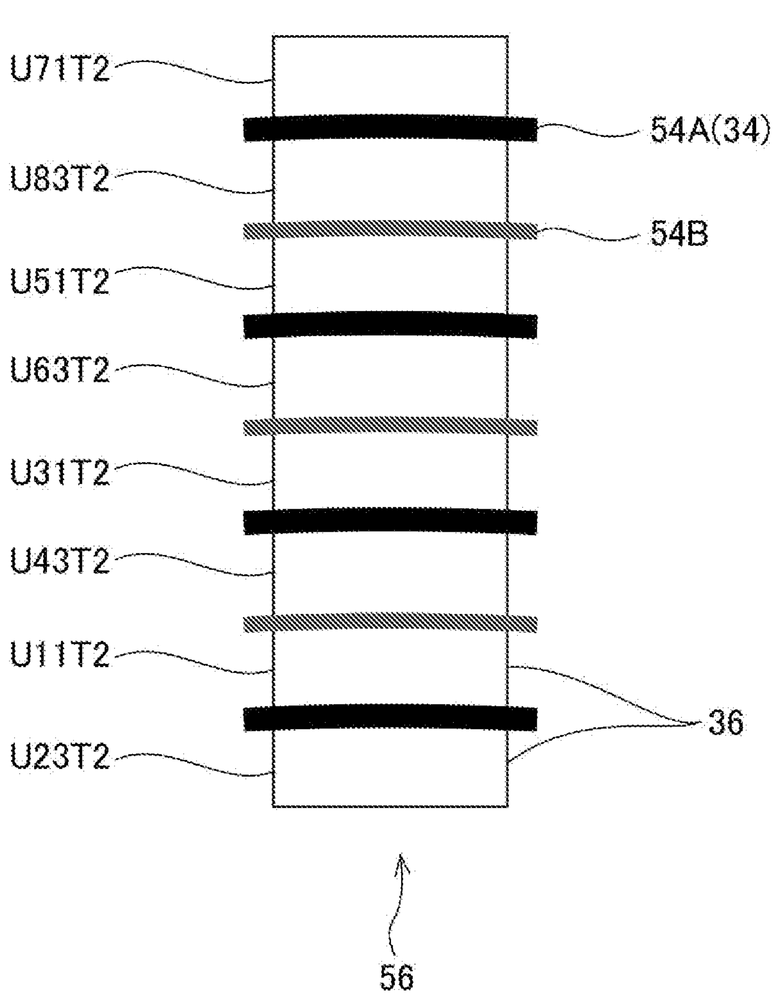
R
U71T2
54A(34)
U83T2
54B
U51T2
U63T2
U31T2
U43T2
U11T2
36
U23T2
56

FIG.16
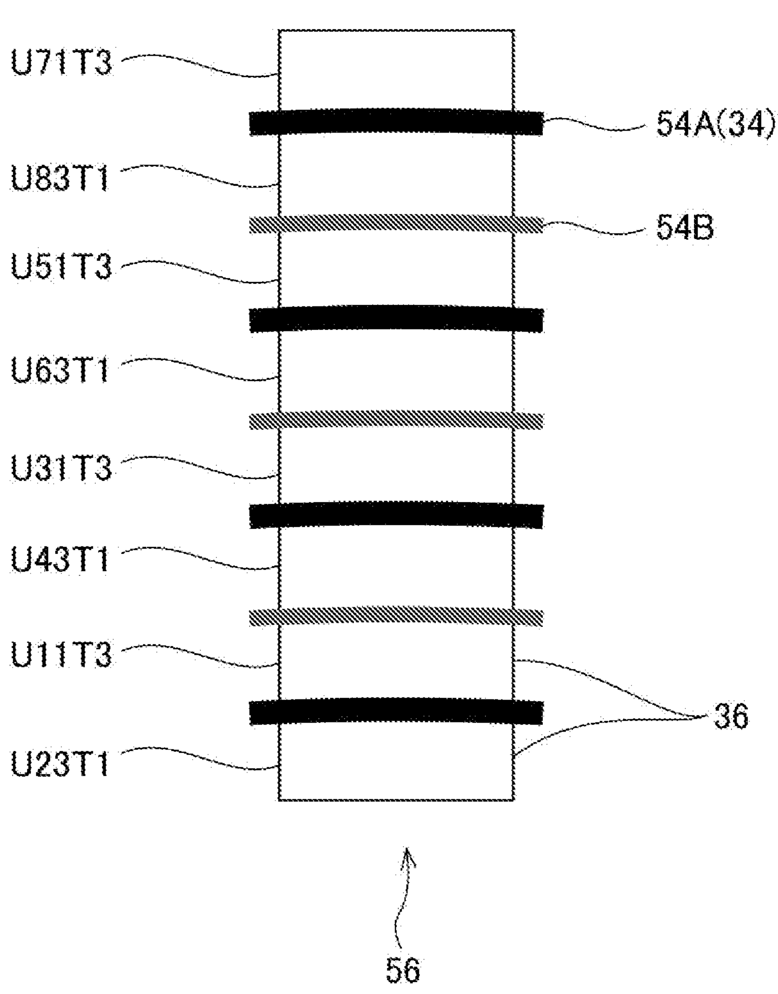
R
U71T3
54A(34)
U83T1
54B
U51T3
U63T1
U31T3
U43T1
U11T3
36
U23T1
56

COIL ASSEMBLY, ARMATURE AND ROTATING ELECTRIC MACHINE

CROSS-REFERENCE TO RELATED APPLICATIONS

The present application is a continuation application of International Application No. PCT/JP2022/029544 filed on Aug. 1, 2022, which is based on and claims priority from Japanese Patent Application No. 2021-170429 filed on Oct. 18, 2021. The entire contents of these applications are incorporated by reference into the present application.

BACKGROUND

1 Technical Field

The present disclosure relates to coil assemblies, armatures and rotating electric machines.

2 Description of Related Art

There is disclosed, for example in Japanese Unexamined Patent Application Publication No. JP 2017-070140 A, a coil assembly that constitutes a part of an armature of a rotating electric machine. The coil assembly includes a first electroconductive cylindrical body, a second electroconductive cylindrical body, and an electrical insulator arranged between the first electroconductive cylindrical body and the second electroconductive cylindrical body. The first electroconductive cylindrical body has a plurality of first electroconductive bands extending in an axial direction thereof and arranged adjacent to and apart from one another in a circumferential direction thereof. The second electroconductive cylindrical body has a plurality of second electroconductive bands extending in an axial direction thereof and arranged adjacent to and apart from one another in a circumferential direction thereof. The electrical insulator electrically insulates the first electroconductive bands from the second electroconductive bands. With such a configuration, it is possible to achieve simplification of the configuration of the coil assembly and reduction in the cost of the coil assembly while suppressing the electrical performance of the coil assembly from being impaired.

SUMMARY

For a motor having a coil assembly as disclosed in the aforementioned patent document, it is desired to achieve improvement in the torque of the motor while suppressing increase in the size of the motor.

The present disclosure has been accomplished in view of the above circumstances.

According to a first aspect of the present disclosure, there is provided a coil assembly which includes a band member, a plurality of coils and vertical-portion laminates. The band member is formed of an electrically-insulative material into a band shape and rolled along a circumferential direction into an annular shape. The band member has a plurality of layers in a radial direction. The coils are formed of an electroconductive material on the band member and have vertical portions. The coils are located at predetermined positions in the circumferential direction and the radial direction on the band member and connected in a predetermined connection pattern. The vertical-portion laminates are constituted of the vertical portions of the coils which are radially laminated in a cross section of the band member and the coils taken along the radial direction. Each of the vertical-portion laminates is configured so that each radially-adjacent pair of the vertical portions constituting the vertical-portion laminate have different electric potentials when the coils are energized. Moreover, according to a second aspect of the present disclosure, there is provided an armature which includes the coil assembly according to the first aspect of the present disclosure. Furthermore, according to a third aspect of the present disclosure, there is provided a rotating electric machine which includes a stator and a rotor, wherein one of the stator and the rotor includes the armature according to the second aspect of the present disclosure, and the other of the stator and the rotor has magnets arranged to radially face the coil assembly.

With the above configuration, it becomes possible to achieve improvement in the torque of the rotating electric machine while suppressing increase in the size of the rotating electric machine.

BRIEF DESCRIPTION OF THE DRAWINGS

FIG. 5 is a diagram illustrating a star connection.

FIG. 14 is a cross-sectional view of a vertical-portion laminate.

FIG. 15 is a cross-sectional view of another vertical-portion laminate.

FIG. 16 is a cross-sectional view of yet another vertical-portion laminate.

FIG. 37 is another diagram showing a coil and a connection terminal part.

DESCRIPTION OF EMBODIMENTS

First Embodiment

Figure 1:
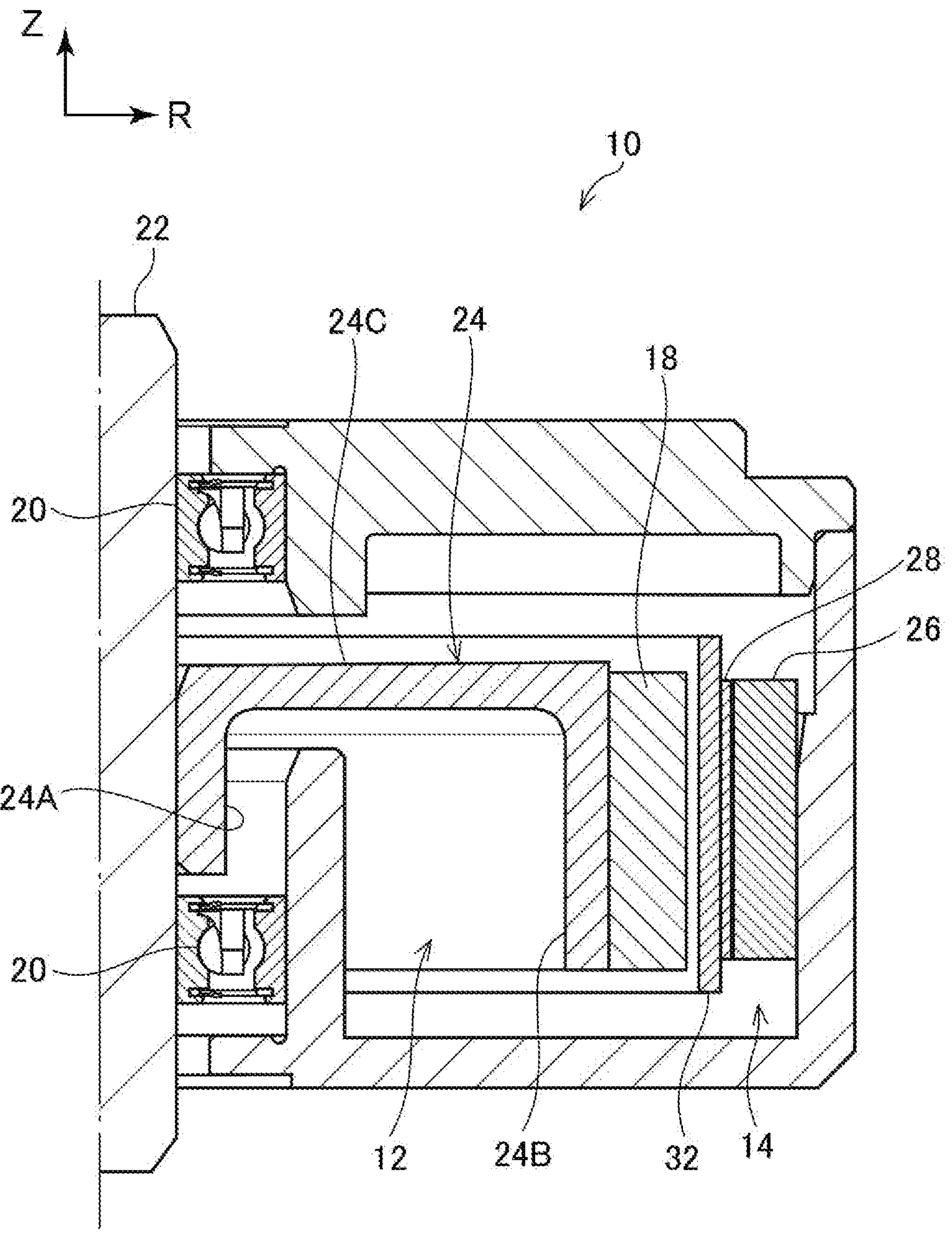
FIG. 1 is a cross-sectional view, taken along an axial direction, of a motor according to a first embodiment.

A motor 10 according to the first embodiment of the present disclosure will be described with reference to FIGS. 1 to 17. It should be noted that the arrows Z, R and C suitably shown in the drawings respectively indicate a first side in a rotation axial direction, the outer side in a rotation radial direction and a first side in a rotation circumferential direction of a rotor 12 that will be described later. Moreover, in the case of merely indicating the axial direction, the radial direction and the circumferential direction, unless specified otherwise, the arrows Z, R and C respectively indicate the rotation axial direction, the rotation radial direction and the rotation circumferential direction of the rotor 12. In addition, the motor 10 according to the present embodiment and motors according to embodiments to be described later are examples of rotating electric machines.

Figure 2:
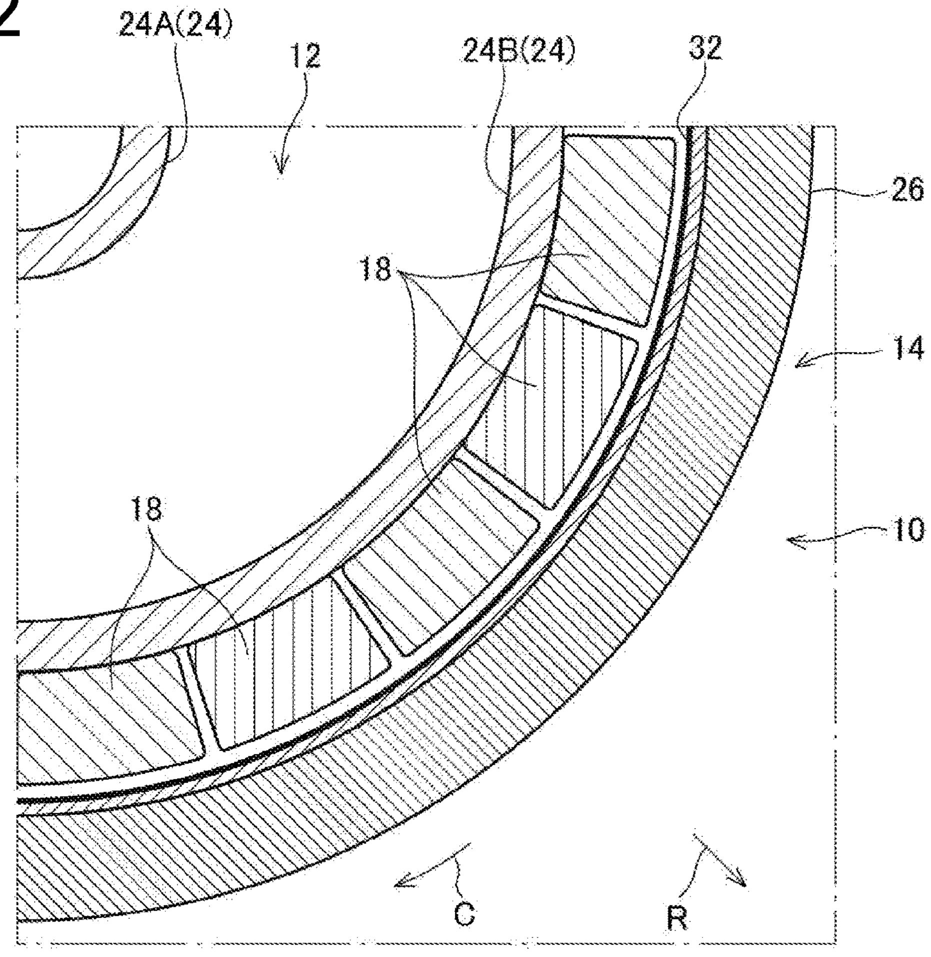
FIG. 2 is a cross-sectional view, taken along a radial direction, of the motor according to the first embodiment.

As shown in FIGS. 1 and 2, in the present embodiment, the motor 10 is configured as an inner rotor type brushless motor in which the rotor 12 is arranged radially inside a stator 14 that serves as an armature. It should be noted that: FIGS. 1 and 2 merely illustrate an example of the motor 10; and there are some inconsistencies in the number of coils 16, the number of magnets 18 and the shapes of details between these figures and the later explanation of the motor 10.

The rotor 12 includes a rotating shaft 22 that is rotatably supported by a pair of bearings 20, a rotor core 24 that is formed in a bottomed cylindrical shape and fixed to the rotating shaft 22, and a plurality of magnets 18 fixed to a radially outer surface of the rotor core 24.

The rotor core 24 has a first cylindrical part 24A fixed onto the rotating shaft 22 by press-fitting or the like, a second cylindrical part 24B located radially outside the first cylindrical part 24A, and a discoid connection plate part 24C that radially connects an end portion of the first cylindrical part 24A on the first side in the axial direction and an end portion of the second cylindrical part 24B on the first side in the axial direction. An outer circumferential surface (i.e., a radially outer surface) of the second cylindrical part 24B is formed as a cylindrical surface along the circumferential direction. To the outer circumferential surface of the second cylindrical part 24B, there are fixed the magnets 18 which will be described later.

The magnets 18 are formed of a magnetic compound whose intrinsic coercive force Hc is higher than or equal to 400 [kA/m] and whose residual flux density Br is higher than or equal to 1.0[T]. For example, the magnets 18 may be formed of a magnetic compound such as $NdFe_{11}TiN$, $Nd_2Fe_{14}B$, $Sm_2Fe_{17}N_3$ or FeNi. Moreover, as mentioned above, the magnets 18 are fixed to the outer circumferential surface of the second cylindrical part 24B of the rotor core 24. Furthermore, those magnets 18 each of which has a radially outer surface forming an N pole and those magnets 18 each of which has a radially outer surface forming an S pole are arranged alternately in the circumferential direction. In addition, the number of the magnets 18 may be suitably set in consideration of the output and the like required for the motor 10.

Figure 3:
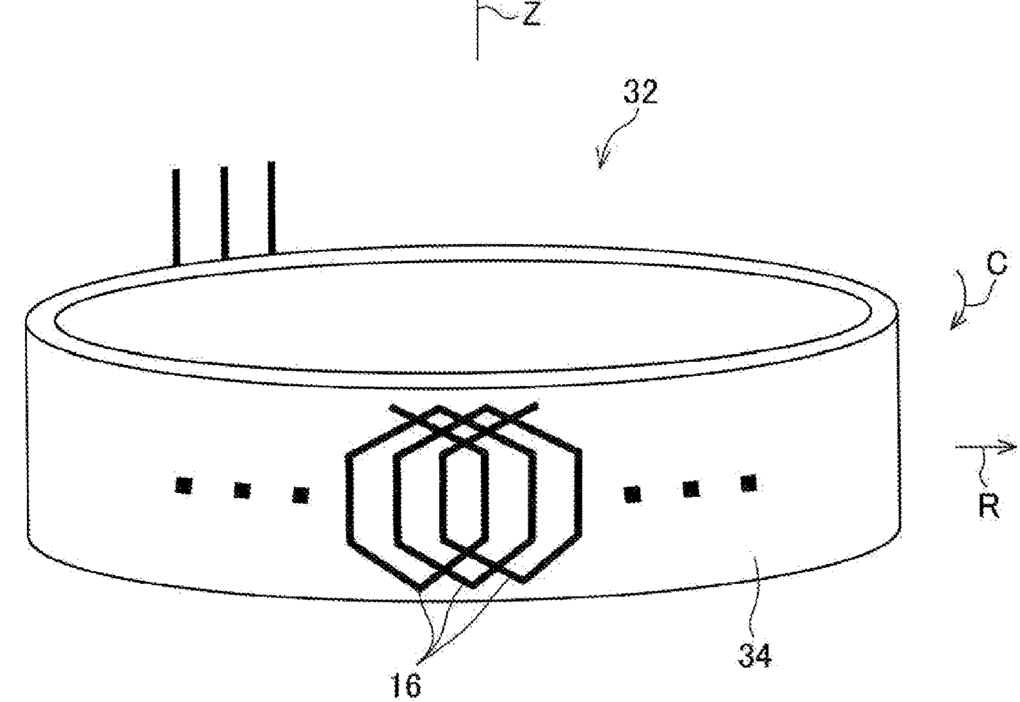
FIG. 3 is a schematic perspective view of a coil assembly.

The stator 14 includes an annular stator core 26 that serves as an armature core, an insulator 28 mounted to the stator core 26 by bonding or fitting, and a coil assembly 32 mounted to the stator core 26 via the insulator 28. As shown in FIGS. 1 to 3, in the present embodiment, the stator 14 has a toothless structure such that no part of the stator core 26 is arranged inside the coils 16 each constituting a part of the coil assembly 32.

As shown in FIGS. 1 and 2, the stator core 26 is formed of a soft-magnetic material, such as steel, into an annular shape. The stator core 26 is arranged coaxially with the rotor 12; and the axial center position of the stator core 26 coincides in the axial direction with the axial center positions of the magnets 18 fixed to the rotor core 24.

As shown in FIG. 1, the insulator 28 is formed of an electrically-insulative material such as a resin material. In a state of having been mounted to the stator core 26, the insulator 28 covers a radially inner surface of the stator core 26. It should be noted that the insulator 28 is not shown in FIG. 2.

As shown in FIG. 3, the coil assembly 32 according to the present embodiment includes a band member 34 that is formed of an electrically-insulative material into a band shape, and the coils 16 formed on the band member 34.

Figure 4:
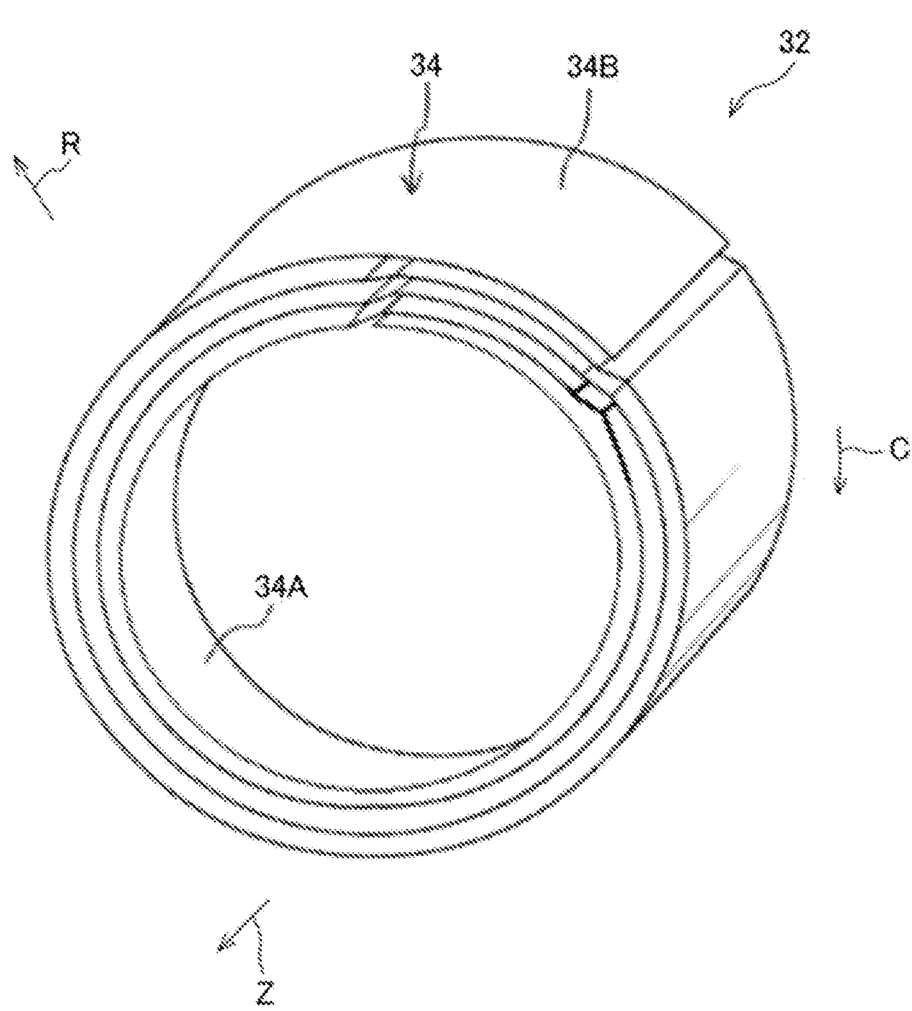
FIG. 4 is a schematic perspective view of a band member in a rolled state.

As shown in FIG. 4, the band member 34 is formed in a rectangular shape whose lateral direction coincides with the axial direction and whose longitudinal direction coincides with a direction perpendicular to the axial direction. The thickness of the band member 34 is set to such as a thickness as to allow the band member 34 to be bent in the circumferential direction. In the present embodiment, the band member 34 is rolled along the circumferential direction a plurality of times into a cylindrical shape. In addition, in the present embodiment, most of the band member 34 has four layers in the radial direction.

As shown in FIG. 3, the coils 16 are formed on the band member 34. Moreover, as shown in FIGS. 3 and 4, the band member 34 is rolled along the circumferential direction a plurality of times so that the coils 16 are located at predetermined positions in the circumferential direction and the radial direction.

Figure 5:
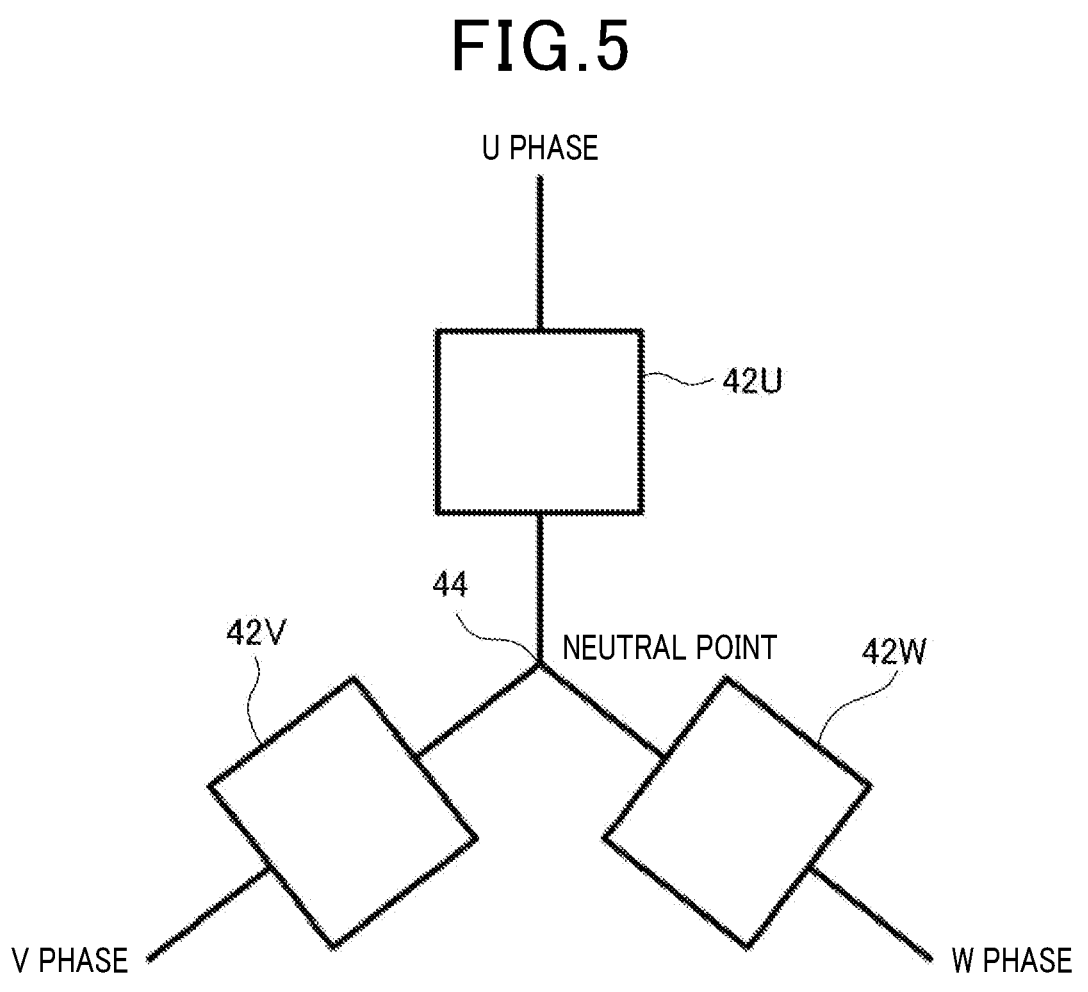
Figure 6:
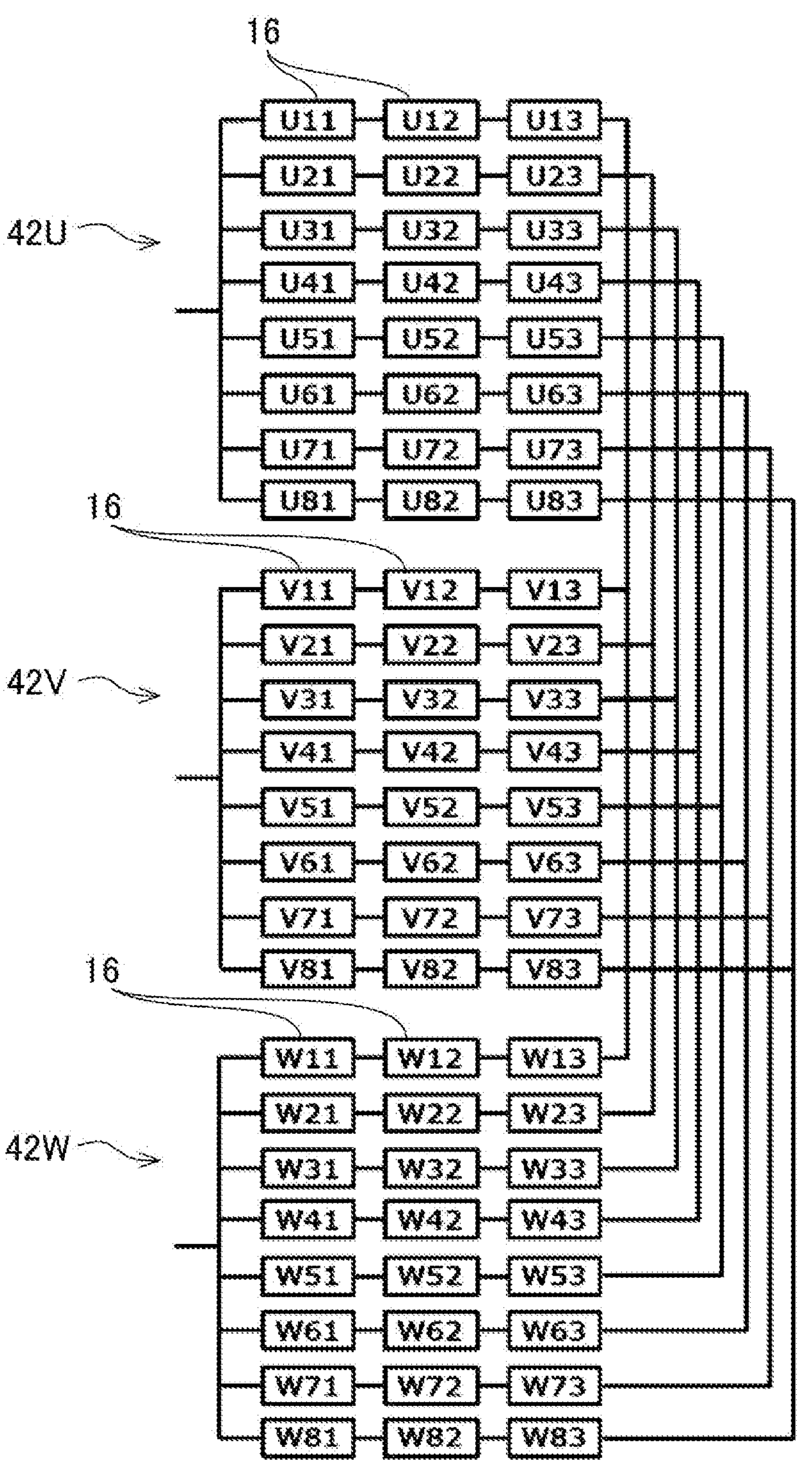
FIG. 6 is a diagram illustrating connection of a plurality of coils.

In the present embodiment, as shown in FIG. 5, those coils 16 which together constitute a U phase (or U-phase coil group 42U), those coils 16 which together constitute a V phase (or V-phase coil group 42V) and those coils 16 which together constitute a W phase (or W-phase coil group 42W) are star-connected. Specifically, as shown in FIG. 6, twenty-four coils 16 constituting the U-phase coil group 42U, twenty-four coils 16 constituting the V-phase coil group 42V and twenty-four coils 16 constituting the W-phase coil group 42W are star-connected.

Hereinafter, the twenty-four coils 16 constituting the U-phase coil group 42U will be designated respectively by reference signs U11, U12, U13, U21, U22, U23, U31, U32, U33, U41, U42, U43, U51, U52, U53, U61, U62, U63, U71, U72, U73, U81, U82 and U83.

Moreover, the twenty-four coils 16 constituting the V-phase coil group 42V will be designated respectively by reference signs V11, V12, V13, V21, V22, V23, V31, V32, V33, V41, V42, V43, V51, V52, V53, V61, V62, V63, V71, V72, V73, V81, V82 and V83.

Furthermore, the twenty-four coils 16 constituting the W-phase coil group 42W will be designated respectively by reference signs W11, W12, W13, W21, W22, W23, W31, W32, W33, W41, W42, W43, W51, W52, W53, W61, W62, W63, W71, W72, W73, W81, W82 and W83.

It should be noted that in the following explanation, specific coils 16 will be represented only by the reference signs depending on the situation.

The U-phase coils U11, U12 and U13 are connected in series with each other. The U-phase coils U21, U22 and U23 are connected in series with each other. The U-phase coils U31, U32 and U33 are connected in series with each other. The U-phase coils U41, U42 and U43 are connected in series with each other. The U-phase coils U51, U52 and U53 are connected in series with each other. The U-phase coils U61, U62 and U63 are connected in series with each other. The U-phase coils U71, U72 and U73 are connected in series with each other. The U-phase coils U81, U82 and U83 are connected in series with each other.

Moreover, an end of the U-phase coil U11 on a side not connected to the U-phase coil U12, an end of the U-phase coil U21 on a side not connected to the U-phase coil U22, an end of the U-phase coil U31 on a side not connected to the U-phase coil U32, an end of the U-phase coil U41 on a side not connected to the U-phase coil U42, an end of the U-phase coil U51 on a side not connected to the U-phase coil U52, an end of the U-phase coil U61 on a side not connected to the U-phase coil U62, an end of the U-phase coil U71 on a side not connected to the U-phase coil U72 and an end of the U-phase coil U81 on a side not connected to the U-phase coil U82 are connected with each other.

The V-phase coils V11, V12 and V13 are connected in series with each other. The V-phase coils V21, V22 and V23 are connected in series with each other. The V-phase coils V31, V32 and V33 are connected in series with each other. The V-phase coils V41, V42 and V43 are connected in series with each other. The V-phase coils V51, V52 and V53 are connected in series with each other. The V-phase coils V61, V62 and V63 are connected in series with each other. The V-phase coils V71, V72 and V73 are connected in series with each other. The V-phase coils V81, V82 and V83 are connected in series with each other.

Moreover, an end of the V-phase coil V11 on a side not connected to the V-phase coil V12, an end of the V-phase coil V21 on a side not connected to the V-phase coil V22, an end of the V-phase coil V31 on a side not connected to the V-phase coil V32, an end of the V-phase coil V41 on a side not connected to the V-phase coil V42, an end of the V-phase coil V51 on a side not connected to the V-phase coil V52, an end of the V-phase coil V61 on a side not connected to the V-phase coil V62, an end of the V-phase coil V71 on a side not connected to the V-phase coil V72 and an end of the V-phase coil V81 on a side not connected to the V-phase coil V82 are connected with each other.

The W-phase coils W11, W12 and W13 are connected in series with each other. The W-phase coils W21, W22 and W23 are connected in series with each other. The W-phase coils W31, W32 and W33 are connected in series with each other. The W-phase coils W41, W42 and W43 are connected in series with each other. The W-phase coils W51, W52 and W53 are connected in series with each other. The W-phase coils W61, W62 and W63 are connected in series with each other. The W-phase coils W71, W72 and W73 are connected in series with each other. The W-phase coils W81, W82 and W83 are connected in series with each other.

Moreover, an end of the W-phase coil W11 on a side not connected to the W-phase coil W12, an end of the W-phase coil W21 on a side not connected to the W-phase coil W22, an end of the W-phase coil W31 on a side not connected to the W-phase coil W32, an end of the W-phase coil W41 on a side not connected to the W-phase coil W42, an end of the W-phase coil W51 on a side not connected to the W-phase coil W52, an end of the W-phase coil W61 on a side not connected to the W-phase coil W62, an end of the W-phase coil W71 on a side not connected to the W-phase coil W72 and an end of the W-phase coil W81 on a side not connected to the W-phase coil W82 are connected with each other.

An end of the U-phase coil U13 on a side not connected to the U-phase coil U12, an end of the V-phase coil V13 on a side not connected to the V-phase coil V12 and an end of the W-phase coil W13 on a side not connected to the W-phase coil W12 are connected with each other.

An end of the U-phase coil U23 on a side not connected to the U-phase coil U22, an end of the V-phase coil V23 on a side not connected to the V-phase coil V22 and an end of the W-phase coil W23 on a side not connected to the W-phase coil W22 are connected with each other.

An end of the U-phase coil U33 on a side not connected to the U-phase coil U32, an end of the V-phase coil V33 on a side not connected to the V-phase coil V32 and an end of the W-phase coil W33 on a side not connected to the W-phase coil W32 are connected with each other.

An end of the U-phase coil U43 on a side not connected to the U-phase coil U42, an end of the V-phase coil V43 on a side not connected to the V-phase coil V42 and an end of the W-phase coil W43 on a side not connected to the W-phase coil W42 are connected with each other.

An end of the U-phase coil U53 on a side not connected to the U-phase coil U52, an end of the V-phase coil V53 on a side not connected to the V-phase coil V52 and an end of the W-phase coil W53 on a side not connected to the W-phase coil W52 are connected with each other.

An end of the U-phase coil U63 on a side not connected to the U-phase coil U62, an end of the V-phase coil V63 on a side not connected to the V-phase coil V62 and an end of the W-phase coil W63 on a side not connected to the W-phase coil W62 are connected with each other.

An end of the U-phase coil U73 on a side not connected to the U-phase coil U72, an end of the V-phase coil V73 on a side not connected to the V-phase coil V72 and an end of the W-phase coil W73 on a side not connected to the W-phase coil W72 are connected with each other.

An end of the U-phase coil U83 on a side not connected to the U-phase coil U82, an end of the V-phase coil V83 on a side not connected to the V-phase coil V82 and an end of the W-phase coil W83 on a side not connected to the W-phase coil W82 are connected with each other.

Figure 7:
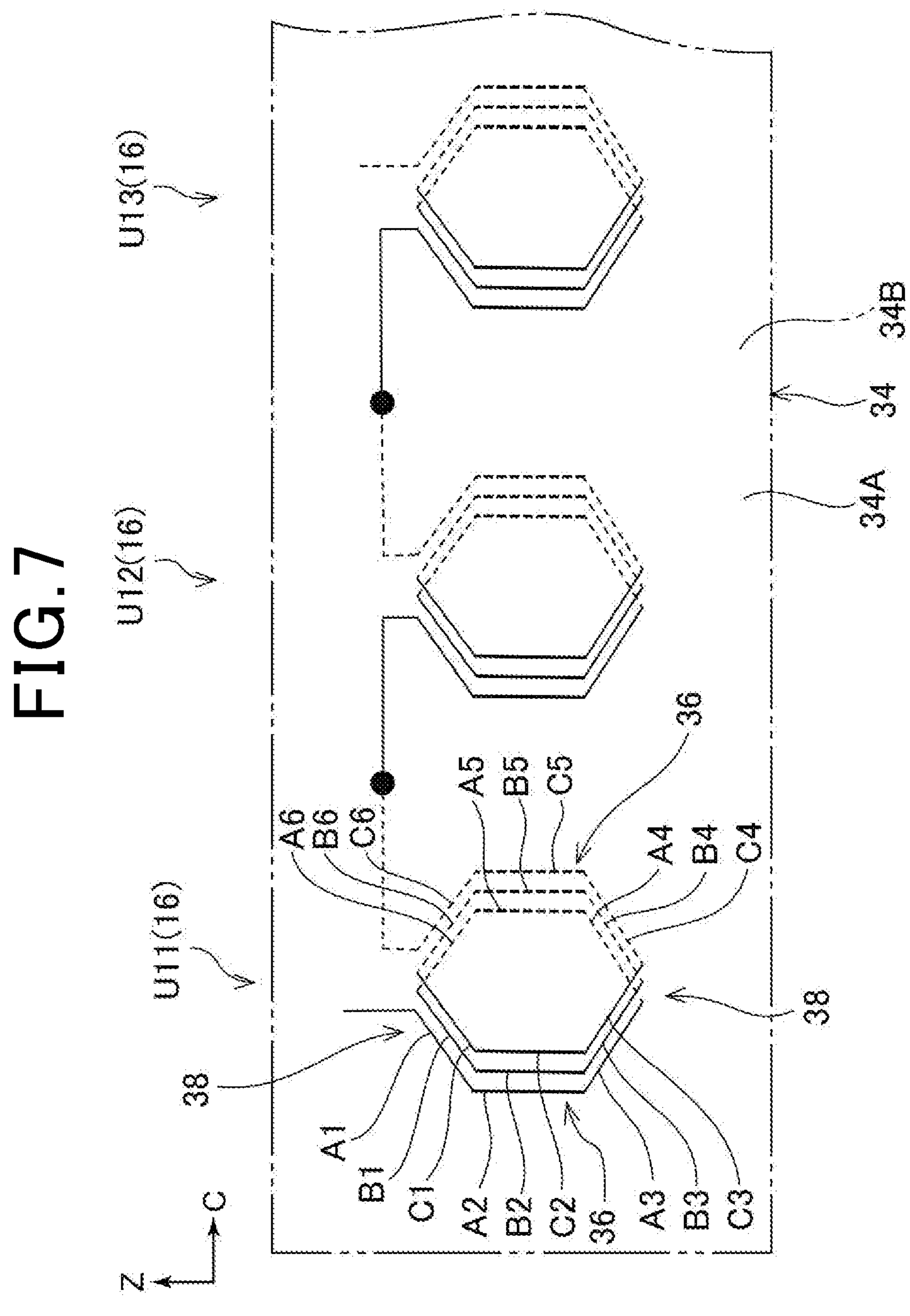
FIG. 7 is a schematic view of coils.

FIG. 7 schematically shows some of the U-phase coils 16. In the present embodiment, each of the coils 16 is formed to have a hexagonal shape when viewed in the thickness direction of the band member 34. Moreover, each of the coils 16 has the same configuration as a three-turn coil in which a conductor wire is wound three turns.

That part of the U-phase coil U11 which constitutes the first turn includes: a first straight portion A1 that is inclined toward the second side in the circumferential direction as it extends to the second side in the axial direction; a second straight portion A2 that extends from the first straight portion A1 to the second side in the axial direction; and a third straight portion A3 that is inclined toward the first side in the circumferential direction as it extends from the second straight portion A2 to the second side in the axial direction. Moreover, that part of the U-phase coil U11 which constitutes the first turn also includes: a fourth straight portion A4 that is inclined toward the first side in the circumferential direction as it extends from the third straight portion A3 to the first side in the axial direction; a fifth straight portion A5 that extends from the fourth straight portion A4 to the first side in the axial direction; and a sixth straight portion A6 that is inclined toward the second side in the circumferential direction as it extends from the fifth straight portion A5 to the first side in the axial direction. Furthermore, the first straight portion A1, the second straight portion A2 and the third straight portion A3 are formed on a first surface 34A (see FIG. 10) of the band member 34. On the other hand, the fourth straight portion A4, the fifth straight portion A5 and the sixth straight portion A6 are formed on a second surface 34B (see FIG. 10) of the band member 34. In addition, the third straight portion A3 and the fourth straight portion A4 are electrically connected via a through-hole (not shown) that penetrates the band member 34. It should be noted that in FIG. 7, those portions of the U-phase coil U11 which are formed on the first surface 34A of the band member 34 are shown by solid lines, whereas those portions of the U-phase coil U11 which are formed on the second surface 34B of the band member 34 are shown by dashed lines.

That part of the U-phase coil U11 which constitutes the second turn includes: a first straight portion B1 that is inclined toward the second side in the circumferential direction as it extends from the sixth straight portion A6 of the first turn to the second side in the axial direction; a second straight portion B2 that extends from the first straight portion B1 to the second side in the axial direction; and a third straight portion B3 that is inclined toward the first side in the circumferential direction as it extends from the second straight portion B2 to the second side in the axial direction. Moreover, that part of the U-phase coil U11 which constitutes the second turn also includes: a fourth straight portion B4 that is inclined toward the first side in the circumferential direction as it extends from the third straight portion B3 to the first side in the axial direction; a fifth straight portion B5 that extends from the fourth straight portion B4 to the first side in the axial direction; and a sixth straight portion B6 that is inclined toward the second side in the circumferential direction as it extends from the fifth straight portion B5 to the first side in the axial direction. Furthermore, the sixth straight portion A6 and the first straight portion B1 are electrically connected via a through-hole (not shown) that penetrates the band member 34. Similarly, the third straight portion B3 and the fourth straight portion B4 are electrically connected via a through-hole (not shown) that penetrates the band member 34.

That part of the U-phase coil U11 which constitutes the third turn includes: a first straight portion C1 that is inclined toward the second side in the circumferential direction as it extends from the sixth straight portion B6 of the second turn to the second side in the axial direction; a second straight portion C2 that extends from the first straight portion C1 to the second side in the axial direction; and a third straight portion C3 that is inclined toward the first side in the circumferential direction as it extends from the second straight portion C2 to the second side in the axial direction. Moreover, that part of the U-phase coil U11 which constitutes the third turn also includes: a fourth straight portion C4 that is inclined toward the first side in the circumferential direction as it extends from the third straight portion C3 to the first side in the axial direction; a fifth straight portion C5 that extends from the fourth straight portion C4 to the first side in the axial direction; and a sixth straight portion C6 that is inclined toward the second side in the circumferential direction as it extends from the fifth straight portion C5 to the first side in the axial direction. Furthermore, the sixth straight portion B6 and the first straight portion C1 are electrically connected via a through-hole (not shown) that penetrates the band member 34. Similarly, the third straight portion C3 and the fourth straight portion C4 are electrically connected via a through-hole (not shown) that penetrates the band member 34.

That part (i.e., the first straight portion B1 to the sixth straight portion B6) of the U-phase coil U11 which constitutes the second turn is offset to the first side in the circumferential direction from that part (i.e., the first straight portion A1 to the sixth straight portion A6) of the U-phase coil U11 which constitutes the first turn. Further, that part (i.e., the first straight portion C1 to the sixth straight portion C6) of the U-phase coil U11 which constitutes the third turn is offset to the first side in the circumferential direction from that part (i.e., the first straight portion B1 to the sixth straight portion B6) of the U-phase coil U11 which constitutes the second turn.

Figure 8:
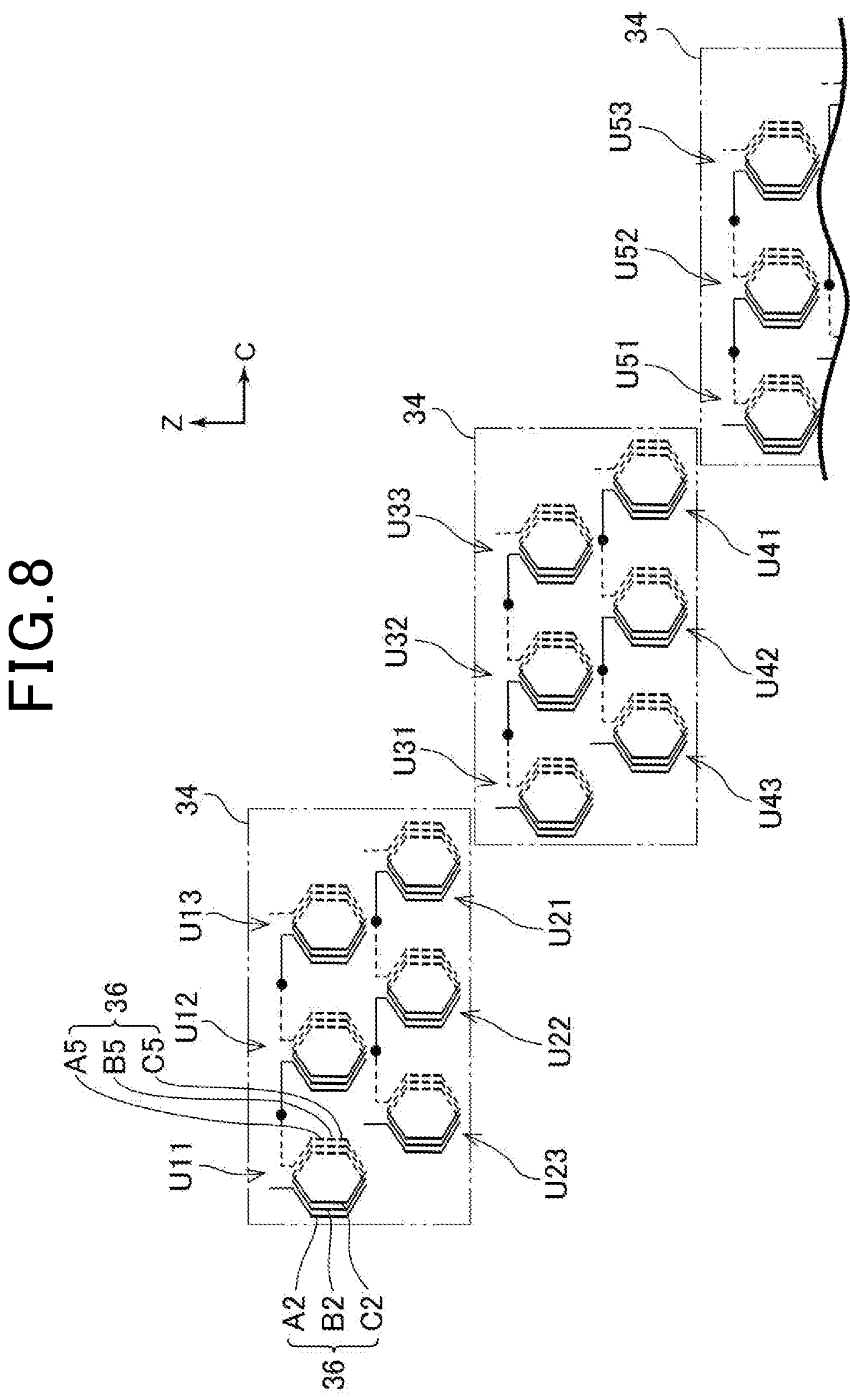
FIG. 8 is a schematic view showing U-phase coil subgroups offset from each other in the axial direction.

Moreover, as shown in FIGS. 7 and 8, the other U-phase coils (U12, . . . , U8 3) are also configured in the same manner as the U-phase coil U11. That is, all the U-phase coils (U11, . . . , U83) have the same configuration. It should be noted that the second straight portions A2, B2 and C2 and the fifth straight portions A5, B5 and C5 described above may be referred to as vertical portions 36. It also should be noted that: the first straight portions A1, B1 and C1 and the sixth straight portions A6, B6 and C6 may be referred to as first coil end portions 38; and the third straight portions A3, B3 and C3 and the fourth straight portions A4, B4 and C4 may be referred to as second coil end portions 38.

FIG. 8 is a schematic diagram showing U-phase coil subgroups offset from each other in the axial direction. One of the U-phase coil subgroups includes the U-phase coil U11; and another one of the U-phase coil subgroups includes the U-phase coil U23.

As shown in FIG. 8 and FIG. 7, the fifth straight portion A5, the fifth straight portion B5 and the fifth straight portion C5 of the U-phase coil U11 are located respectively at the same circumferential positions as the second straight portion A2, the second straight portion B2 and the second straight portion C2 of the U-phase coil U23. That is, the fifth straight portion A5, the fifth straight portion B5 and the fifth straight portion C5 of the U-phase coil U11 respectively overlap the second straight portion A2, the second straight portion B2 and the second straight portion C2 of the U-phase coil U23 via the band member 34.

Moreover, the fifth straight portion A5, the fifth straight portion B5 and the fifth straight portion C5 of the U-phase coil U23 are located respectively at the same circumferential positions as the second straight portion A2, the second straight portion B2 and the second straight portion C2 of the U-phase coil U12. That is, the fifth straight portion A5, the fifth straight portion B5 and the fifth straight portion C5 of the U-phase coil U23 respectively overlap the second straight portion A2, the second straight portion B2 and the second straight portion C2 of the U-phase coil U12 via the band member 34.

Furthermore, the fifth straight portion A5, the fifth straight portion B5 and the fifth straight portion C5 of the U-phase coil U12 are located respectively at the same circumferential positions as the second straight portion A2, the second straight portion B2 and the second straight portion C2 of the U-phase coil U22. That is, the fifth straight portion A5, the fifth straight portion B5 and the fifth straight portion C5 of the U-phase coil U12 respectively overlap the second straight portion A2, the second straight portion B2 and the second straight portion C2 of the U-phase coil U22 via the band member 34.

Furthermore, the fifth straight portion A5, the fifth straight portion B5 and the fifth straight portion C5 of the U-phase coil U22 are located respectively at the same circumferential positions as the second straight portion A2, the second straight portion B2 and the second straight portion C2 of the U-phase coil U13. That is, the fifth straight portion A5, the fifth straight portion B5 and the fifth straight portion C5 of the U-phase coil U22 respectively overlap the second straight portion A2, the second straight portion B2 and the second straight portion C2 of the U-phase coil U13 via the band member 34.

Furthermore, the fifth straight portion A5, the fifth straight portion B5 and the fifth straight portion C5 of the U-phase coil U13 are located respectively at the same circumferential positions as the second straight portion A2, the second straight portion B2 and the second straight portion C2 of the U-phase coil U21. That is, the fifth straight portion A5, the fifth straight portion B5 and the fifth straight portion C5 of the U-phase coil U13 respectively overlap the second straight portion A2, the second straight portion B2 and the second straight portion C2 of the U-phase coil U21 via the band member 34.

The U-phase coils U11, U23, U12, U22, U13 and U21 described above are arranged in this order on the first lap of the rolled band member 34. That is, the U-phase coils U11, U23, U12, U22, U13 and U21 are arranged in this order on the closest layer of the rolled band member 34 to the rotor 12.

Moreover, the sixth straight portion C6 of the U-phase coil U11 and the first straight portion A1 of the U-phase coil U12 are connected with each other. The sixth straight portion C6 of the U-phase coil U12 and the first straight portion A1 of the U-phase coil U13 are connected with each other. The sixth straight portion C6 of the U-phase coil U23 and the first straight portion A1 of the U-phase coil U22 are connected with each other. The sixth straight portion C6 of the U-phase coil U22 and the first straight portion A1 of the U-phase coil U21 are connected with each other.

Similarly, the fifth straight portion A5, the fifth straight portion B5 and the fifth straight portion C5 of the U-phase coil U31 are located respectively at the same circumferential positions as the second straight portion A2, the second straight portion B2 and the second straight portion C2 of the U-phase coil U43. That is, the fifth straight portion A5, the fifth straight portion B5 and the fifth straight portion C5 of the U-phase coil U31 respectively overlap the second straight portion A2, the second straight portion B2 and the second straight portion C2 of the U-phase coil U43 via the band member 34.

Moreover, the fifth straight portion A5, the fifth straight portion B5 and the fifth straight portion C5 of the U-phase coil U43 are located respectively at the same circumferential positions as the second straight portion A2, the second straight portion B2 and the second straight portion C2 of the U-phase coil U32. That is, the fifth straight portion A5, the fifth straight portion B5 and the fifth straight portion C5 of the U-phase coil U43 respectively overlap the second straight portion A2, the second straight portion B2 and the second straight portion C2 of the U-phase coil U32 via the band member 34.

Furthermore, the fifth straight portion A5, the fifth straight portion B5 and the fifth straight portion C5 of the U-phase coil U32 are located respectively at the same circumferential positions as the second straight portion A2, the second straight portion B2 and the second straight portion C2 of the U-phase coil U42. That is, the fifth straight portion A5, the fifth straight portion B5 and the fifth straight portion C5 of the U-phase coil U32 respectively overlap the second straight portion A2, the second straight portion B2 and the second straight portion C2 of the U-phase coil U42 via the band member 34.

Furthermore, the fifth straight portion A5, the fifth straight portion B5 and the fifth straight portion C5 of the U-phase coil U42 are located respectively at the same circumferential positions as the second straight portion A2, the second straight portion B2 and the second straight portion C2 of the U-phase coil U33. That is, the fifth straight portion A5, the fifth straight portion B5 and the fifth straight portion C5 of the U-phase coil U42 respectively overlap the second straight portion A2, the second straight portion B2 and the second straight portion C2 of the U-phase coil U33 via the band member 34.

Furthermore, the fifth straight portion A5, the fifth straight portion B5 and the fifth straight portion C5 of the U-phase coil U33 are located respectively at the same circumferential positions as the second straight portion A2, the second straight portion B2 and the second straight portion C2 of the U-phase coil U41. That is, the fifth straight portion A5, the fifth straight portion B5 and the fifth straight portion C5 of the U-phase coil U33 respectively overlap the second straight portion A2, the second straight portion B2 and the second straight portion C2 of the U-phase coil U41 via the band member 34.

In addition, the U-phase coils U31, U43, U32, U42, U33 and U41 described above are arranged in this order on the second lap of the rolled band member 34. Moreover, the fifth straight portion A5, the fifth straight portion B5 and the fifth straight portion C5 of the U-phase coil U21 arranged on the first lap of the rolled band member 34 are located respectively at the same circumferential positions as the second straight portion A2, the second straight portion B2 and the second straight portion C2 of the U-phase coil U31 arranged on the second lap of the rolled band member 34.

Furthermore, the sixth straight portion C6 of the U-phase coil U31 and the first straight portion A1 of the U-phase coil U32 are connected with each other. The sixth straight portion C6 of the U-phase coil U32 and the first straight portion A1 of the U-phase coil U33 are connected with each other. The sixth straight portion C6 of the U-phase coil U43 and the first straight portion A1 of the U-phase coil U42 are connected with each other. The sixth straight portion C6 of the U-phase coil U42 and the first straight portion A1 of the U-phase coil U41 are connected with each other.

The U-phase coils U51 to U83 are also arranged on the band member 34 in the same manner as the U-phase coils U11 to U41 described above. Consequently, the U-phase coils U51, U63, U52, U62, U53 and U61 are arranged in this order on the third lap of the rolled band member 34; and the U-phase coils U71, U83, U72, U82, U73 and U81 are arranged in this order on the fourth lap of the rolled band member 34.

Figure 9:
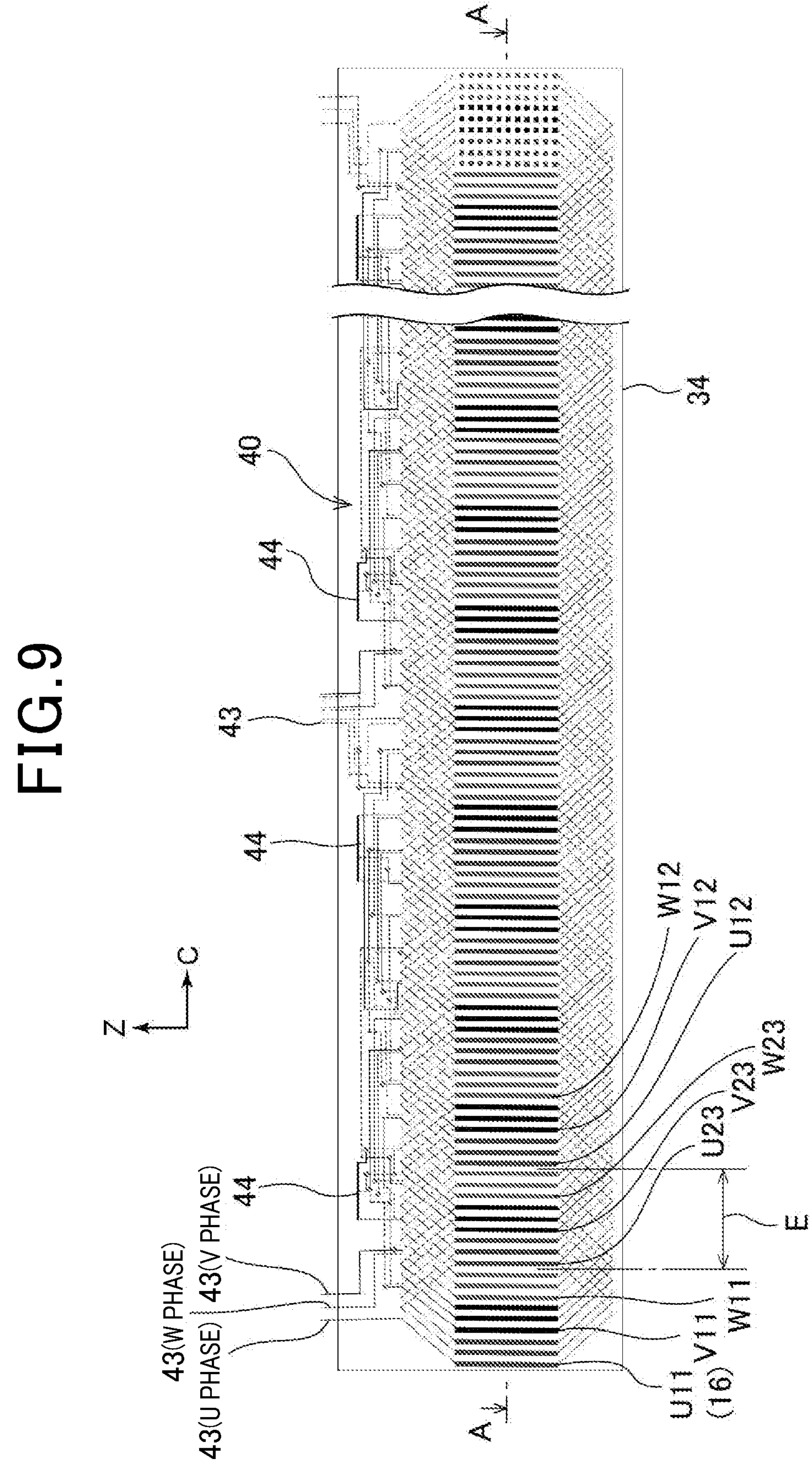
FIG. 9 is a development of the coil assembly.

As shown in FIGS. 8 and 9, the V-phase coils V11 to V83 are also arranged on the band member 34 in the same manner as the U-phase coils U11 to U83. Moreover, the W-phase coils W11 to W83 are also arranged on the band member 34 in the same manner as the U-phase coils U11 to U83. However, the V-phase coils V11 to V83 are connected so that the winding direction of the V-phase coils is opposite to those of the U-phase coils and the W-phase coils.

Moreover, the V-phase coils V11 to V83 are offset to the first side in the circumferential direction with respect to the U-phase coils U11 to U83. Further, the W-phase coils W11 to W83 are offset to the first side in the circumferential direction with respect to the V-phase coils V11 to V83.

Figure 10:
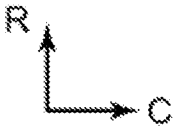
FIG. 10 is a cross-sectional view of a part of the coil assembly.
Figure 10:
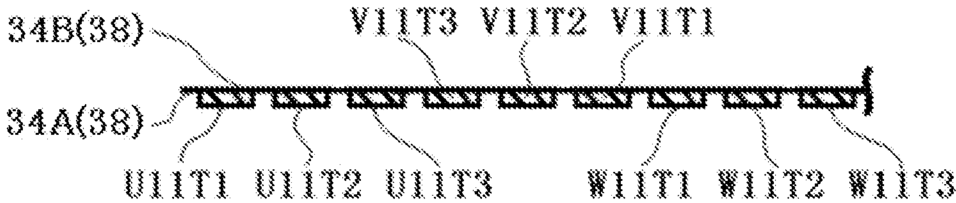

FIG. 10 shows a part of a cross section of the band member 34 and the coils 16 taken along the line A-A in FIG. 9. It should be noted that the part of the cross section shown in FIG. 10 includes the cross section of an end part of the band member 34 on the second side in the circumferential direction. As shown in FIG. 10, in this part of the cross section, U11T1, U11T2, U11T3, V11T3, V11T2, V11T1, W11T1, W11T2 and W11T3 are formed in this order on the first surface 34A of the band member 34. Here, reference signs T1, T2 and T3, which respectively indicate the first, second and third turns of the coils, are suffixed to the reference signs respectively designating the coils. For example, the first turn of the U-phase coil U11 is designated by the reference sign U11T1; the second turn of the U-phase coil U11 is designated by the reference sign U11T2; and the third turn of the U-phase coil U11 is designated by the reference sign U11T3.

Figure 11:
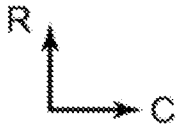
FIG. 11 is a cross-sectional view of another part of the coil assembly.
Figure 11:
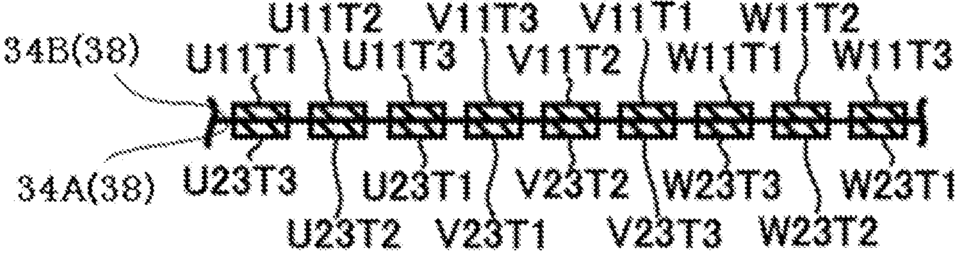

FIG. 11 shows another part of the cross section of the band member 34 and the coils 16 taken along the line A-A in FIG. 9. It should be noted that the part of the cross section shown in FIG. 11 is that part of the cross section which is indicted by the arrow E in FIG. 9. It also should be noted that the part of the cross section shown in FIG. 11 is adjacent to the part of the cross section shown in FIG. 10 in the circumferential direction. In the part of the cross section shown in FIG. 11, U23T3, U23T2, U23T1, V23T1, V23T2, V23T3, W23T3, W23T2 and W23T1 are formed in this order on the first surface 34A of the band member 34. Moreover, in the part of the cross section shown in FIG. 11, U11T1, U11T2, U11T3, V11T3, V11T2, V11T1, W11T1, W11T2 and W11T3 are formed in this order on the second surface 34B of the band member 34.

Moreover, although not shown in the drawings, on the first side of the part of the cross section shown in FIG. 11 in the circumferential direction, the first, second and third turns of the U-phase coils (U23, U12, U22, . . . , U82, U73, U81) and the V-phase coils (V23, V12, V22, . . . , V82, V73, V81) and the W-phase coils (W23, W12, W22, . . . , W82, W73, W81) are formed on the first surface 34A and the second surface 34B of the band member 34 in the same manner as shown in FIG. 11.

Figure 12:
FIG. 12 is a cross-sectional view of yet another part of the coil assembly.
Figure 12:

FIG. 12 shows yet another part of the cross section of the band member 34 and the coils 16 taken along the line A-A in FIG. 9. It should be noted that the part of the cross section shown in FIG. 12 includes the cross section of an end part of the band member 34 on the first side in the circumferential direction. As shown in FIG. 12, in this part of the cross section, U81T1, U81T2, U81T3, V81T3, V81T2, V81T1, W81T1, W81T2 and W81T3 are formed in this order on the second surface 34B of the band member 34.

Moreover, as shown in FIG. 9, the coils 16 are connected via a connection pattern section 40 provided on a part of the band member 34 on the first side in the axial direction. It should be noted that in FIG. 9, those portions of the connection pattern section 40 which are formed on the first surface 34A of the band member 34 are shown by solid lines, whereas those portions of the connection pattern section 40 which are formed on the second surface 34B of the band member 34 are shown by dashed lines. It also should be noted that in FIG. 9, those portions of the connection pattern section 40 which are designated by the reference numeral 44 represent the neutral point; and those portions of the connection pattern section 40 which are designated by the reference numeral 43 represent connection portions that are connected to a control unit (not shown). In addition, the connection between the coils 16 may be made alternatively by connection members formed separately from the band member 34, such as busbars or a printed circuit board.

Figure 13:
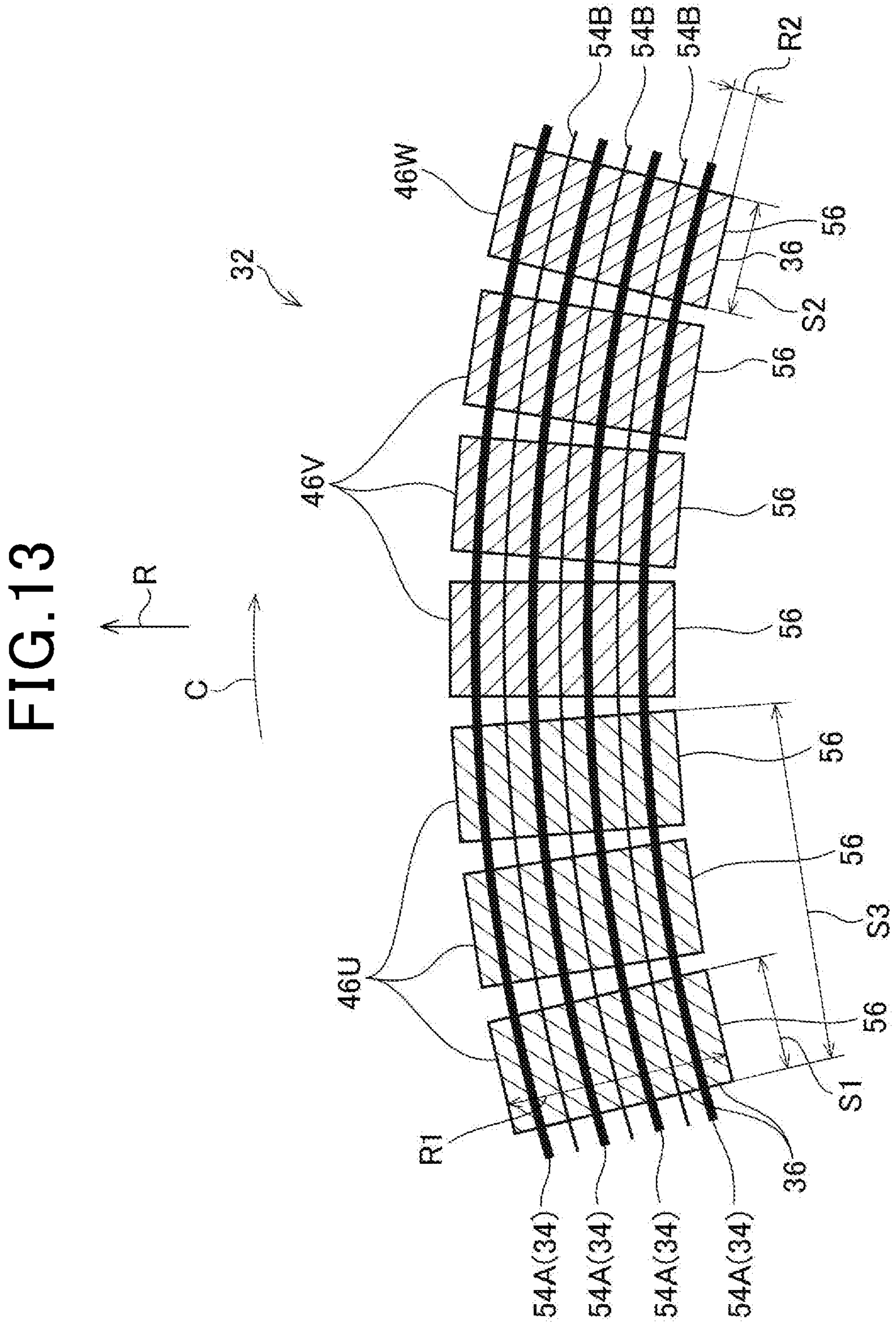
FIG. 13 is a cross-sectional view of the coil assembly taken along a radial direction.
Figure 17:
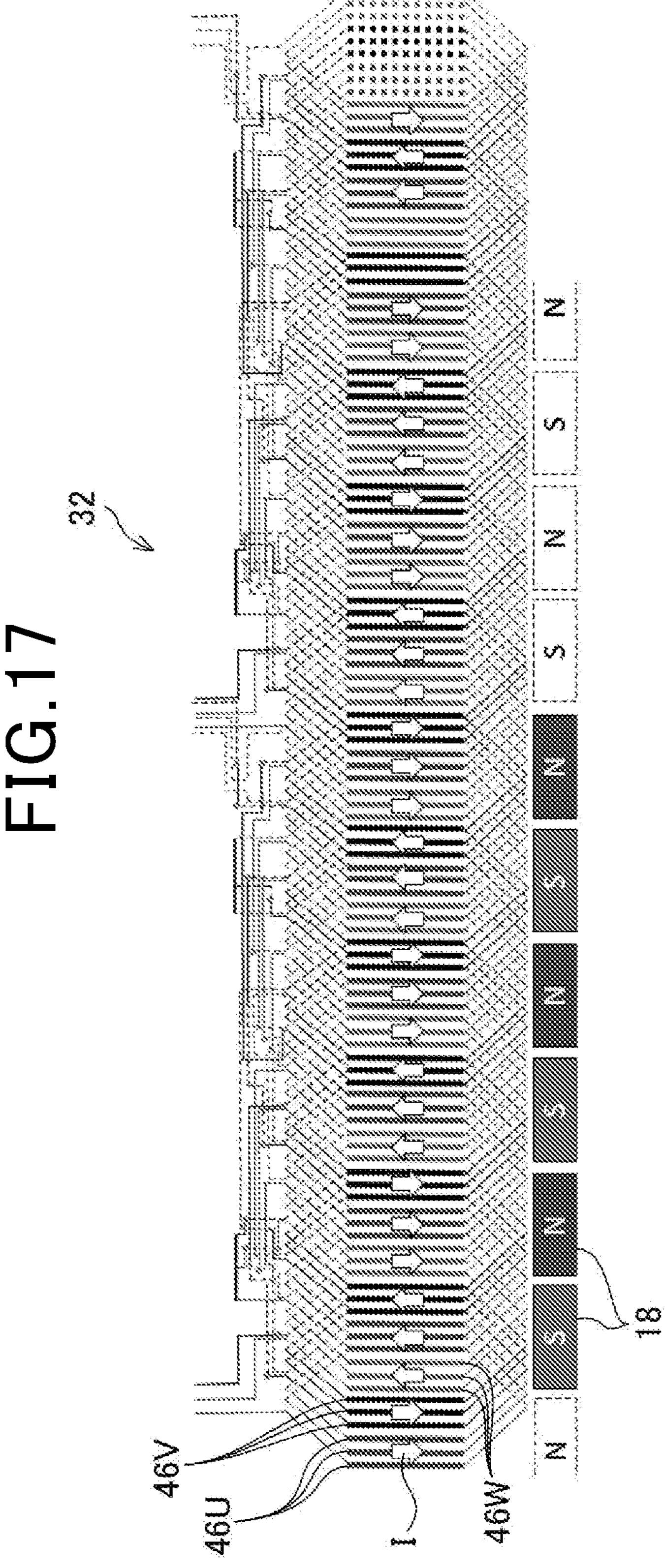
FIG. 17 is a development of the coil assembly, where directions in which electric currents flow through the coils are indicated by arrows.

As described above, the band member 34 is rolled along the circumferential direction a plurality of times so that the coils 16 are located at predetermined positions in the circumferential direction and the radial direction. FIG. 13 shows a part of a cross section of the coil assembly 32 taken along the radial direction, where the band member 34 is in the rolled state. It should be noted that this cross section of the coil assembly 32 is a cross section corresponding to the vertical portion 36 (see FIG. 7) of the coils 16.

In the cross section shown in FIG. 13, the vertical portions 36 of the coils 16 are laminated in the radial direction and arranged at equal intervals in the circumferential direction. Moreover, in the state where the vertical portions 36 of the coils 16 are laminated in the radial direction, a first insulating layer 54A or a second insulating layer 54B is interposed between each radially-adjacent pair of the vertical portions 36. The first insulating layer 54A is constituted of the band member 34. On the other hand, the second insulating layer 54B is constituted of an insulating film that is formed to the coils 16 formed on the band member 34. The insulating film may be formed of, for example, an electrically-insulative paint. Hereinafter, the laminates in each of which the vertical portions 36 of the coils 16 are laminated in the radial direction will be referred to as the vertical-portion laminates 56. Each of the vertical-portion laminates 56 has a rectangular cross section along the radial direction;

in the rectangular cross section, the radial dimension R1 is greater than the circumferential dimension S1. Moreover, in the present embodiment, for each of the vertical portions 36 constituting the vertical-portion laminates 56, the circumferential dimension S2 of the vertical portion 36 is set to be greater than the radial dimension R2 of the vertical portion 36.

FIG. 14, FIG. 15 and FIG. 16 respectively show a vertical-portion laminate 56 in which U23T3 is located at the radially inner end, a vertical-portion laminate 56 in which U23T2 is located at the radially inner end, and a vertical-portion laminate 56 in which U23T1 is located at the radially inner end.

As shown in FIG. 14, in the vertical-portion laminate 56 in which U23T3 is located at the radially inner end, the vertical portions 36 of U23T3, U11T1, U43T3, U31T1, U63T3, U51T1, U83T3 and U71T1 are sequentially arranged in alignment with each other from the radially inner side to the radially outer side.

As shown in FIG. 15, in the vertical-portion laminate 56 in which U23T2 is located at the radially inner end, the vertical portions 36 of U23T2, U11T2, U43T2, U31T2, U63T2, U51T2, U83T2 and U71T2 are sequentially arranged in alignment with each other from the radially inner side to the radially outer side.

As shown in FIG. 16, in the vertical-portion laminate 56 in which U23T1 is located at the radially inner end, the vertical portions 36 of U23T1, U11T3, U43T1, U31T3, U63T1, U51T3, U83T1 and U71T3 are sequentially arranged in alignment with each other from the radially inner side to the radially outer side.

As shown in FIG. 13 (see also FIGS. 14 to 16), the vertical-portion laminate 56 in which U23T3 is located at the radially inner end, the vertical-portion laminate 56 in which U23T2 is located at the radially inner end, and the vertical-portion laminate 56 in which U23T1 is located at the radially inner end are arranged in this order in the circumferential direction to together constitute a U-phase conductor group 46U. In the present embodiment, the circumferential dimension S3 of the U-phase conductor group 46U at the radially inner end thereof is set to be greater than the radial dimension R1 of each of the vertical-portion laminates 56 constituting the U-phase conductor group 46U.

The vertical portions 36 of the other coils 16 are also laminated to form vertical-portion laminates 56 in the same manner as described above. Moreover, a V-phase conductor group 46V and a W-phase conductor group 46W are also formed in the same manner as the above-described U-phase conductor group 46U. In addition, the U-phase conductor group 46U, the V-phase conductor group 46V and the W-phase conductor group 46W are arranged in this order in the circumferential direction.

Operation and Effects of Motor According to the Present Embodiment

Next, operation and effects of the motor 10 according to the present embodiment will be described.

As shown in FIGS. 1, 2, 5, 9 and 17, in the motor 10 according to the present embodiment, a rotating magnetic field is generated on the inner periphery of the stator 14 by switching of the energization of the U-phase coil group 42U, the V-phase coil group 42V and the W-phase coil group 42W that constitute part of the stator 14. Consequently, the rotor 12 is caused by the rotating magnetic field to rotate. It should be noted that in FIG. 17, the arrows I indicate the directions of electric currents flowing through the vertical portions 36 of the coils 16 (or the conductor groups 46U, 46V and 46W) when a voltage is applied with the U-phase coil group 42U being positive and with the V-phase coil group 42V and the W-phase coil group 42W being negative. Moreover, in FIG. 17, there are schematically shown the circumferential positions of the magnets 18 that constitute part of the rotor 12. In addition, in FIG. 17, the reference signs "S" and "N" indicate the polarities of the magnets 18 on the coil body 32-side surfaces thereof.

In the present embodiment, the coil assembly 32 includes the band member 34 formed of an electrically-insulative material in a band shape, and the coils 16 formed on the band member 34. Moreover, the band member 34 is rolled along the circumferential direction a plurality of times so that the coils 16 are located at predetermined positions in the circumferential direction and the radial direction. With this configuration, it becomes possible to suppress increase in the size of the coil assembly 32 in the radial direction. As a result, it becomes possible to suppress increase in the size of the motor 10.

Furthermore, as shown in FIGS. 6 to 9 and 13 to 16, in the present embodiment, in a cross section of the band member 34 and the coils 16 taken along the radial direction, there are formed the vertical-portion laminates 56. Each of the vertical-portion laminates 56 is configured so that each radially-adjacent pair of the vertical portions 36 have different electric potentials when the coils 16 are energized. In particular, each of the vertical-portion laminates 56 shown in FIGS. 14 and 16 has a configuration such that the vertical portions 36 having different turn numbers (T1 to T3) are arranged adjacent to each other in the radial direction; consequently, the electric potential difference between each radially-adjacent pair of the vertical portions 36 becomes large. Specifically, in the present embodiment, every predetermined number of the coils 16, such as the three U-phase coils of U11, U12 and U13, are connected in series with each other. In this case, the electric potential difference between each radially-adjacent pair of the vertical portions 36 is greater than or equal to 1.5×V/s, where V is the electric potential difference between one end and the other end of each serial connection of the coils 16, and s (s=3 in the present embodiment) is the number of the coils 16 included in each serial connection. Consequently, in the present embodiment, it becomes possible to improve the torque of the motor 10 in comparison with a motor having a configuration such that there is no electric potential difference between each radially-adjacent pair of the vertical portions 36 when the coils 16 are energized. In addition, when none of the coils 16 are connected in series with the other coils 16 as in a motor according to the fifth embodiment which will be described later, it is preferable for the electric potential difference between each radially-adjacent pair of the vertical portions 36 to be greater than or equal to V/2.

Moreover, as shown in FIG. 13, in the present embodiment, for each of the conductor groups 46U, 46V and 46W of the respective phases, the circumferential dimension S3 of the conductor group at the radially inner end thereof (i.e., at the end thereof on the side of the magnets 18 of the rotor 12) is set to be greater than the radial dimension R1 of each of the vertical-portion laminates 56 constituting the conductor group. With the above setting, it becomes possible to reduce the radial thickness of the coil assembly 32 and thus the gap between the magnets 18 of the rotor 12 and the stator core 26. Accordingly, it becomes possible to reduce the magnetic reluctance. Consequently, it becomes possible to further improve the torque of the motor 10.

Furthermore, in the present embodiment, for each of the vertical-portion laminates 56, the radial dimension R1 of the vertical-portion laminate 56 is set to be greater than the circumferential dimension S1 of the vertical-portion laminate 56. Consequently, it becomes possible to reduce the area of each of the vertical-portion laminates 56 facing the magnets 18 of the rotor 12 while securing the cross-sectional area of each of the vertical-portion laminates 56. Thus, it becomes possible to suppress eddy current generated in the vertical-portion laminates 56 due to radial magnetic flux. As a result, it becomes possible to further improve the torque of the motor 10.

Furthermore, in the present embodiment, for each of the vertical portions 36 constituting the vertical-portion laminates 56, the circumferential dimension S2 of the vertical portion 36 is set to be greater than the radial dimension R2 of the vertical portion 36. Consequently, it becomes possible to suppress eddy current generated in the vertical-portion laminates 56 due to leakage magnetic flux between the magnets 18 of the rotor 12. As a result, it becomes possible to further improve the torque of the motor 10.

Second Embodiment

Next, a motor according to the second embodiment will be described. It should be noted that: members and parts of the motor according to the second embodiment corresponding to those of the motor 10 according to the first embodiment are designated by the same reference signs as the corresponding members and parts of the motor 10 according to the first embodiment; and description of these parts and members will be omitted hereinafter.

Figure 18:
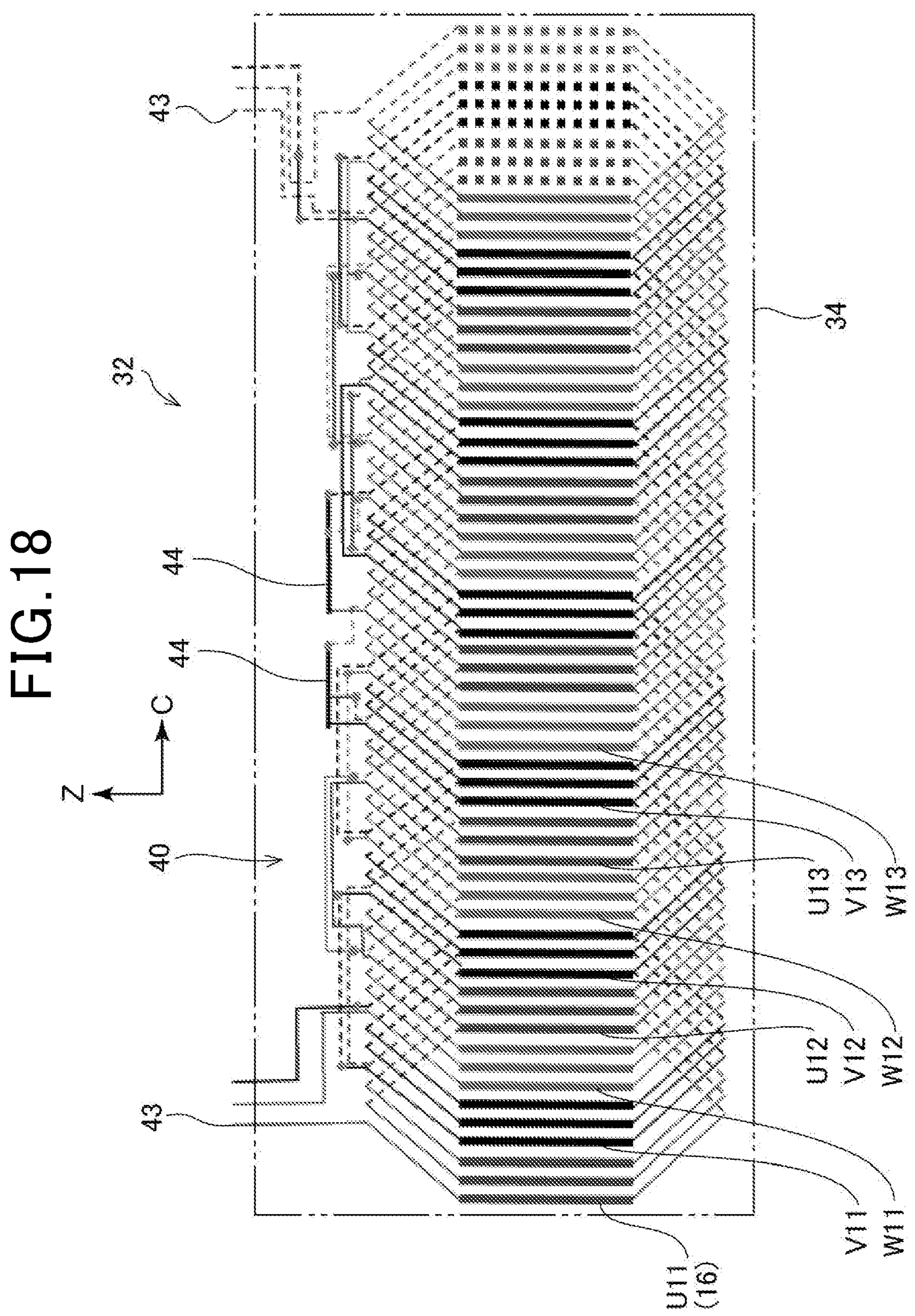
FIG. 18 is a development of a coil assembly of a motor according to a second embodiment.

FIG. 18, which corresponds to FIG. 9, shows a coil assembly 32 of the motor according to the second embodiment. It should be noted that in FIG. 18, there is shown only that part of the coil assembly 32 which corresponds to the first lap of the band member 34. Moreover, it also should be noted that in the motor according to the present embodiment, the band member 34 is rolled up to the fourth lap as in the motor 10 according to the first embodiment.

Figure 19:
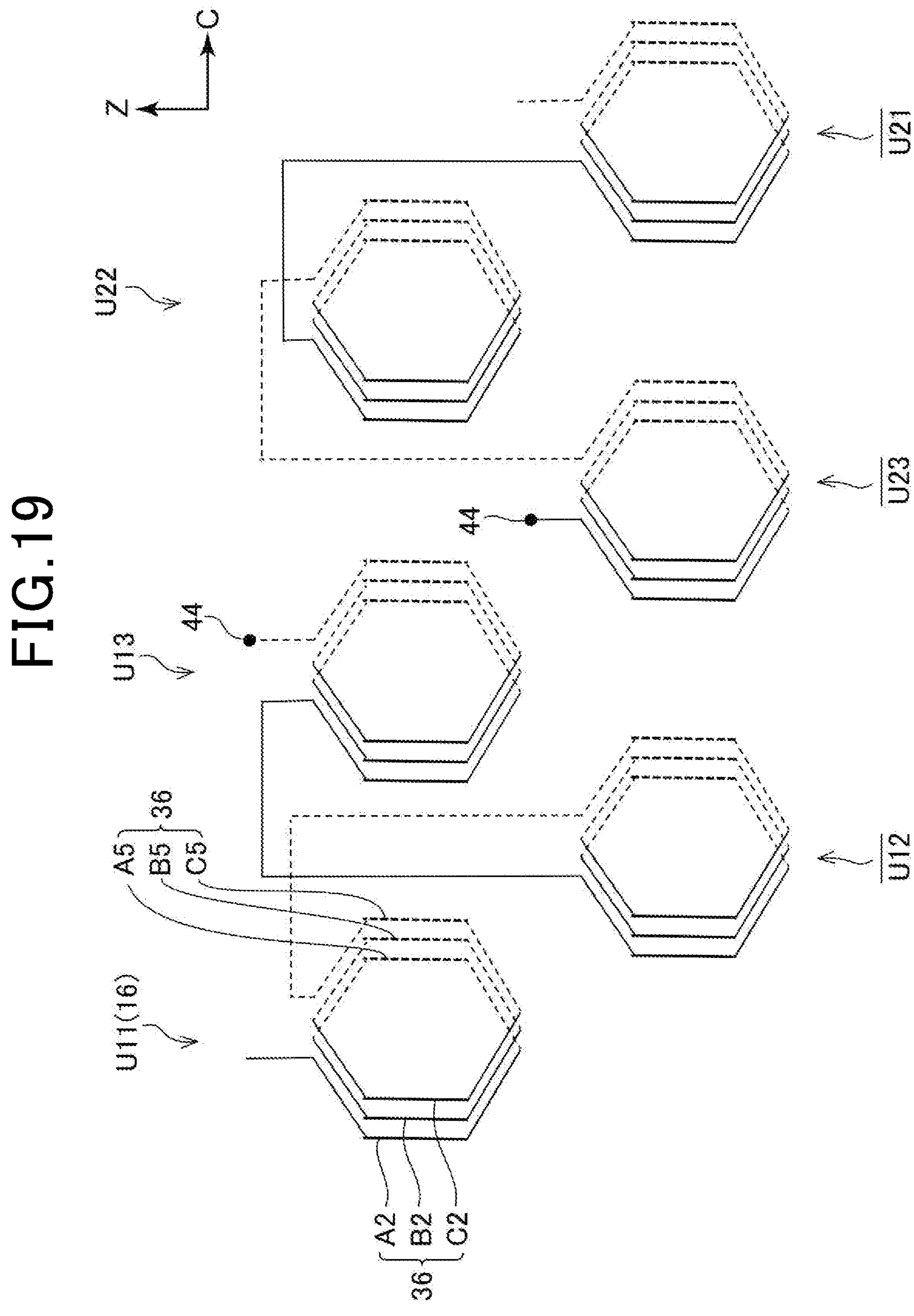
FIG. 19 is a schematic view showing U-phase coil subgroups offset from each other in an axial direction.

FIG. 19, which corresponds to FIG. 8, shows six U-phase coils 16 formed on the first lap of the band member 34. As shown in FIG. 19, in the present embodiment, the fifth straight portion A5, the fifth straight portion B5 and the fifth straight portion C5 of the U-phase coil U11 are located respectively at the same circumferential positions as the second straight portion A2, the second straight portion B2 and the second straight portion C2 of the U-phase coil U12. That is, the fifth straight portion A5, the fifth straight portion B5 and the fifth straight portion C5 of the U-phase coil U11 respectively overlap the second straight portion A2, the second straight portion B2 and the second straight portion C2 of the U-phase coil U12 via the band member 34.

Moreover, the fifth straight portion A5, the fifth straight portion B5 and the fifth straight portion C5 of the U-phase coil U12 are located respectively at the same circumferential positions as the second straight portion A2, the second straight portion B2 and the second straight portion C2 of the U-phase coil U13. That is, the fifth straight portion A5, the fifth straight portion B5 and the fifth straight portion C5 of the U-phase coil U12 respectively overlap the second straight portion A2, the second straight portion B2 and the second straight portion C2 of the U-phase coil U13 via the band member 34.

Furthermore, the fifth straight portion A5, the fifth straight portion B5 and the fifth straight portion C5 of the U-phase coil U13 are located respectively at the same circumferential positions as the second straight portion A2, the second straight portion B2 and the second straight portion C2 of the U-phase coil U23. That is, the fifth straight portion A5, the fifth straight portion B5 and the fifth straight portion C5 of the U-phase coil U13 respectively overlap the second straight portion A2, the second straight portion B2 and the second straight portion C2 of the U-phase coil U23 via the band member 34.

Furthermore, the fifth straight portion A5, the fifth straight portion B5 and the fifth straight portion C5 of the U-phase coil U23 are located respectively at the same circumferential positions as the second straight portion A2, the second straight portion B2 and the second straight portion C2 of the U-phase coil U22. That is, the fifth straight portion A5, the fifth straight portion B5 and the fifth straight portion C5 of the U-phase coil U23 respectively overlap the second straight portion A2, the second straight portion B2 and the second straight portion C2 of the U-phase coil U22 via the band member 34.

Furthermore, the fifth straight portion A5, the fifth straight portion B5 and the fifth straight portion C5 of the U-phase coil U22 are located respectively at the same circumferential positions as the second straight portion A2, the second straight portion B2 and the second straight portion C2 of the U-phase coil U21. That is, the fifth straight portion A5, the fifth straight portion B5 and the fifth straight portion C5 of the U-phase coil U22 respectively overlap the second straight portion A2, the second straight portion B2 and the second straight portion C2 of the U-phase coil U21 via the band member 34.

The U-phase coils U11, U12, U13, U23, U22 and U21 described above are arranged in this order on the first lap of the rolled band member 34. That is, the U-phase coils U11, U12, U13, U23, U22 and U21 are arranged in this order on the closest layer of the rolled band member 34 to the rotor 12.

In the motor according to the present embodiment, the sixth straight portion C6 of the U-phase coil U11 and the sixth straight portion C6 of the U-phase coil U12 are connected with each other. The first straight portion A1 of the U-phase coil U12 and the first straight portion A1 of the U-phase coil U13 are connected with each other. The sixth straight portion C6 of the U-phase coil U23 and the sixth straight portion C6 of the U-phase coil U22 are connected with each other. The first straight portion A1 of the U-phase coil U22 and the first straight portion A1 of the U-phase coil U21 are connected with each other. Consequently, in the present embodiment, although the U-phase coils U11, U12, U13, U23, U22 and U21 are physically configured as coils wound in one direction (or as left-handed coils to be described later), the U-phase coils U12, U23 and U21 will function identically to coils wound in the opposite direction to the U-phase coils U11, U13 and U22 (or identically to right-handed coils) when the U-phase coils U11, U12, U13, U23, U22 and U21 are energized. Hereinafter, for the sake of convenience of explanation, coils corresponding to the U-phase coils U11, U13 and U22 will be referred to as the "left-handed coils"; and coils corresponding to the U-phase coils U12, U23 and U21 will be referred to as the "right-handed coils". In addition, in FIG. 19, lines (or bars) are attached to the reference signs U12, U23 and U21 designating the right-handed coils. Moreover, in the present embodiment, the left-handed coils and the right-handed coils are arranged alternately in the circumferential direction.

Although not shown in the drawings, the U-phase coils U31, U32, U33, U43, U42 and U41 are arranged on the second lap of the band member 34 in the same manner as the U-phase coils U11, U12, U13, U23, U22 and U21 arranged on the first lap of the band member 34. Moreover, the U-phase coils U51, U52, U53, U63, U62 and U61 are arranged on the third lap of the band member 34 in the same manner as the U-phase coils U11, U12, U13, U23, U22 and U21 arranged on the first lap of the band member 34. Furthermore, the U-phase coils U71, U72, U73, U83, U82 and U81 are arranged on the fourth lap of the band member 34 in the same manner as the U-phase coils U11, U12, U13, U23, U22 and U21 arranged on the first lap of the band member 34.

The V-phase coils V11 to V83 are also arranged on the band member 34 in the same manner as the U-phase coils U11 to U83. Moreover, the W-phase coils W11 to W83 are also arranged on the band member 34 in the same manner as the U-phase coils U11 to U83. However, the V-phase coils V11 to V83 are connected so that the winding direction of the V-phase coils is opposite to those of the U-phase coils and the W-phase coils.

Figure 20:
FIG. 20 is a cross-sectional view of a vertical-portion laminate.
Figure 20:
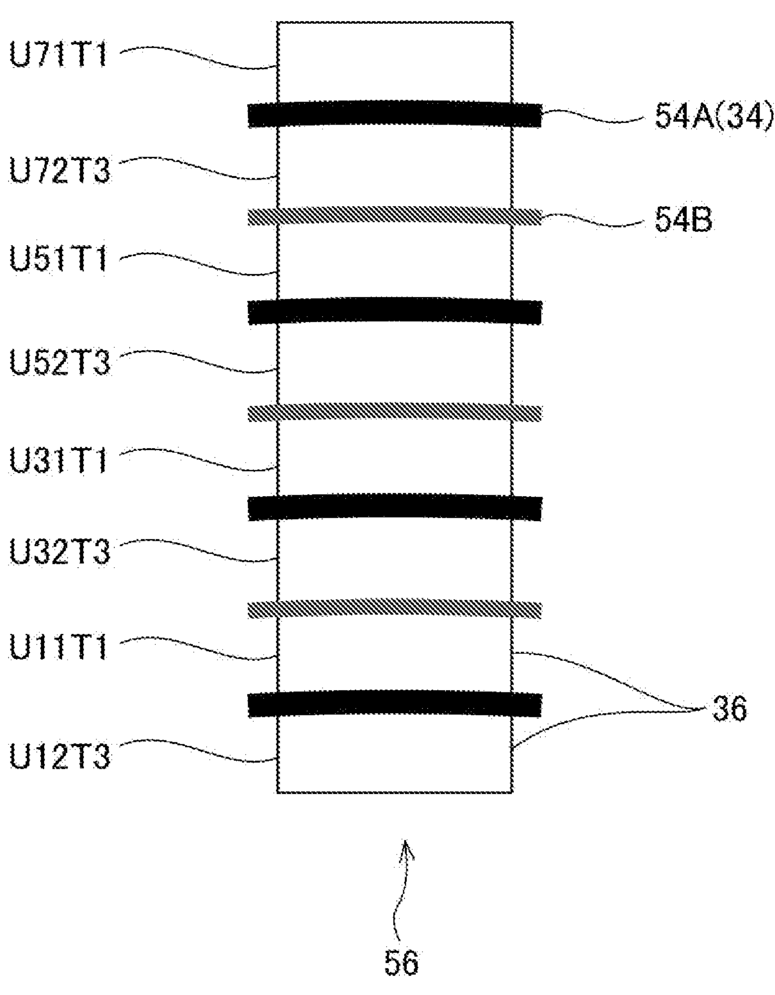

In the motor according to the second embodiment described above, the U-phase coils 16 are arranged in alignment with one another in the circumferential direction and all physically wound in one direction. Moreover, the U-phase coils 16 are connected so that when the U-phase coils 16 are energized, the U-phase coils 16 function identically to left-handed U-phase coils and right-handed U-phase coils which are arranged alternately in the circumferential direction. In addition, the V-phase coils 16 and the W-phase coils 16 are also configured in the same manner as the U-phase coils 16. Consequently, in the present embodiment, as shown in FIG. 20, it becomes possible to reduce the electric potential differences between the radially-laminated vertical portions 36 of the coils 16 in the vertical-portion laminates 56. Thus, it becomes possible to improve the reliability of electrical insulation between the radially-laminated vertical portions 36 of the coils 16 in the vertical-portion laminates 56. As a result, it becomes possible to reduce the thicknesses of the first and second insulating layers 54A and 54B.

Specifically, in FIG. 20, there is shown a vertical-portion laminate 56 in which U12T3 is located at the radially inner end. As shown in FIG. 20, even though the vertical portions 36 having different turn numbers (T1 to T3) are arranged adjacent to each other in the radial direction, it still becomes possible to reduce the electric potential differences between the radially-laminated vertical portions 36, such as the electric potential difference between U12T3 and U11T1, in comparison with the motor 10 according to the first embodiment. Moreover, compared to the motor 10 according to the first embodiment, it also becomes possible to shorten the distances between the coils connected with each other; thus, it becomes possible to lower the electrical resistances between the coils and reduce the space for connecting the coils.

Third Embodiment

Next, a motor according to the third embodiment will be described. It should be noted that: members and parts of the motor according to the third embodiment corresponding to those of the motor 10 according to the first embodiment are designated by the same reference signs as the corresponding members and parts of the motor 10 according to the first embodiment; and description of these parts and members will be omitted hereinafter.

Figure 21:
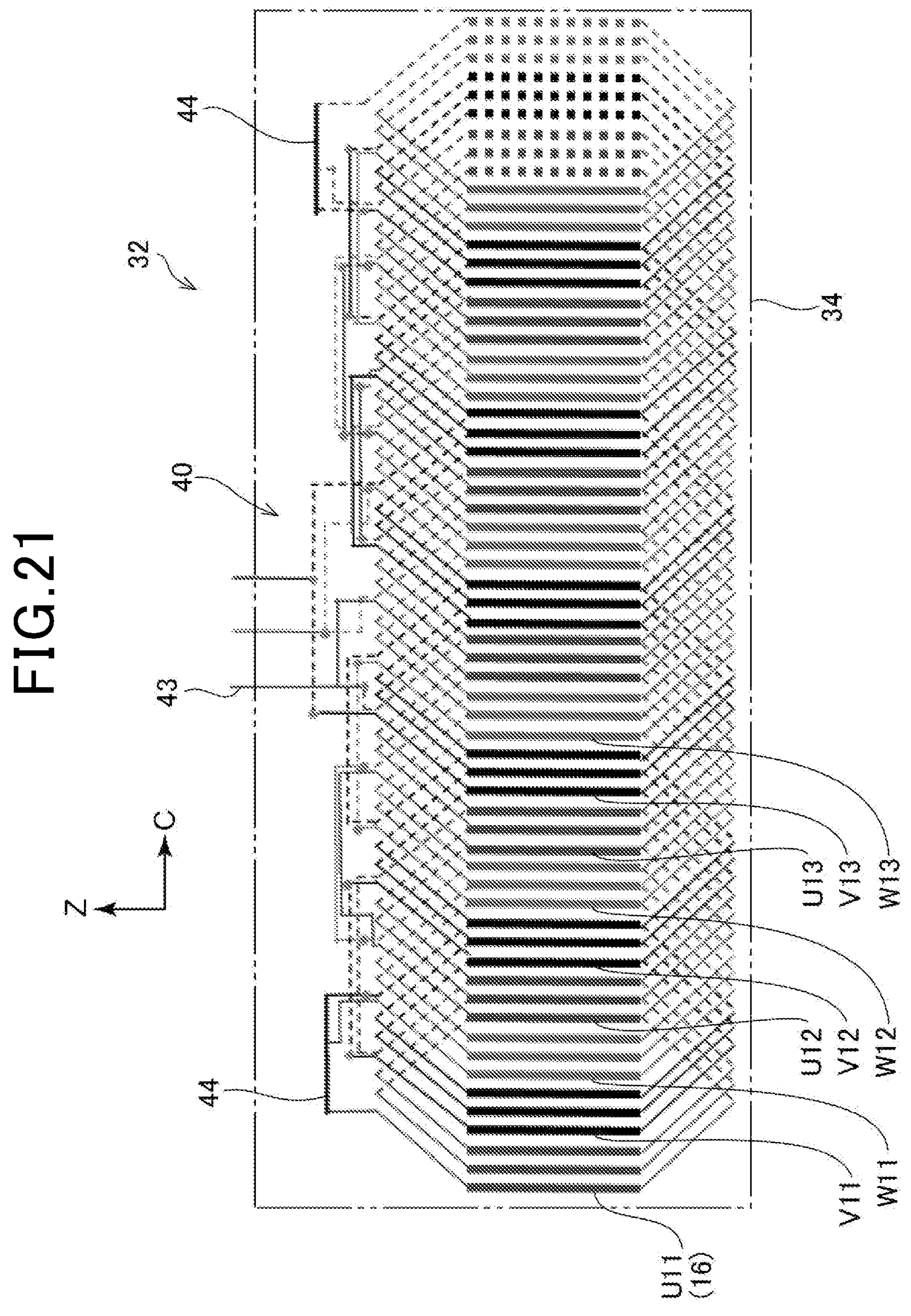
FIG. 21 is a development of a coil assembly of a motor according to a third embodiment.

FIG. 21, which corresponds to FIG. 18, shows a coil assembly 32 of the motor according to the third embodiment. As shown in FIG. 21, the configuration of the coil assembly 32 of the motor according to the present embodiment is identical to that of the coil assembly 32 (see FIG. 18) of the motor according to the second embodiment, except that the positions of the connection portions 43 and the positions of the neutral point 44 are exchanged. As above, the positions of the neutral point 44 and the connection portions 43 may be set properly in consideration of the positional relationship between the motor and the control unit to which the connection portions 43 are connected.

Fourth Embodiment

Next, a motor according to the fourth embodiment will be described. It should be noted that: members and parts of the motor according to the fourth embodiment corresponding to those of the motor 10 according to the first embodiment are designated by the same reference signs as the corresponding members and parts of the motor 10 according to the first embodiment; and description of these parts and members will be omitted hereinafter.

Figure 22:
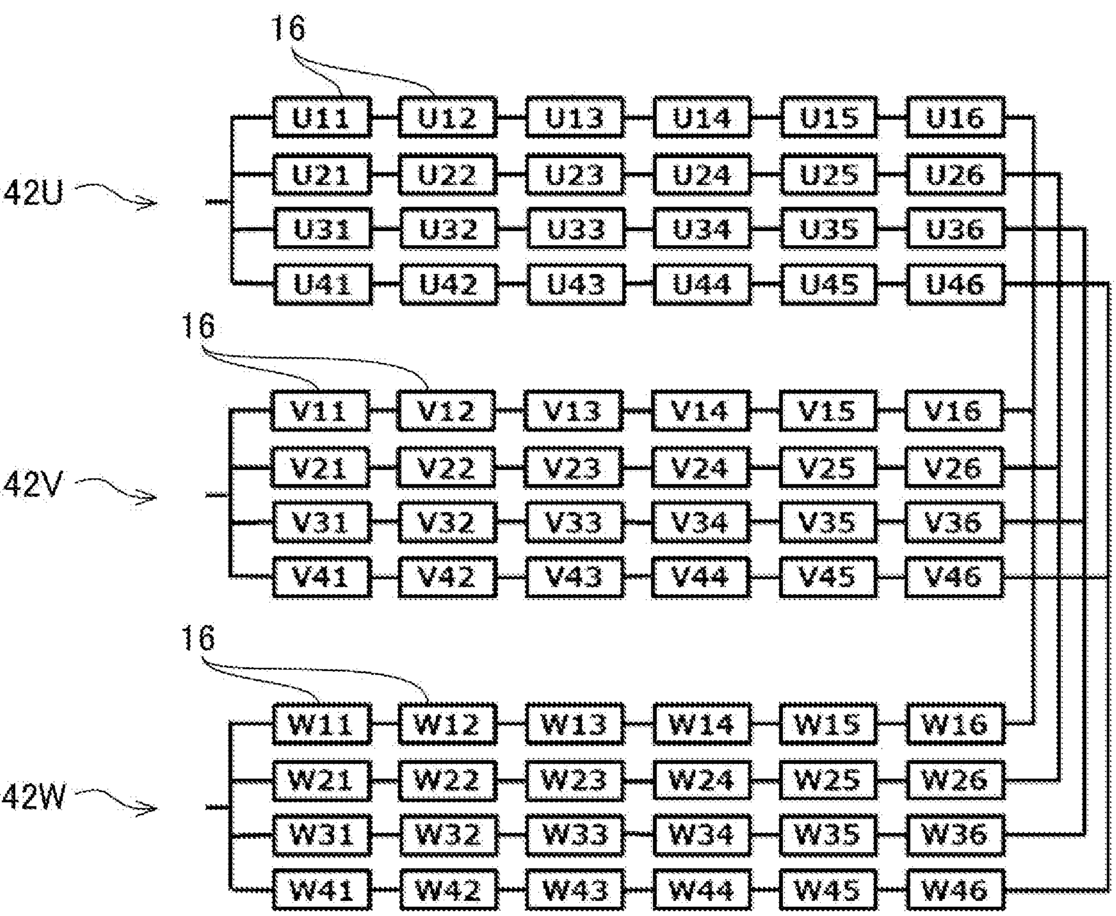
FIG. 22 is a diagram illustrating connection of a plurality of coils of a motor according to a fourth embodiment.

As shown in FIG. 22, in a coil assembly 32 of the motor according to the fourth embodiment, twenty-four coils 16 constituting a U-phase coil group 42U, twenty-four coils 16 constituting a V-phase coil group 42V and twenty-four coils 16 constituting a W-phase coil group 42W are star-connected.

Hereinafter, the twenty-four coils 16 constituting the U-phase coil group 42U will be designated respectively by reference signs U11, U12, U13, U14, U15, U16, U21, U22, U23, U24, U25, U26, U31, U32, U33, U34, U35, U36, U41, U42, U43, U44, U45 and U46.

Moreover, the twenty-four coils 16 constituting the V-phase coil group 42V will be designated respectively by reference signs V11, V12, V13, V14, V15, V16, V21, V22, V23, V24, V25, V26, V31, V32, V33, V34, V35, V36, V41, V42, V43, V44, V45 and V46.

Furthermore, the twenty-four coils 16 constituting the W-phase coil group 42W will be designated respectively by reference signs W11, W12, W13, W14, W15, W16, W21, W22, W23, W24, W25, W26, W31, W32, W33, W34, W35, W36, W41, W42, W43, W44, W45 and W46.

It should be noted that in the following explanation, specific coils 16 will be represented only by the reference signs depending on the situation.

The U-phase coils U11, U12, U13, U14, U15 and U16 are connected in series with each other. The U-phase coils U21, U22, U23, U24, U25 and U26 are connected in series with each other. The U-phase coils U31, U32, U33, U34, U35 and U36 are connected in series with each other. The U-phase coils U41, U42, U43, U44, U45 and U46 are connected in series with each other.

Moreover, an end of the U-phase coil U11 on a side not connected to the U-phase coil U12, an end of the U-phase coil U21 on a side not connected to the U-phase coil U22, an end of the U-phase coil U31 on a side not connected to the U-phase coil U32 and an end of the U-phase coil U41 on a side not connected to the U-phase coil U42 are connected with each other.

The V-phase coils V11, V12, V13, V14, V15 and V16 are connected in series with each other. The V-phase coils V21, V22, V23, V24, V25 and V26 are connected in series with each other. The V-phase coils V31, V32, V33, V34, V35 and V36 are connected in series with each other. The V-phase coils V41, V42, V43, V44, V45 and V46 are connected in series with each other.

Moreover, an end of the V-phase coil V11 on a side not connected to the V-phase coil V12, an end of the V-phase coil V21 on a side not connected to the V-phase coil V22, an end of the V-phase coil V31 on a side not connected to the V-phase coil V32 and an end of the V-phase coil V41 on a side not connected to the V-phase coil V42 are connected with each other.

The W-phase coils W11, W12, W13, W14, W15 and W16 are connected in series with each other. The W-phase coils W21, W22, W23, W24, W25 and W26 are connected in series with each other. The W-phase coils W31, W32, W33, W34, W35 and W36 are connected in series with each other. The W-phase coils W41, W42, W43, W44, W45 and W46 are connected in series with each other.

Moreover, an end of the W-phase coil W11 on a side not connected to the W-phase coil W12, an end of the W-phase coil W21 on a side not connected to the W-phase coil W22, an end of the W-phase coil W31 on a side not connected to the W-phase coil W32 and an end of the W-phase coil W41 on a side not connected to the W-phase coil W42 are connected with each other.

An end of the U-phase coil U16 on a side not connected to the U-phase coil U15, an end of the V-phase coil V16 on a side not connected to the V-phase coil V15 and an end of the W-phase coil W16 on a side not connected to the W-phase coil W15 are connected with each other.

An end of the U-phase coil U26 on a side not connected to the U-phase coil U25, an end of the V-phase coil V26 on a side not connected to the V-phase coil V25 and an end of the W-phase coil W26 on a side not connected to the W-phase coil W25 are connected with each other.

An end of the U-phase coil U36 on a side not connected to the U-phase coil U35, an end of the V-phase coil V36 on a side not connected to the V-phase coil V35 and an end of the W-phase coil W36 on a side not connected to the W-phase coil W35 are connected with each other.

An end of the U-phase coil U46 on a side not connected to the U-phase coil U45, an end of the V-phase coil V46 on a side not connected to the V-phase coil V45 and an end of the W-phase coil W46 on a side not connected to the W-phase coil W45 are connected with each other.

Figure 23:
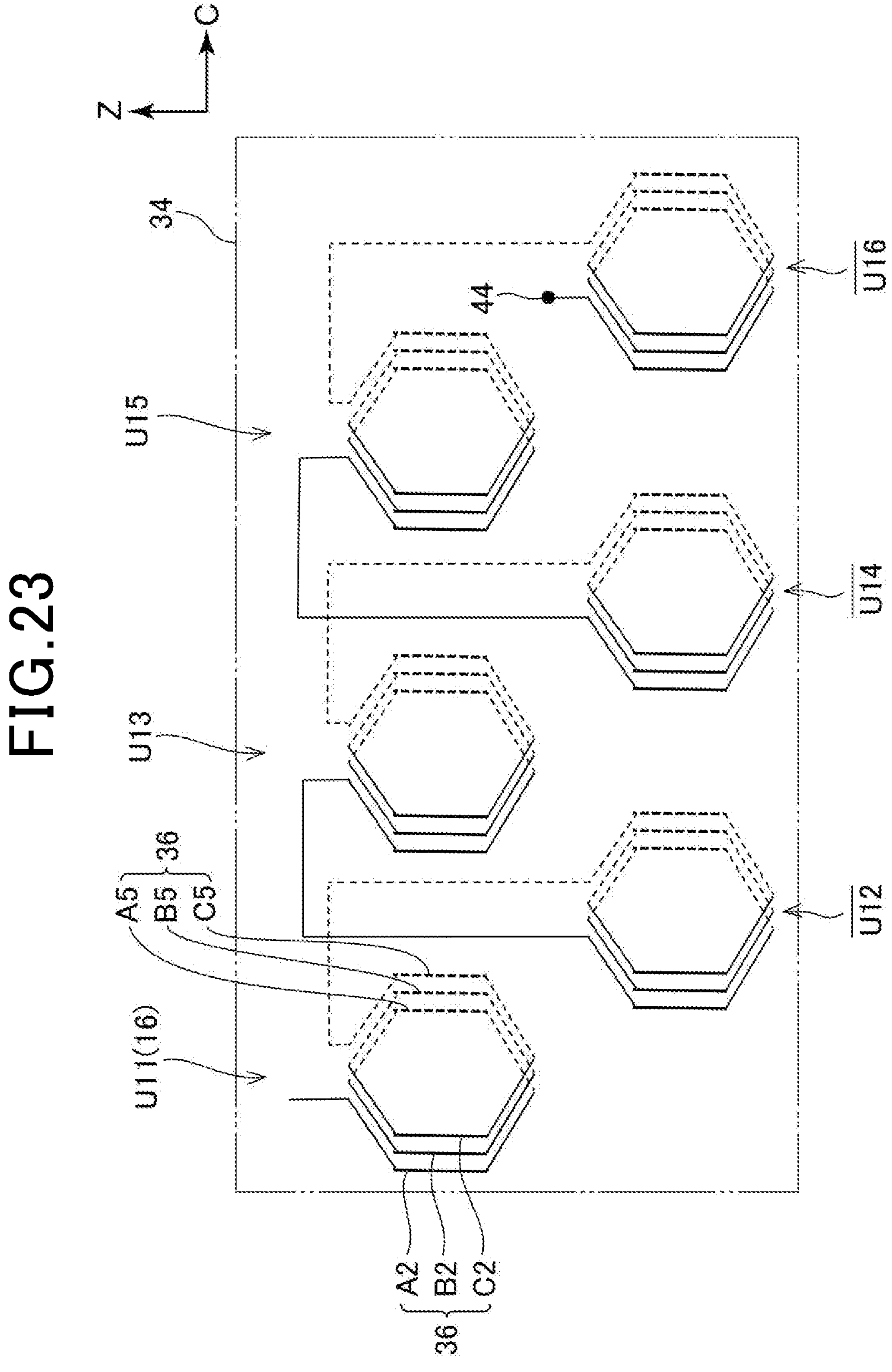
FIG. 23 is a schematic view showing U-phase coil subgroups offset from each other in an axial direction.

FIG. 23, which corresponds to FIG. 19, shows six U-phase coils 16 formed on the first lap of the band member 34. As shown in FIG. 23, in the present embodiment, the fifth straight portion A5, the fifth straight portion B5 and the fifth straight portion C5 of the U-phase coil U11 are located respectively at the same circumferential positions as the second straight portion A2, the second straight portion B2 and the second straight portion C2 of the U-phase coil U12. That is, the fifth straight portion A5, the fifth straight portion B5 and the fifth straight portion C5 of the U-phase coil U11 respectively overlap the second straight portion A2, the second straight portion B2 and the second straight portion C2 of the U-phase coil U12 via the band member 34.

Moreover, the fifth straight portion A5, the fifth straight portion B5 and the fifth straight portion C5 of the U-phase coil U12 are located respectively at the same circumferential positions as the second straight portion A2, the second straight portion B2 and the second straight portion C2 of the U-phase coil U13. That is, the fifth straight portion A5, the fifth straight portion B5 and the fifth straight portion C5 of the U-phase coil U12 respectively overlap the second straight portion A2, the second straight portion B2 and the second straight portion C2 of the U-phase coil U13 via the band member 34.

Furthermore, the fifth straight portion A5, the fifth straight portion B5 and the fifth straight portion C5 of the U-phase coil U13 are located respectively at the same circumferential positions as the second straight portion A2, the second straight portion B2 and the second straight portion C2 of the U-phase coil U14. That is, the fifth straight portion A5, the fifth straight portion B5 and the fifth straight portion C5 of the U-phase coil U13 respectively overlap the second straight portion A2, the second straight portion B2 and the second straight portion C2 of the U-phase coil U14 via the band member 34.

Furthermore, the fifth straight portion A5, the fifth straight portion B5 and the fifth straight portion C5 of the U-phase coil U14 are located respectively at the same circumferential positions as the second straight portion A2, the second straight portion B2 and the second straight portion C2 of the U-phase coil U15. That is, the fifth straight portion A5, the fifth straight portion B5 and the fifth straight portion C5 of the U-phase coil U14 respectively overlap the second straight portion A2, the second straight portion B2 and the second straight portion C2 of the U-phase coil U15 via the band member 34.

Furthermore, the fifth straight portion A5, the fifth straight portion B5 and the fifth straight portion C5 of the U-phase coil U15 are located respectively at the same circumferential positions as the second straight portion A2, the second straight portion B2 and the second straight portion C2 of the U-phase coil U16. That is, the fifth straight portion A5, the fifth straight portion B5 and the fifth straight portion C5 of the U-phase coil U15 respectively overlap the second straight portion A2, the second straight portion B2 and the second straight portion C2 of the U-phase coil U16 via the band member 34.

The U-phase coils U11, U12, U13, U14, U15 and U16 described above are arranged in this order on the first lap of the rolled band member 34. That is, the U-phase coils U11, U12, U13, U14, U15 and U16 are arranged in this order on the closest layer of the rolled band member 34 to the rotor 12.

In the motor according to the present embodiment, the sixth straight portion C6 of the U-phase coil U11 and the sixth straight portion C6 of the U-phase coil U12 are connected with each other. The first straight portion A1 of the U-phase coil U12 and the first straight portion A1 of the U-phase coil U13 are connected with each other. The sixth straight portion C6 of the U-phase coil U13 and the sixth straight portion C6 of the U-phase coil U14 are connected with each other. The first straight portion A1 of the U-phase coil U14 and the first straight portion A1 of the U-phase coil U15 are connected with each other. The sixth straight portion C6 of the U-phase coil U15 and the sixth straight portion C6 of the U-phase coil U16 are connected with each other.

Although not shown in the drawings, the U-phase coils U21, U22, U23, U24, U25 and U26 are arranged on the second lap of the band member 34 in the same manner as the U-phase coils U11, U12, U13, U14, U15 and U16 arranged on the first lap of the band member 34. Moreover, the U-phase coils U31, U32, U33, U34, U35 and U36 are arranged on the third lap of the band member 34 in the same manner as the U-phase coils U11, U12, U13, U14, U15 and U16 arranged on the first lap of the band member 34. Furthermore, the U-phase coils U41, U42, U43, U44, U45 and U46 are arranged on the fourth lap of the band member 34 in the same manner as the U-phase coils U11, U12, U13, U14, U15 and U16 arranged on the first lap of the band member 34.

Figure 24:
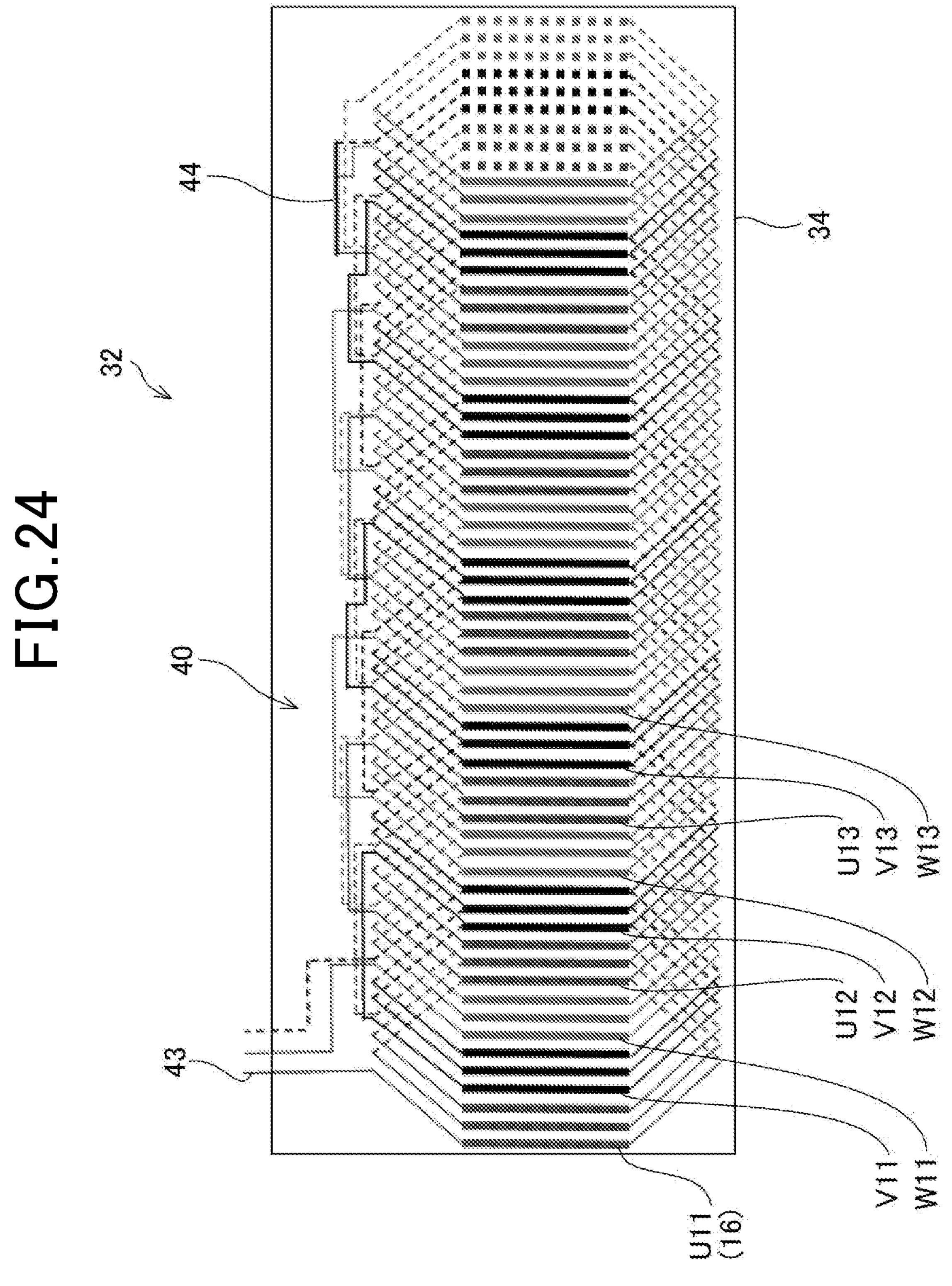
FIG. 24 is a development of a coil assembly.

As shown in FIGS. 22, 23 and 24, the V-phase coils V11 to V46 are also arranged on the band member 34 in the same manner as the U-phase coils U11 to U46. Moreover, the W-phase coils W11 to W46 are also arranged on the band member 34 in the same manner as the U-phase coils U11 to U46. However, the V-phase coils V11 to V46 are connected so that the winding direction of the V-phase coils is opposite to those of the U-phase coils and the W-phase coils. In addition, FIG. 24, which corresponds to FIG. 18, shows the coil assembly 32 of the motor according to the fourth embodiment.

In the motor according to the fourth embodiment described above, the number of coils 16 connected in series with each other in each phase is increased in comparison with the motors according to the previous embodiments. Consequently, in the motor according to the fourth embodiment, it becomes possible to improve the output characteristics at low rotational speeds in comparison with the motors according to the previous embodiments.

Moreover, in the motor according to the fourth embodiment, the number of circuits connected in parallel with each other is reduced in comparison with the motors according to the previous embodiments. Consequently, in the motor according to the fourth embodiment, it becomes possible to achieve an effect equivalent to a reduction in the total cross-sectional area of the vertical-portion laminates 56 (not shown in the present embodiment, but see FIG. 20 and the like) in comparison with the motors according to the previous embodiments. As a result, it becomes possible for the motor according to the fourth embodiment to have low-current specifications in comparison with the motors according to the previous embodiments.

Fifth Embodiment

Next, a motor according to the fifth embodiment will be described. It should be noted that: members and parts of the motor according to the fifth embodiment corresponding to those of the motor 10 according to the first embodiment are designated by the same reference signs as the corresponding members and parts of the motor 10 according to the first embodiment; and description of these parts and members will be omitted hereinafter.

Figure 25:
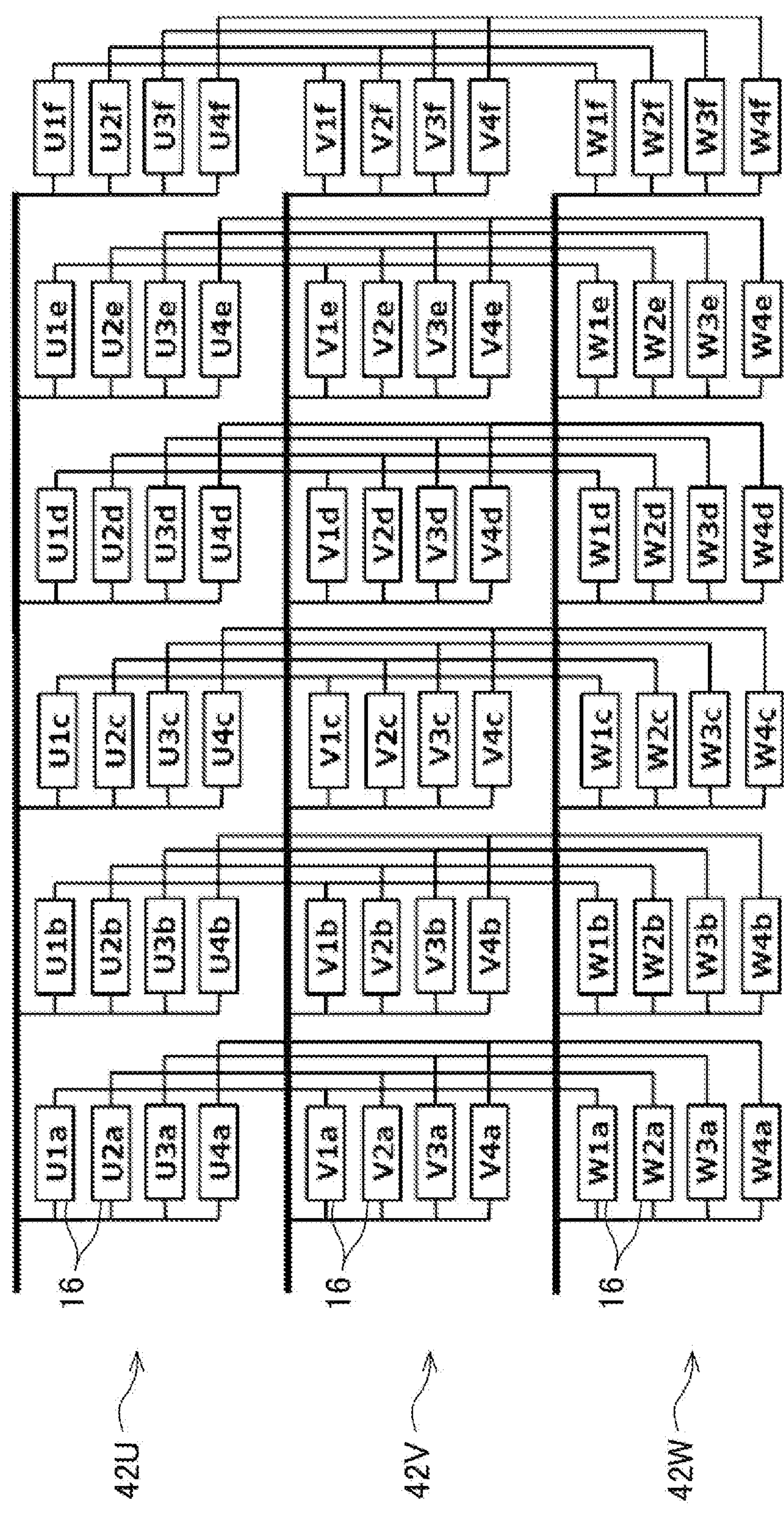
FIG. 25 is a diagram illustrating connection of a plurality of coils of a motor according to a fifth embodiment.

As shown in FIG. 25, in a coil assembly 32 of the motor according to the fifth embodiment, twenty-four coils 16 constituting a U-phase coil group 42U, twenty-four coils 16 constituting a V-phase coil group 42V and twenty-four coils 16 constituting a W-phase coil group 42W are star-connected. Moreover, in the motor according to the fifth embodiment, none of the coils 16 are connected in series with the other coils 16.

Hereinafter, the twenty-four coils 16 constituting the U-phase coil group 42U will be designated respectively by reference signs U1*a*, U1*b*, U1*c*, U1*d*, U1*e*, U1*f*, U2*a*, U2*b*, U2*c*, U2*d*, U2*e*, U2*f*, U3*a*, U3*b*, U3*c*, U3*d*, U3*e*, U3*f*, U4*a*, U4*b*, U4*c*, U4*d*, U4*e* and U4*f*.

Moreover, the twenty-four coils 16 constituting the V-phase coil group 42V will be designated respectively by reference signs V1*a*, V1*b*, V1*c*, V1*d*, V1*e*, V1*f*, V2*a*, V2*b*, V2*c*, V2*d*, V2*e*, V2*f*, V3*a*, V3*b*, V3*c*, V3*d*, V3*e*, V3*f*, V4*a*, V4*b*, V4*c*, V4*d*, V4*e* and V4*f*.

Furthermore, the twenty-four coils 16 constituting the W-phase coil group 42W will be designated respectively by reference signs W1*a*, W1*b*, W1*c*, W1*d*, W1*e*, W1*f*, W2*a*, W2*b*, W2*c*, W2*d*, W2*e*, W2*f*, W3*a*, W3*b*, W3*c*, W3*d*, W3*e*, W3*f*, W4*a*, W4*b*, W4*c*, W4*d*, W4*e* and W4*f*.

It should be noted that in the following explanation, specific coils 16 will be represented only by the reference signs depending on the situation.

A first end of the U-phase coil U1*a*, a first end of the U-phase coil U2*a*, a first end of the U-phase coil U3*a* and a first end of the U-phase coil U4*a* are connected with each other and together connected to a U-phase connection portion 43. A first end of the V-phase coil V1*a*, a first end of the V-phase coil V2*a*, a first end of the V-phase coil V3*a* and a first end of the V-phase coil V4*a* are connected with each other and together connected to a V-phase connection portion 43. A first end of the W-phase coil W1*a*, a first end of the W-phase coil W2*a*, a first end of the W-phase coil W3*a* and a first end of the W-phase coil W4*a* are connected with each other and together connected to a W-phase connection portion 43.

A second end of the U-phase coil U1*a*, a second end of the V-phase coil V1*a* and a second end of the W-phase coil W1*a* are connected with each other. A second end of the U-phase coil U2*a*, a second end of the V-phase coil V2*a* and a second end of the W-phase coil W2*a* are connected with each other. A second end of the U-phase coil U3*a*, a second end of the V-phase coil V3*a* and a second end of the W-phase coil W3*a* are connected with each other. A second end of the U-phase coil U4*a*, a second end of the V-phase coil V4*a* and a second end of the W-phase coil W4*a* are connected with each other.

The coils U1*b*, U2*b*, U3*b*, U4*b*, V1*b*, V2*b*, V3*b*, V4*b*, W1*b*, W2*b*, W3*b* and W4*b* are connected in the same manner as the above-described coils U1*a*, U2*a*, U3*a*, U4*a*, V1*a*, V2*a*, V3*a*, V4*a*, W1*a*, W2*a*, W3*a* and W4*a*.

The coils U1*c*, U2*c*, U3*c*, U4*c*, V1*c*, V2*c*, V3*c*, V4*c*, W1*c*, W2*c*, W3*c* and W4*c* are also connected in the same manner as the above-described coils U1*a*, U2*a*, U3*a*, U4*a*, V1*a*, V2*a*, V3*a*, V4*a*, W1*a*, W2*a*, W3*a* and W4*a*.

The coils U1*d*, U2*d*, U3*d*, U4*d*, V1*d*, V2*d*, V3*d*, V4*d*, W1*d*, W2*d*, W3*d* and W4*d* are also connected in the same manner as the above-described coils U1*a*, U2*a*, U3*a*, U4*a*, V1*a*, V2*a*, V3*a*, V4*a*, W1*a*, W2*a*, W3*a* and W4*a*.

The coils U1*e*, U2*e*, U3*e*, U4*e*, V1*e*, V2*e*, V3*e*, V4*e*, W1*e*, W2*e*, W3*e* and W4*e* are also connected in the same manner as the above-described coils U1*a*, U2*a*, U3*a*, U4*a*, V1*a*, V2*a*, V3*a*, V4*a*, W1*a*, W2*a*, W3*a* and W4*a*.

The coils U1*f*, U2*f*, U3*f*, U4*f*, V1*f*, V2*f*, V3*f*, V4*f*, W1*f*, W2*f*, W3*f* and W4*f* are also connected in the same manner as the above-described coils U1*a*, U2*a*, U3*a*, U4*a*, V1*a*, V2*a*, V3*a*, V4*a*, W1*a*, W2*a*, W3*a* and W4*a*.

Figure 26:
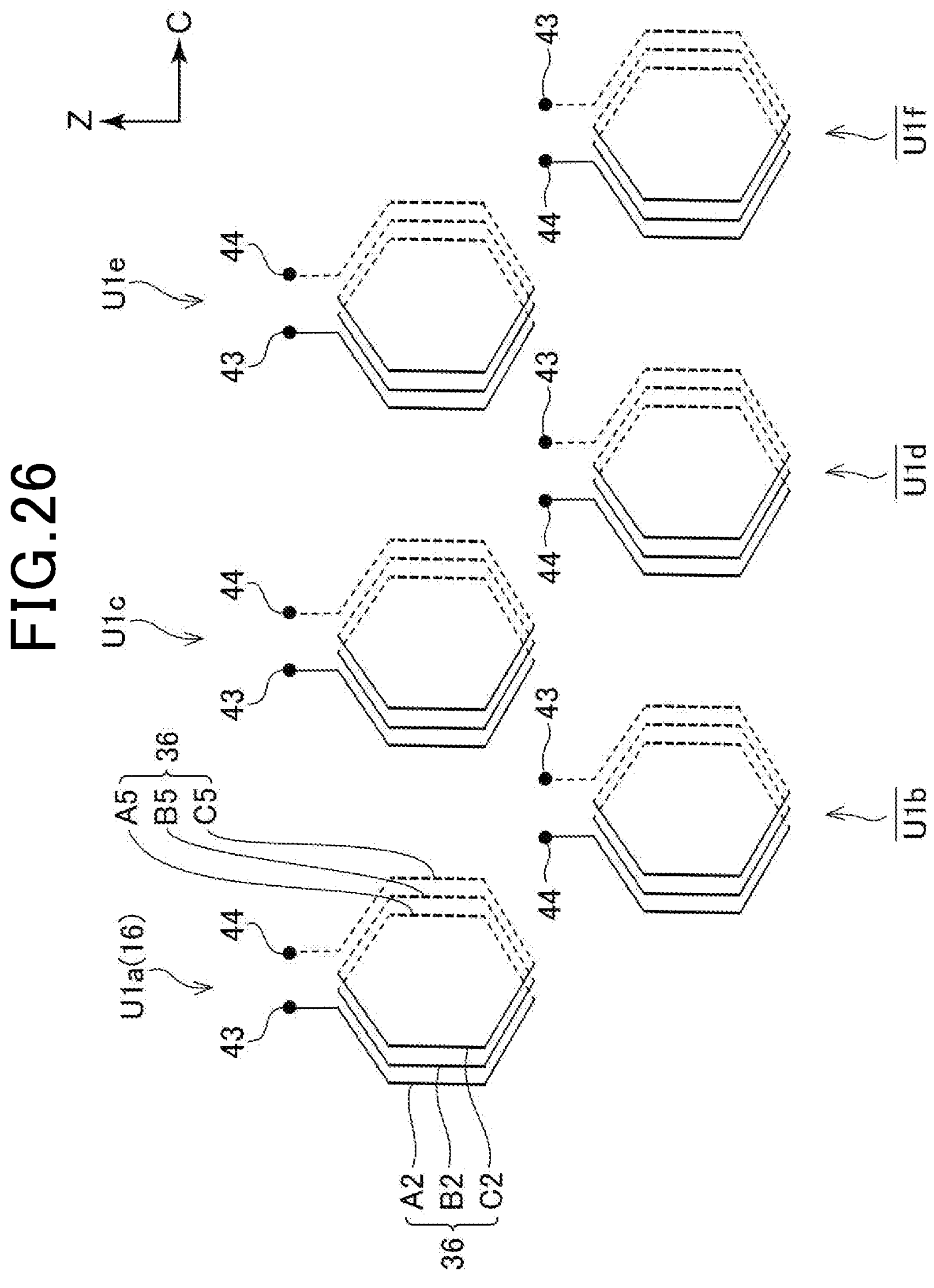
FIG. 26 is a schematic view showing U-phase coil subgroups offset from each other in an axial direction.

FIG. 26, which corresponds to FIG. 19, shows six U-phase coils 16 formed on the first lap of the band member 34. As shown in FIG. 26, in the present embodiment, the fifth straight portion A5, the fifth straight portion B5 and the fifth straight portion C5 of the U-phase coil U1*a* are located respectively at the same circumferential positions as the second straight portion A2, the second straight portion B2 and the second straight portion C2 of the U-phase coil U1*b*. That is, the fifth straight portion A5, the fifth straight portion B5 and the fifth straight portion C5 of the U-phase coil U1*a* respectively overlap the second straight portion A2, the second straight portion B2 and the second straight portion C2 of the U-phase coil U1*b* via the band member 34.

Moreover, the fifth straight portion A5, the fifth straight portion B5 and the fifth straight portion C5 of the U-phase coil U1*b* are located respectively at the same circumferential positions as the second straight portion A2, the second straight portion B2 and the second straight portion C2 of the U-phase coil U1*c*. That is, the fifth straight portion A5, the fifth straight portion B5 and the fifth straight portion C5 of the U-phase coil U1*b* respectively overlap the second straight portion A2, the second straight portion B2 and the second straight portion C2 of the U-phase coil U1*c* via the band member 34.

Furthermore, the fifth straight portion A5, the fifth straight portion B5 and the fifth straight portion C5 of the U-phase coil U1*c* are located respectively at the same circumferential positions as the second straight portion A2, the second straight portion B2 and the second straight portion C2 of the U-phase coil U1*d*. That is, the fifth straight portion A5, the fifth straight portion B5 and the fifth straight portion C5 of the U-phase coil U1*c* respectively overlap the second straight portion A2, the second straight portion B2 and the second straight portion C2 of the U-phase coil U1*d* via the band member 34.

Furthermore, the fifth straight portion A5, the fifth straight portion B5 and the fifth straight portion C5 of the U-phase coil U1*d* are located respectively at the same circumferential positions as the second straight portion A2, the second straight portion B2 and the second straight portion C2 of the U-phase coil U1*e*. That is, the fifth straight portion A5, the fifth straight portion B5 and the fifth straight portion C5 of the U-phase coil U1*d* respectively overlap the second straight portion A2, the second straight portion B2 and the second straight portion C2 of the U-phase coil U1*e* via the band member 34.

Furthermore, the fifth straight portion A5, the fifth straight portion B5 and the fifth straight portion C5 of the U-phase coil U1*e* are located respectively at the same circumferential positions as the second straight portion A2, the second straight portion B2 and the second straight portion C2 of the U-phase coil U1*f*. That is, the fifth straight portion A5, the fifth straight portion B5 and the fifth straight portion C5 of the U-phase coil U1*e* respectively overlap the second straight portion A2, the second straight portion B2 and the second straight portion C2 of the U-phase coil U1*f* via the band member 34.

The U-phase coils U1*a*, U1*b*, U1*c*, U1*d*, U1*e* and U1*f* described above are arranged in this order on the first lap of the rolled band member 34. That is, the U-phase coils U1*a*, U1*b*, U1*c*, U1*d*, U1*e* and U1*f* are arranged in this order on the closest layer of the rolled band member 34 to the rotor 12.

Although not shown in the drawings, the U-phase coils U2*a*, U2*b*, U2*c*, U2*d*, U2*e* and U2*f* are arranged on the second lap of the band member 34 in the same manner as the U-phase coils U1*a*, U1*b*, U1*c*, U1*d*, U1*e* and U1*f* arranged on the first lap of the band member 34. Moreover, the U-phase coils U3*a*, U3*b*, U3*c*, U3*d*, U3*e* and U3*f* are arranged on the third lap of the band member 34 in the same manner as the U-phase coils U1*a*, U1*b*, U1*c*, U1*d*, U1*e* and U1*f* arranged on the first lap of the band member 34. Furthermore, the U-phase coils U4*a*, U4*b*, U4*c*, U4*d*, U4*e* and U4*f* are arranged on the fourth lap of the band member 34 in the same manner as the U-phase coils U1*a*, U1*b*, U1*c*, U1*d*, U1*e* and U1*f* arranged on the first lap of the band member 34.

Figure 27:
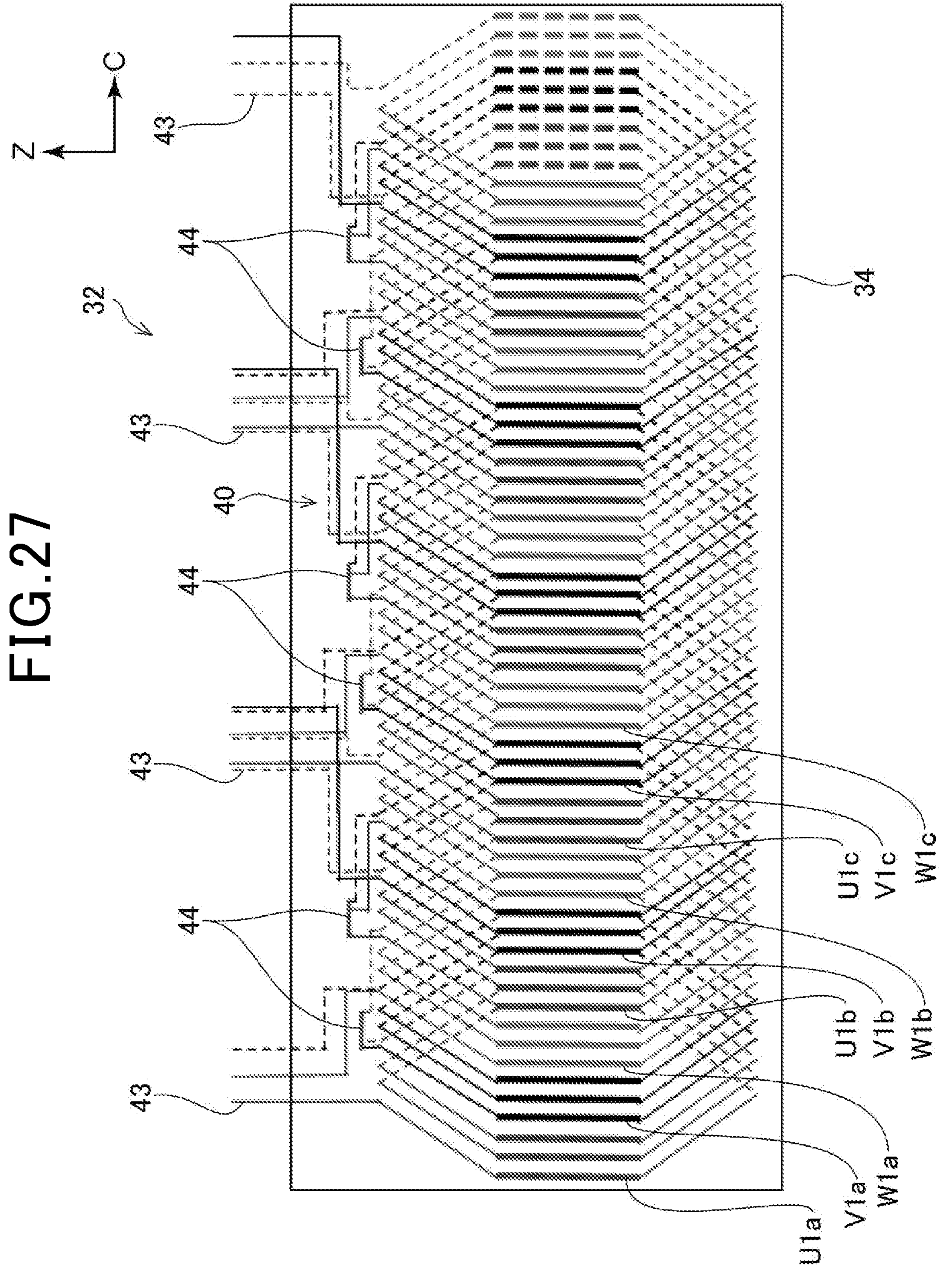
FIG. 27 is a development of a coil assembly.

As shown in FIGS. 25, 26 and 27, the V-phase coils V1*a* to V4*f* are also arranged on the band member 34 in the same manner as the U-phase coils U1*a* to U4*f*. Moreover, the W-phase coils W1*a* to W4*f* are also arranged on the band member 34 in the same manner as the U-phase coils U1*a* to U4*f*. However, the V-phase coils V1*a* to V4*f* are connected so that the winding direction of the V-phase coils is opposite to those of the U-phase coils and the W-phase coils. In addition, FIG. 27, which corresponds to FIG. 18, shows the coil assembly 32 of the motor according to the fifth embodiment.

In the motor according to the fifth embodiment described above, none of the coils 16 are connected in series with the other coils 16 in each phase, unlike in the motors according to the previous embodiments. Consequently, in the motor according to the fifth embodiment, it becomes possible to reduce the cross-sectional area of each of the vertical-portion laminates 56 (not shown in the present embodiment, but see FIG. 20 and the like) in comparison with the motors according to the previous embodiments. As a result, in the motor according to the fifth embodiment, it becomes possible to reduce the area of each of the vertical-portion laminates 56 facing the magnets 18 of the rotor 12 and thereby effectively suppress eddy current generated in the vertical-portion laminates 56, in comparison with the motors according to the previous embodiments.

Sixth Embodiment

Next, a motor according to the sixth embodiment will be described. It should be noted that: members and parts of the motor according to the sixth embodiment corresponding to those of the motor 10 according to the first embodiment are designated by the same reference signs as the corresponding members and parts of the motor 10 according to the first embodiment; and description of these parts and members will be omitted hereinafter.

Figure 28:
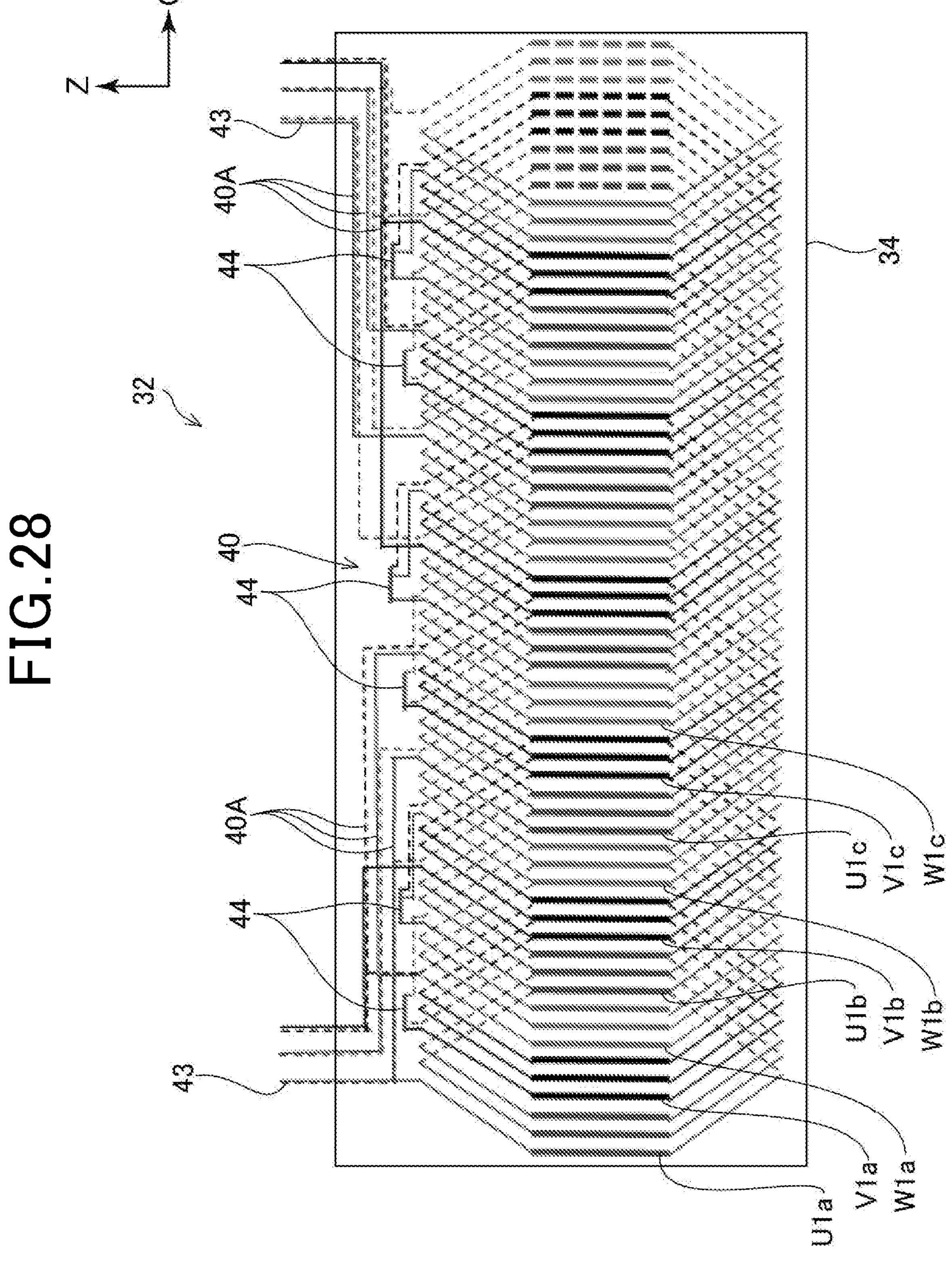
FIG. 28 is a development of a coil assembly of a motor according to a sixth embodiment.

FIG. 28, which corresponds to FIG. 27, shows a coil assembly 32 of the motor according to the sixth embodiment. As shown in FIG. 28, the configuration of the coil assembly 32 of the motor according to the sixth embodiment is identical to that of the coil assembly 32 (see FIG. 27) of the motor according to the fifth embodiment, except that corresponding connection portions 43 of the connection pattern section 40 are joined together via a corresponding one of joining portions 40A. Consequently, in the motor according to the sixth embodiment, it becomes possible to prevent the configuration of the connection pattern section 40 on the side of the connection portions 43 from becoming complicated in comparison with the motor according to the fifth embodiment.

Seventh Embodiment

Next, a motor according to the seventh embodiment will be described. It should be noted that: members and parts of the motor according to the seventh embodiment corresponding to those of the motor 10 according to the first embodiment are designated by the same reference signs as the corresponding members and parts of the motor 10 according to the first embodiment; and description of these parts and members will be omitted hereinafter.

Figure 29:
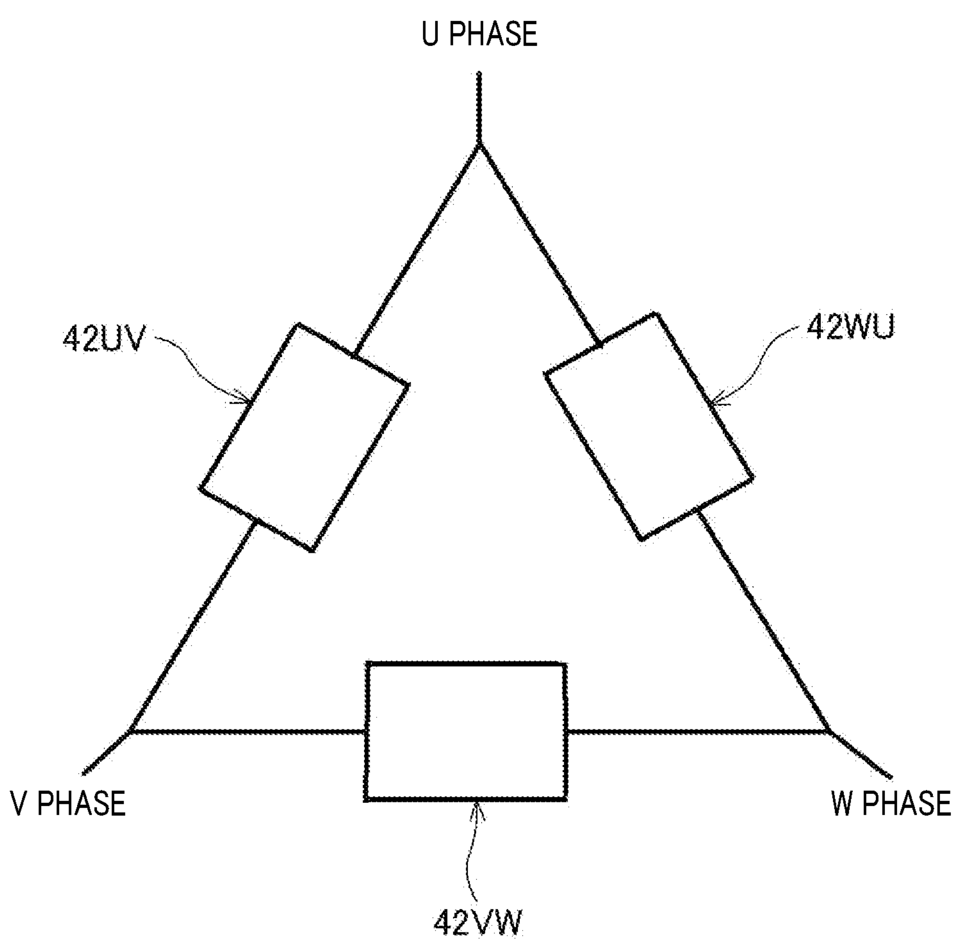
FIG. 29 is a diagram illustrating a delta connection of a motor according to a seventh embodiment.
Figure 30:
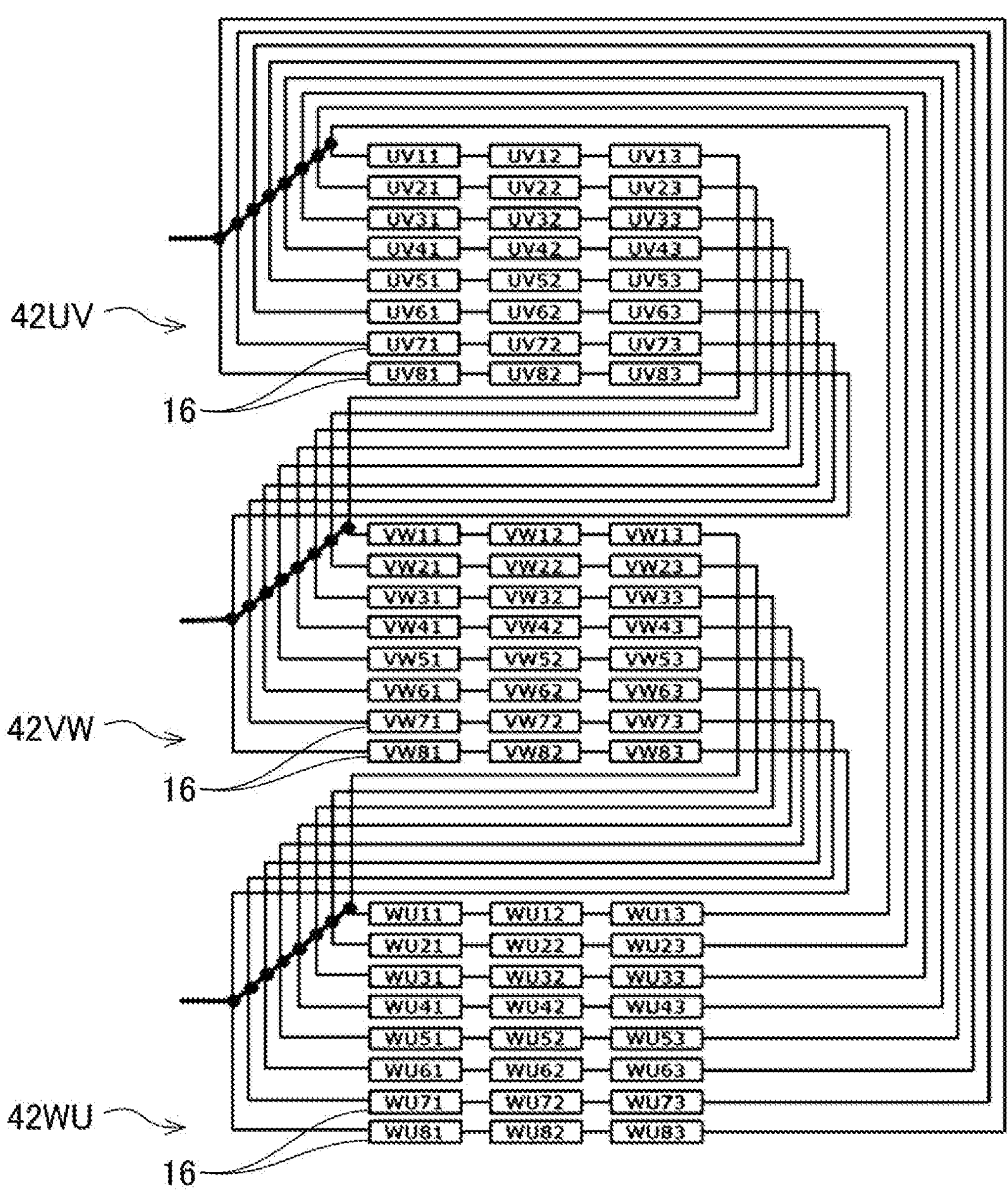
FIG. 30 is a diagram illustrating connection of a plurality of coils.

As shown in FIG. 29, in the motor according to the seventh embodiment, a plurality of coils 16 constituting the UV phase (or UV-phase coil group 42UV), a plurality of coils 16 constituting the VW phase (or VW-phase coil group 42VW) and a plurality of coils 16 constituting the WU phase (or WU-phase coil group 42WU) are delta-connected. Specifically, as shown in FIG. 30, twenty-four coils 16 constituting the UV-phase coil group 42UV, twenty-four coils 16 constituting the VW-phase coil group 42VW and twenty-four coils 16 constituting the WU-phase coil group 42WU are delta-connected.

Hereinafter, the twenty-four coils 16 constituting the UV-phase coil group 42UV will be designated respectively by reference signs UV11, UV12, UV13, UV21, UV22, UV23, UV31, UV32, UV33, UV41, UV42, UV43, UV51, UV52, UV53, UV61, UV62, UV63, UV71, UV72, UV73, UV81, UV82 and UV83.

Moreover, the twenty-four coils 16 constituting the VW-phase coil group 42VW will be designated respectively by reference signs VW11, VW12, VW13, VW21, VW22, VW23, VW31, VW32, VW33, VW41, VW42, VW43, VW51, VW52, VW53, VW61, VW62, VW63, VW71, VW72, VW73, VW81, VW82 and VW83.

Furthermore, the twenty-four coils 16 constituting the WU-phase coil group 42WU will be designated respectively by reference signs WU11, WU12, WU13, WU21, WU22, WU23, WU31, WU32, WU33, WU41, WU42, WU43, WU51, WU52, WU53, WU61, WU62, WU63, WU71, WU72, WU73, WU81, WU82 and WU83.

It should be noted that in the following explanation, specific coils 16 will be represented only by the reference signs depending on the situation.

The UV-phase coils UV11, UV12 and UV13 are connected in series with each other. The UV-phase coils UV21, UV22 and UV23 are connected in series with each other. The UV-phase coils UV31, UV32 and UV33 are connected in series with each other. The UV-phase coils UV41, UV42 and UV43 are connected in series with each other. The UV-phase coils UV51, UV52 and UV53 are connected in series with each other. The UV-phase coils UV61, UV62 and UV63 are connected in series with each other. The UV-phase coils UV71, UV72 and UV73 are connected in series with each other. The UV-phase coils UV81, UV82 and UV83 are connected in series with each other.

Moreover, an end of the UV-phase coil UV11 on a side not connected to the UV-phase coil UV12 is connected to a U-phase connection portion 43. An end of the UV-phase coil UV21 on a side not connected to the UV-phase coil UV22 is connected to another U-phase connection portion 43. An end of the UV-phase coil UV31 on a side not connected to the UV-phase coil UV32 is connected to another U-phase connection portion 43. An end of the UV-phase coil UV41 on a side not connected to the UV-phase coil UV42 is connected to another U-phase connection portion 43. An end of the UV-phase coil UV51 on a side not connected to the UV-phase coil UV52 is connected to another U-phase connection portion 43. An end of the UV-phase coil UV61 on a side not connected to the UV-phase coil UV62 is connected to another U-phase connection portion 43. An end of the UV-phase coil UV71 on a side not connected to the UV-phase coil UV72 is connected to another U-phase connection portion 43. An end of the UV-phase coil UV81 on a side not connected to the UV-phase coil UV82 is connected to another U-phase connection portion 43.

On the other hand, an end of the UV-phase coil UV13 on a side not connected to the UV-phase coil UV12 is connected to a V-phase connection portion 43. An end of the UV-phase coil UV23 on a side not connected to the UV-phase coil UV22 is connected to another V-phase connection portion 43. An end of the UV-phase coil UV33 on a side not connected to the UV-phase coil UV32 is connected to another V-phase connection portion 43. An end of the UV-phase coil UV43 on a side not connected to the UV-phase coil UV42 is connected to another V-phase connection portion 43. An end of the UV-phase coil UV53 on a side not connected to the UV-phase coil UV52 is connected to another V-phase connection portion 43. An end of the UV-phase coil UV63 on a side not connected to the UV-phase coil UV62 is connected to another V-phase connection portion 43. An end of the UV-phase coil UV73 on a side not connected to the UV-phase coil UV72 is connected to another V-phase connection portion 43. An end of the UV-phase coil UV83 on a side not connected to the UV-phase coil UV82 is connected to another V-phase connection portion 43.

The VW-phase coils VW11, VW12 and VW13 are connected in series with each other. The VW-phase coils VW21, VW22 and VW23 are connected in series with each other. The VW-phase coils VW31, VW32 and VW33 are connected in series with each other. The VW-phase coils VW41, VW42 and VW43 are connected in series with each other. The VW-phase coils VW51, VW52 and VW53 are connected in series with each other. The VW-phase coils VW61, VW62 and VW63 are connected in series with each other. The VW-phase coils VW71, VW72 and VW73 are connected in series with each other. The VW-phase coils VW81, VW82 and VW83 are connected in series with each other.

Moreover, an end of the VW-phase coil VW11 on a side not connected to the VW-phase coil VW12 is connected to one of the V-phase connection portions 43. An end of the VW-phase coil VW21 on a side not connected to the VW-phase coil VW22 is connected to another one of the V-phase connection portions 43. An end of the VW-phase coil VW31 on a side not connected to the VW-phase coil VW32 is connected to another one of the V-phase connection portions 43. An end of the VW-phase coil VW41 on a side not connected to the VW-phase coil VW42 is connected to another one of the V-phase connection portions 43. An end of the VW-phase coil VW51 on a side not connected to the VW-phase coil VW52 is connected to another one of the V-phase connection portions 43. An end of the VW-phase coil VW61 on a side not connected to the VW-phase coil VW62 is connected to another one of the V-phase connection portions 43. An end of the VW-phase coil VW71 on a side not connected to the VW-phase coil VW72 is connected to another one of the V-phase connection portions 43. An end of the VW-phase coil VW81 on a side not connected to the VW-phase coil VW82 is connected to another one of the V-phase connection portions 43.

On the other hand, an end of the VW-phase coil VW13 on a side not connected to the VW-phase coil VW12 is connected to a W-phase connection portion 43. An end of the VW-phase coil VW23 on a side not connected to the VW-phase coil VW22 is connected to another W-phase connection portion 43. An end of the VW-phase coil VW33 on a side not connected to the VW-phase coil VW32 is connected to another W-phase connection portion 43. An end of the VW-phase coil VW43 on a side not connected to the VW-phase coil VW42 is connected to another W-phase connection portion 43. An end of the VW-phase coil VW53 on a side not connected to the VW-phase coil VW52 is connected to another W-phase connection portion 43. An end of the VW-phase coil VW63 on a side not connected to the VW-phase coil VW62 is connected to another W-phase connection portion 43. An end of the VW-phase coil VW73 on a side not connected to the VW-phase coil VW72 is connected to another W-phase connection portion 43. An end of the VW-phase coil VW83 on a side not connected to the VW-phase coil VW82 is connected to another W-phase connection portion 43.

The WU-phase coils WU11, WU12 and WU13 are connected in series with each other. The WU-phase coils WU21, WU22 and WU23 are connected in series with each other. The WU-phase coils WU31, WU32 and WU33 are connected in series with each other. The WU-phase coils WU41, WU42 and WU43 are connected in series with each other. The WU-phase coils WU51, WU52 and WU53 are connected in series with each other. The WU-phase coils WU61, WU62 and WU63 are connected in series with each other. The WU-phase coils WU71, WU72 and WU73 are connected in series with each other. The WU-phase coils WU81, WU82 and WU83 are connected in series with each other.

Moreover, an end of the WU-phase coil WU11 on a side not connected to the WU-phase coil WU12 is connected to one of the W-phase connection portions 43. An end of the WU-phase coil WU21 on a side not connected to the WU-phase coil WU22 is connected to another one of the W-phase connection portions 43. An end of the WU-phase coil WU31 on a side not connected to the WU-phase coil WU32 is connected to another one of the W-phase connection portions 43. An end of the WU-phase coil WU41 on a side not connected to the WU-phase coil WU42 is connected to another one of the W-phase connection portions 43. An end of the WU-phase coil WU51 on a side not connected to the WU-phase coil WU52 is connected to another one of the W-phase connection portions 43. An end of the WU-phase coil WU61 on a side not connected to the WU-phase coil WU62 is connected to another one of the W-phase connection portions 43. An end of the WU-phase coil WU71 on a side not connected to the WU-phase coil WU72 is connected to another one of the W-phase connection portions 43. An end of the WU-phase coil WU81 on a side not connected to the WU-phase coil WU82 is connected to another one of the W-phase connection portions 43.

On the other hand, an end of the WU-phase coil WU13 on a side not connected to the WU-phase coil WU12 is connected to one of the U-phase connection portions 43. An end of the WU-phase coil WU23 on a side not connected to the WU-phase coil WU22 is connected to another one of the U-phase connection portions 43. An end of the WU-phase coil WU33 on a side not connected to the WU-phase coil WU32 is connected to another one of the U-phase connection portions 43. An end of the WU-phase coil WU43 on a side not connected to the WU-phase coil WU42 is connected to another one of the U-phase connection portions 43. An end of the WU-phase coil WU53 on a side not connected to the WU-phase coil WU52 is connected to another one of the U-phase connection portions 43. An end of the WU-phase coil WU63 on a side not connected to the WU-phase coil WU62 is connected to another one of the U-phase connection portions 43. An end of the WU-phase coil WU73 on a side not connected to the WU-phase coil WU72 is connected to another one of the U-phase connection portions 43. An end of the WU-phase coil WU83 on a side not connected to the WU-phase coil WU82 is connected to another one of the U-phase connection portions 43.

Figure 31:
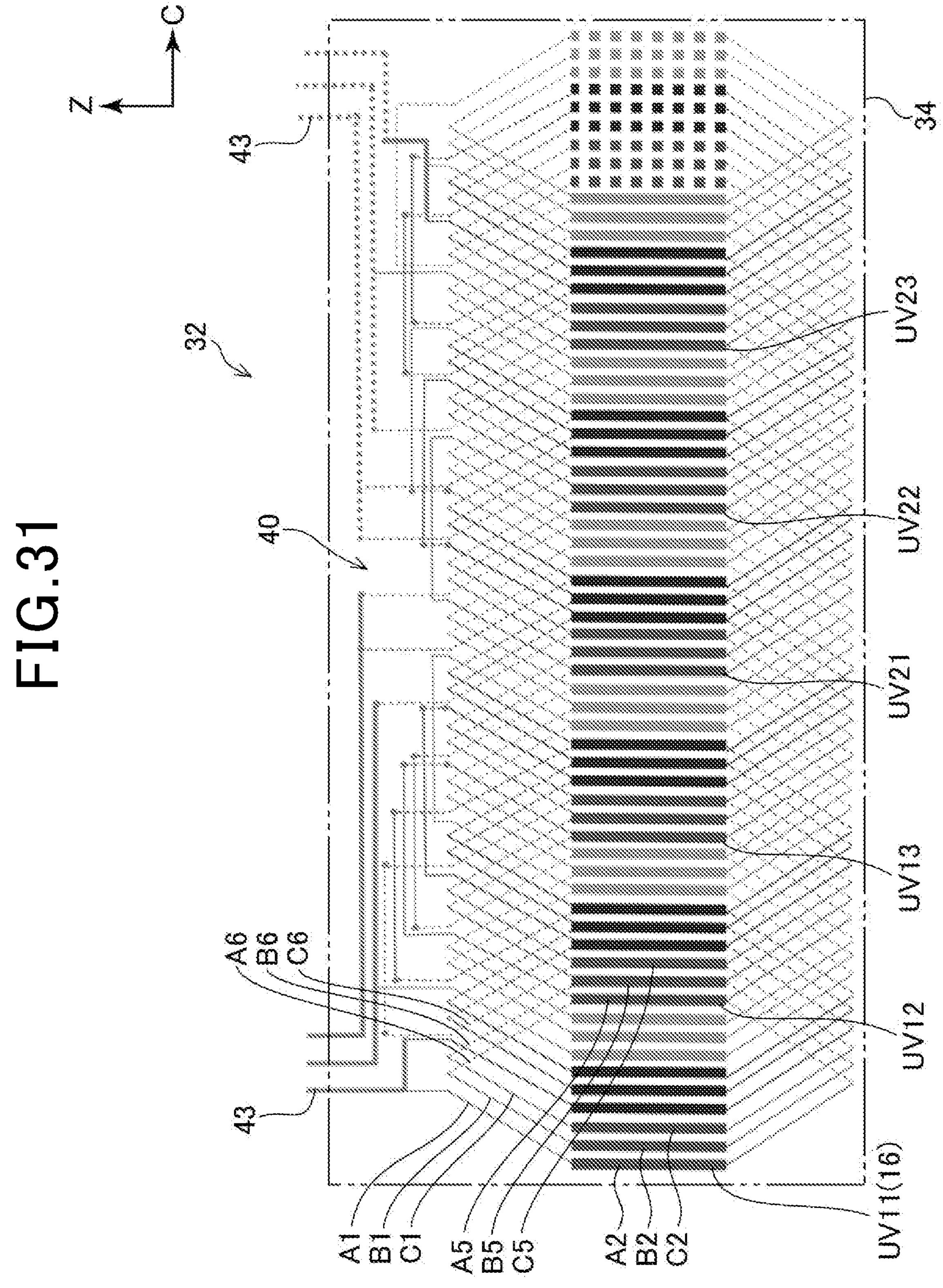
FIG. 31 is a development of a coil assembly.

As shown in FIG. 31, the fifth straight portion A5, the fifth straight portion B5 and the fifth straight portion C5 of the UV-phase coil UV11 are located respectively at the same circumferential positions as the second straight portion A2, the second straight portion B2 and the second straight portion C2 of the UV-phase coil UV12. That is, the fifth straight portion A5, the fifth straight portion B5 and the fifth straight portion C5 of the UV-phase coil UV11 respectively overlap the second straight portion A2, the second straight portion B2 and the second straight portion C2 of the UV-phase coil UV12 via the band member 34.

Moreover, the fifth straight portion A5, the fifth straight portion B5 and the fifth straight portion C5 of the UV-phase coil UV12 are located respectively at the same circumferential positions as the second straight portion A2, the second straight portion B2 and the second straight portion C2 of the UV-phase coil UV13. That is, the fifth straight portion A5, the fifth straight portion B5 and the fifth straight portion C5 of the UV-phase coil UV12 respectively overlap the second straight portion A2, the second straight portion B2 and the second straight portion C2 of the UV-phase coil UV13 via the band member 34.

Furthermore, the fifth straight portion A5, the fifth straight portion B5 and the fifth straight portion C5 of the UV-phase coil UV13 are located respectively at the same circumferential positions as the second straight portion A2, the second straight portion B2 and the second straight portion C2 of the UV-phase coil UV21. That is, the fifth straight portion A5, the fifth straight portion B5 and the fifth straight portion C5 of the UV-phase coil UV13 respectively overlap the second straight portion A2, the second straight portion B2 and the second straight portion C2 of the UV-phase coil UV21 via the band member 34.

Furthermore, the fifth straight portion A5, the fifth straight portion B5 and the fifth straight portion C5 of the UV-phase coil UV21 are located respectively at the same circumferential positions as the second straight portion A2, the second straight portion B2 and the second straight portion C2 of the UV-phase coil UV22. That is, the fifth straight portion A5, the fifth straight portion B5 and the fifth straight portion C5 of the UV-phase coil UV21 respectively overlap the second straight portion A2, the second straight portion B2 and the second straight portion C2 of the UV-phase coil UV22 via the band member 34.

Furthermore, the fifth straight portion A5, the fifth straight portion B5 and the fifth straight portion C5 of the UV-phase coil UV22 are located respectively at the same circumferential positions as the second straight portion A2, the second straight portion B2 and the second straight portion C2 of the UV-phase coil UV23. That is, the fifth straight portion A5, the fifth straight portion B5 and the fifth straight portion C5 of the UV-phase coil UV22 respectively overlap the second straight portion A2, the second straight portion B2 and the second straight portion C2 of the UV-phase coil UV23 via the band member 34.

The UV-phase coils UV11, UV12, UV13, UV21, UV22 and UV23 described above are arranged in this order on the first lap of the rolled band member 34. That is, the UV-phase coils UV11, UV12, UV13, UV21, UV22 and UV23 are arranged in this order on the closest layer of the rolled band member 34 to the rotor 12.

Moreover, in the motor according to the present embodiment, the sixth straight portion C6 of the UV-phase coil UV11 and the sixth straight portion C6 of the UV-phase coil UV12 are connected with each other. The first straight portion A1 of the UV-phase coil UV12 and the first straight portion A1 of the UV-phase coil UV13 are connected with each other. The first straight portion A1 of the UV-phase coil UV21 and the first straight portion A1 of the UV-phase coil UV22 are connected with each other. The sixth straight portion C6 of the UV-phase coil UV22 and the sixth straight portion C6 of the UV-phase coil UV23 are connected with each other.

Although not shown in the drawings, the UV-phase coils UV31, UV32, UV33, UV41, UV42 and UV43 are arranged on the second lap of the band member 34 in the same manner as the UV-phase coils UV11, UV12, UV13, UV21, UV22 and UV23 arranged on the first lap of the band member 34. Moreover, the UV-phase coils UV51, UV52, UV53, UV61, UV62 and UV63 are arranged on the third lap of the band member 34 in the same manner as the UV-phase coils UV11, UV12, UV13, UV21, UV22 and UV23 arranged on the first lap of the band member 34. Furthermore, the UV-phase coils UV71, UV72, UV73, UV81, UV82 and UV83 are arranged on the fourth lap of the band member 34 in the same manner as the UV-phase coils UV11, UV12, UV13, UV21, UV22 and UV23 arranged on the first lap of the band member 34.

The VW-phase coils VW11 to VW83 are also arranged on the band member 34 in the same manner as the UV-phase coils UV11 to UV83. Moreover, the WU-phase coils WU11 to WU83 are also arranged on the band member 34 in the same manner as the UV-phase coils UV11 to UV83.

The motor according to the seventh embodiment described above can have different characteristics from those of the motors according to the previous embodiments where the coils 16 of respective phases are star-connected. It should be noted that the decision as to whether to select a star connection or a delta connection for the coils 16 can be made properly in consideration of the characteristics required of the motor.

Eighth to Tenth Embodiments

Next, motors according to the eighth to the tenth embodiments will be described. It should be noted that: members and parts of the motors according to the eighth to the tenth embodiments corresponding to those of the motor 10 according to the first embodiment are designated by the same reference signs as the corresponding members and parts of the motor 10 according to the first embodiment; and description of these parts and members will be omitted hereinafter.

Figure 32:
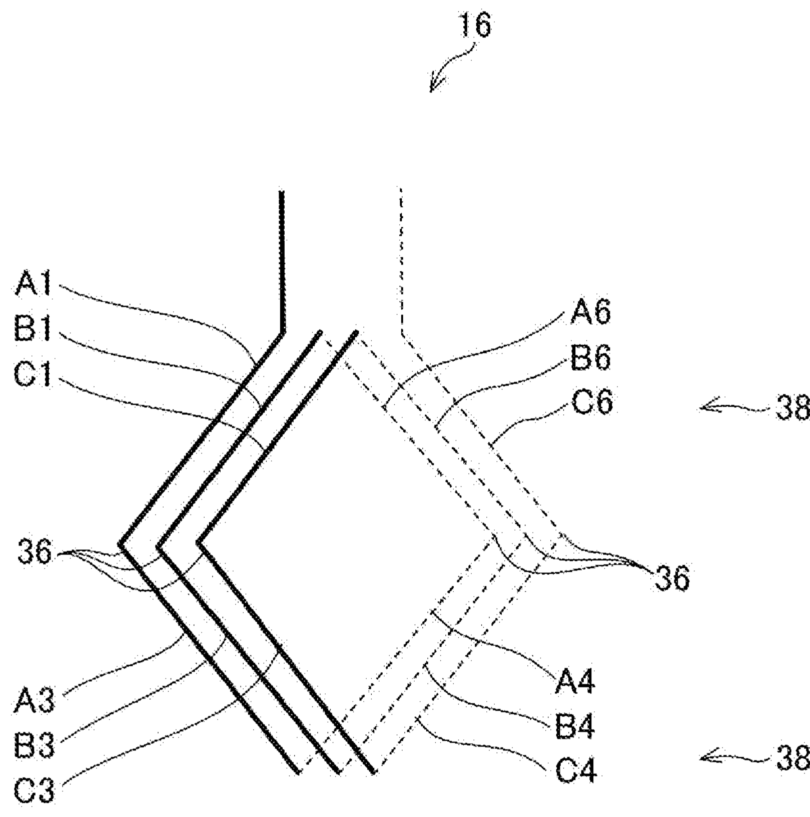
FIG. 32 is a diagram showing a coil of a motor according to an eighth embodiment.

FIG. 32 shows a coil 16 that constitutes a part of the motor according to the eighth embodiment. As shown in FIG. 32, each coil 16 of the motor according to the eighth embodiment is formed to have a rhombic shape when viewed in the thickness direction of the band member 34.

Figure 33:
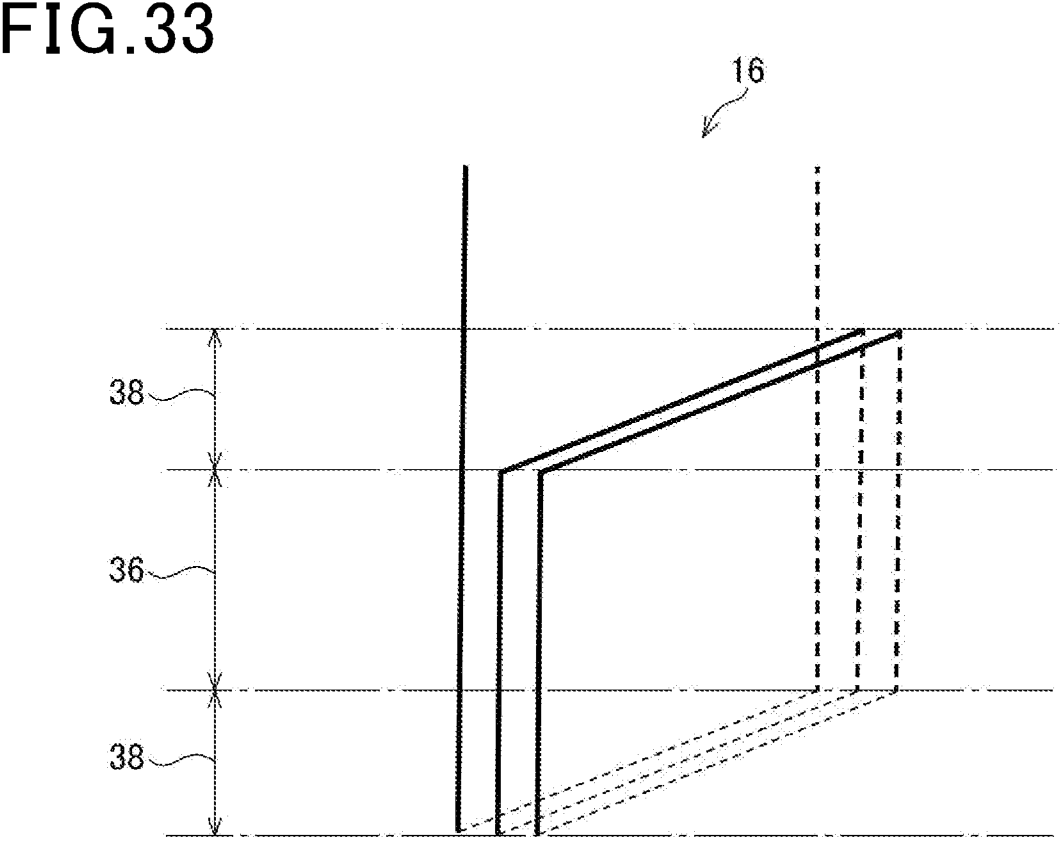
FIG. 33 is a diagram showing a coil of a motor according to a ninth embodiment.

FIG. 33 shows a coil 16 that constitutes a part of the motor according to the ninth embodiment. As shown in FIG. 33, each coil 16 of the motor according to the ninth embodiment is formed to have a parallelogrammatic shape when viewed in the thickness direction of the band member 34.

Figure 34:
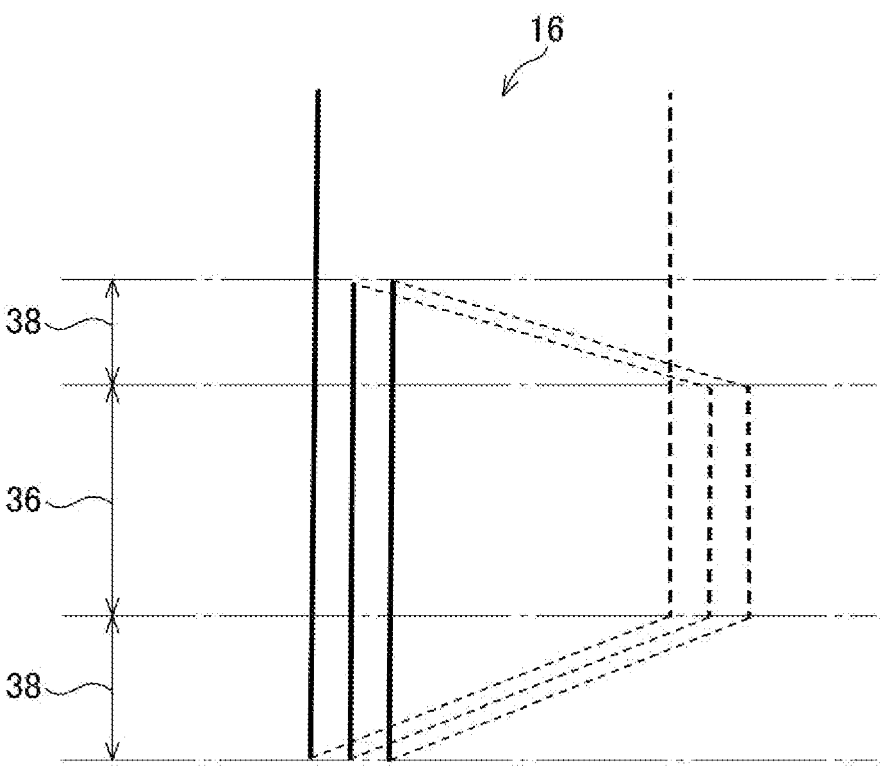
FIG. 34 is a diagram showing a coil of a motor according to a tenth embodiment.

FIG. 34 shows a coil 16 that constitutes a part of the motor according to the tenth embodiment. As shown in FIG. 34, each coil 16 of the motor according to the tenth embodiment is formed to have a trapezoidal shape when viewed in the thickness direction of the band member 34.

In addition, in FIGS. 32 to 34, portions of the coils 16 of the motors according to the eighth to the tenth embodiments corresponding to those of the hexagonal coils 16 (see FIG. 7) of the motors according to the previous embodiments are designated by the same reference numerals as the corresponding portions of the hexagonal coils 16. As above, the shape of the coils 16 can be set properly in consideration of the output characteristics required of the motor.

Eleventh to Thirteenth Embodiments

Next, motors according to the eleventh to the thirteenth embodiments will be described. It should be noted that: members and parts of the motors according to the eleventh to the thirteenth embodiments corresponding to those of the motor 10 according to the first embodiment are designated by the same reference signs as the corresponding members and parts of the motor 10 according to the first embodiment; and description of these parts and members will be omitted hereinafter.

Figure 35:
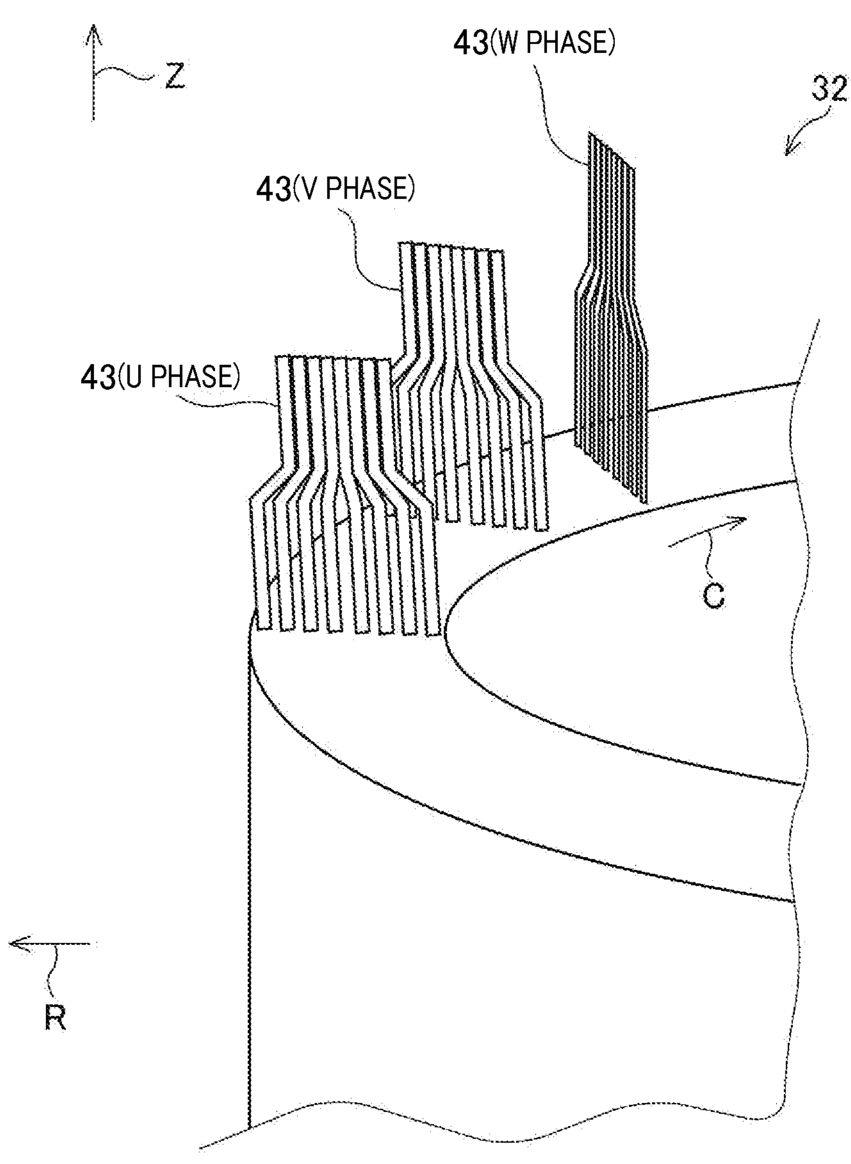
FIG. 35 is a perspective view of a coil assembly of a motor according to an eleventh embodiment.
Figure 36:
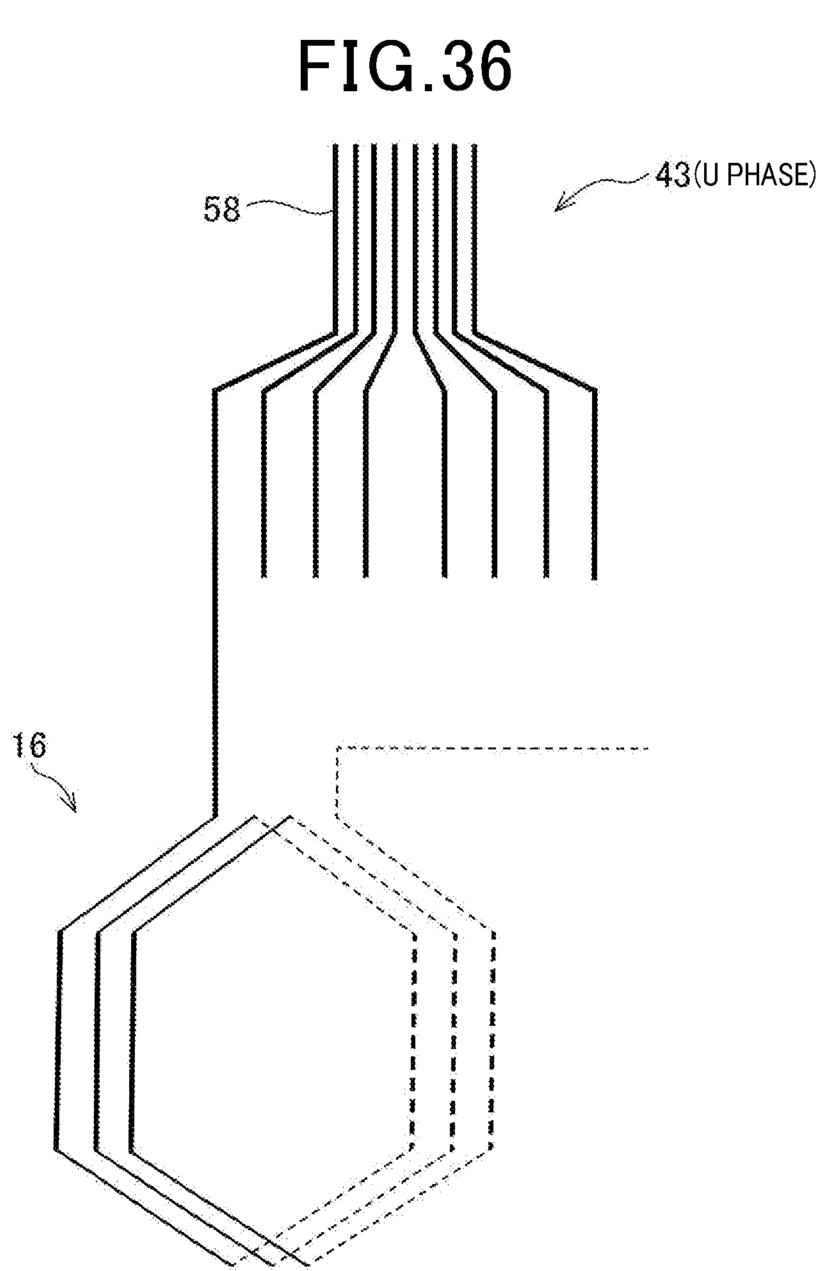
FIG. 36 is a diagram showing a coil and a connection terminal part.

FIG. 35 is an enlarged perspective view schematically showing a coil assembly 32 that constitutes a part of the motor according to the eleventh embodiment. In FIG. 35, the band member 34 is in a state of having been rolled along the circumferential direction a plurality of times. Moreover, as shown in FIGS. 35 and 36, for each of the three phases, a plurality of connection portions 43 connected with the coils of the phase are arranged to extend from an annularly-rolled part of the band member 34 to the first side in the axial direction. Specifically, a plurality of U-phase connection portions 43 extend from substantially the same circumferential position to the first side in the axial direction and are radially aligned with each other. Moreover, the U-phase connection portions 43 are bundled with the insulating layers removed at least partially from end parts of the U-phase connection portions 43 on the first side in the axial direction. Hereinafter, those parts of the connection portions 43 which are bundled together and from which the insulating layers are removed will be together referred to as the connection terminal part 58. In addition, a plurality of V-phase connection portions 43 and a plurality of W-phase connection portions 43 are also configured in the same manner as the U-phase connection portions 43.

In the motor according to the eleventh embodiment described above, the end parts of the connection portions 43 of each phase connected in parallel with each other are arranged collectively at a predetermined location; consequently, it becomes easy to bundle the connection portions 43 of each phase together. As a result, it becomes possible to eliminate the need for extra routing of the connection portions 43 of each phase.

Figure 37:
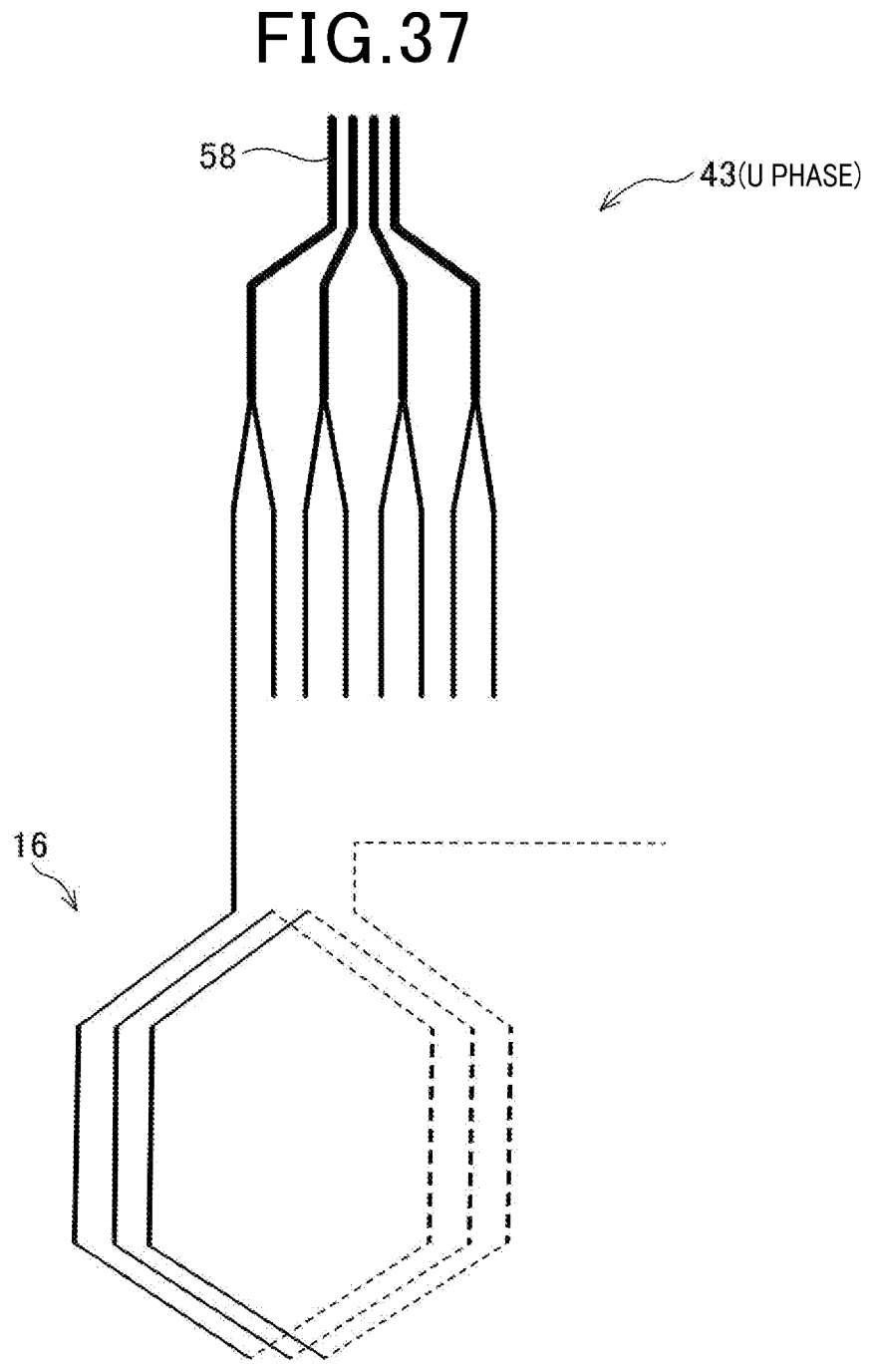

In addition, as shown in FIG. 37, corresponding connection portions 43 may be joined together in advance at a location between the connection terminal part 58 and the coils 16. With this configuration, the number of the connection portions 43 bundled at the connection terminal part 58 can be reduced in comparison with the configuration shown in FIG. 36.

Figure 38:
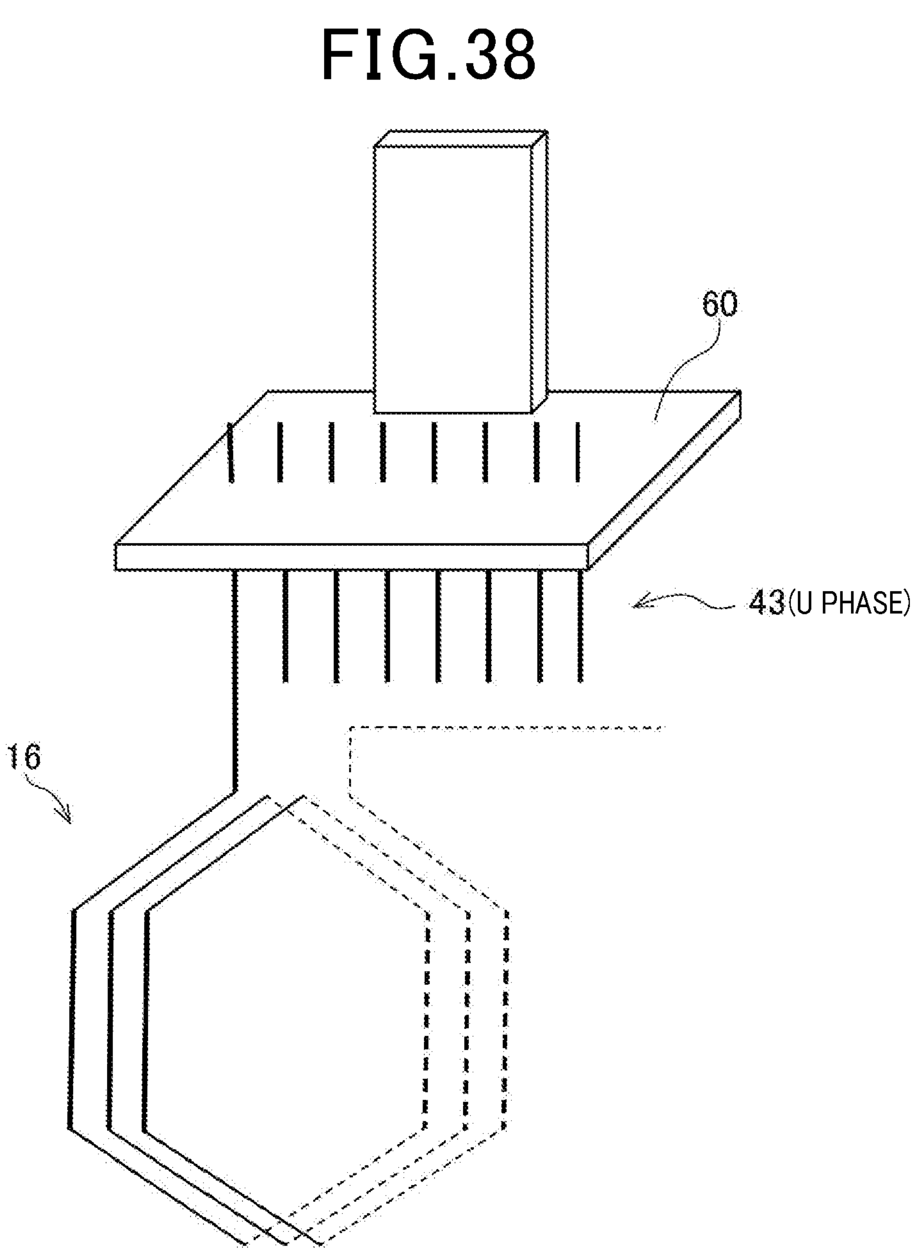
FIG. 38 is a diagram showing a coil and a board.

Alternatively, as in the motor according to the twelfth embodiment shown in FIG. 38, the end parts of the connection portions 43 of each phase on the first side in the axial direction may be connected with each other via a board 60.

Figure 39:
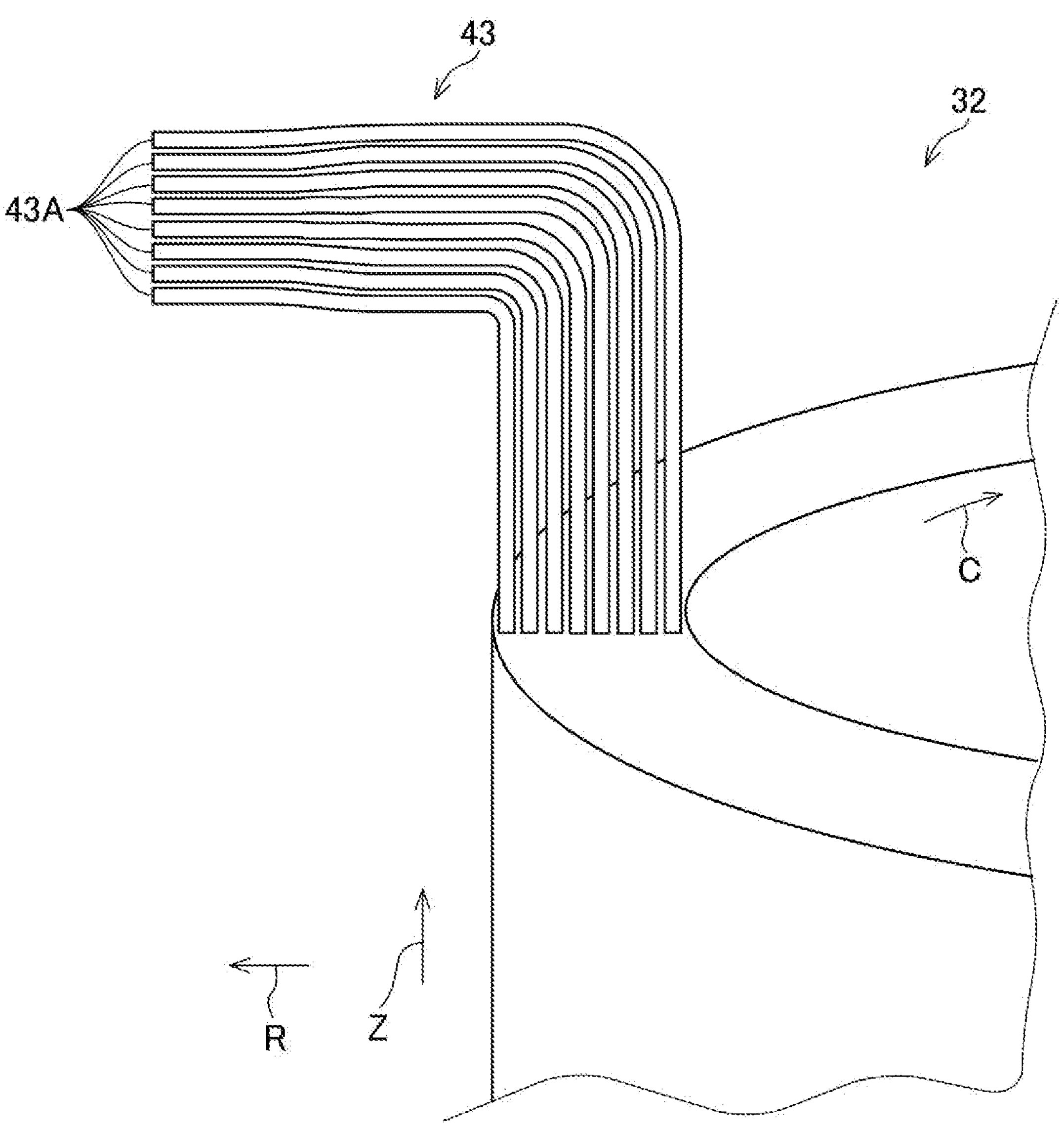
FIG. 39 is a perspective view of a coil assembly of a motor according to a thirteenth embodiment.
Figure 40:
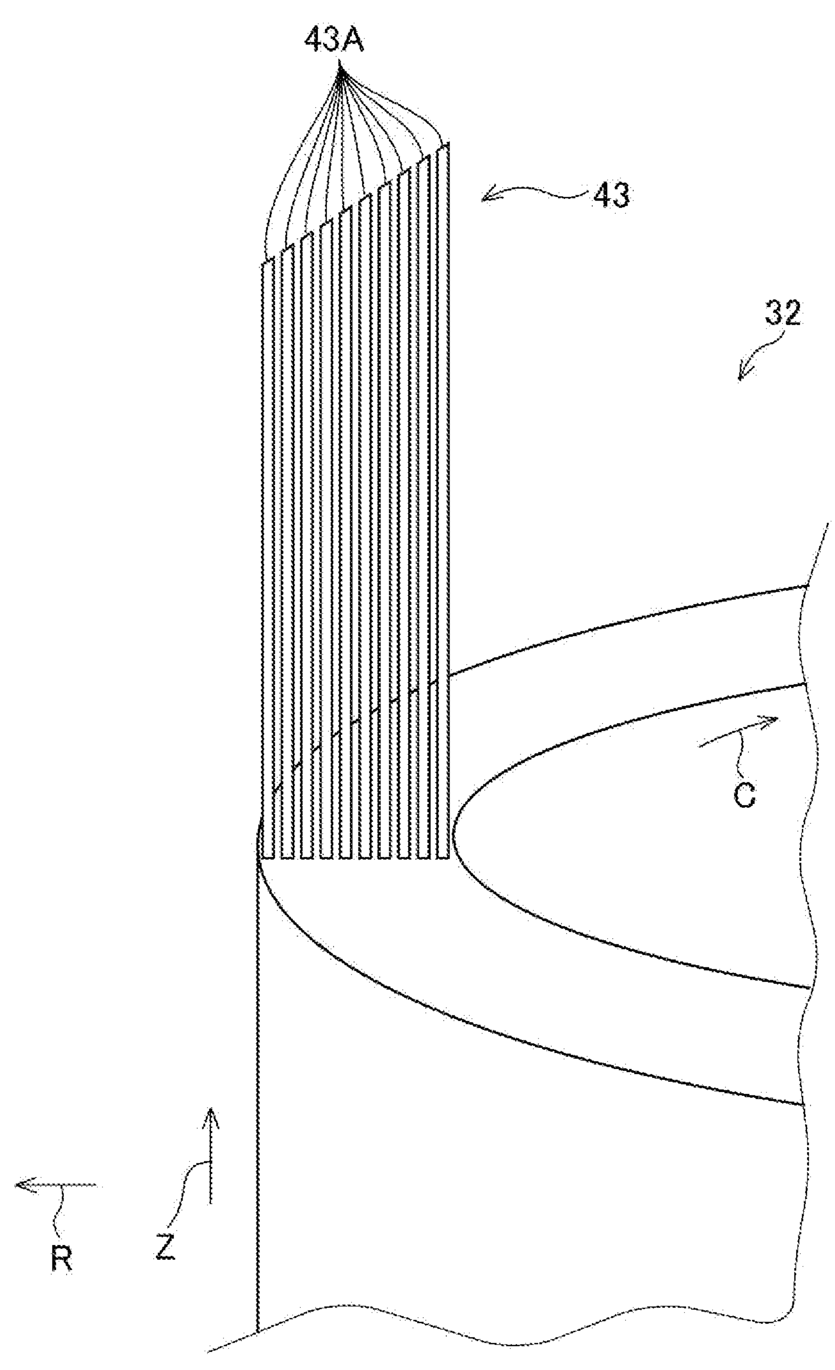
FIG. 40 is another perspective view of the coil assembly of the motor according to the thirteenth embodiment, where a plurality of connection portions are in an unbent state.

FIG. 39 is an enlarged perspective view schematically showing a coil assembly 32 that constitutes a part of the motor according to the thirteenth embodiment. In FIG. 39, the band member 34 is in a state of having been rolled along the circumferential direction a plurality of times. Moreover, for each of the three phases, a plurality of connection portions 43 connected with the coils of the phase are arranged to extend from an annularly-rolled part of the band member 34 to the first side in the axial direction and bent radially outward. Specifically, in the thirteenth embodiment, as shown in FIG. 40, the connection portions 43 extend from substantially the same circumferential position to the first side in the axial direction and are radially aligned with each other. Moreover, the lengths of the connection portions 43 gradually decrease toward the outer side in the radial direction. That is, for each radially-adjacent pair of the connection portions 43, the length of that one of the pair of the connection portions 43 which is located on the radially outer side is set to be shorter than the length of the other of the pair of the connection portions 43 which is located on the radially inner side. Consequently, in a state of the connection portions 43 having been bent radially outward, the radial positions of distal ends 43A of the connection portions 43 coincide with each other. As above, in the present embodiment, the positions and orientations of the distal ends 43A of the connection portions 43 can be adjusted; thus, it becomes possible to increase variations in the arrangement of a circuit or the like to which the connection portions 43 are connected. Moreover, it becomes possible to suppress unnecessary bulges from being formed in the connection portions 43 during the bending of the connection portions 43; thus, it becomes possible to achieve reduction in the arrangement space of the connection portions 43. It should be noted that the above configuration can also be applied to cases where the connection portions 43 are bent radially inward.

Fourteenth and Fifteenth Embodiments

Next, motors according to the fourteenth and fifteenth embodiments will be described. It should be noted that: members and parts of the motors according to the fourteenth and fifteenth embodiments corresponding to those of the motor 10 according to the first embodiment are designated by the same reference signs as the corresponding members and parts of the motor 10 according to the first embodiment; and description of these parts and members will be omitted hereinafter.

Figure 41:
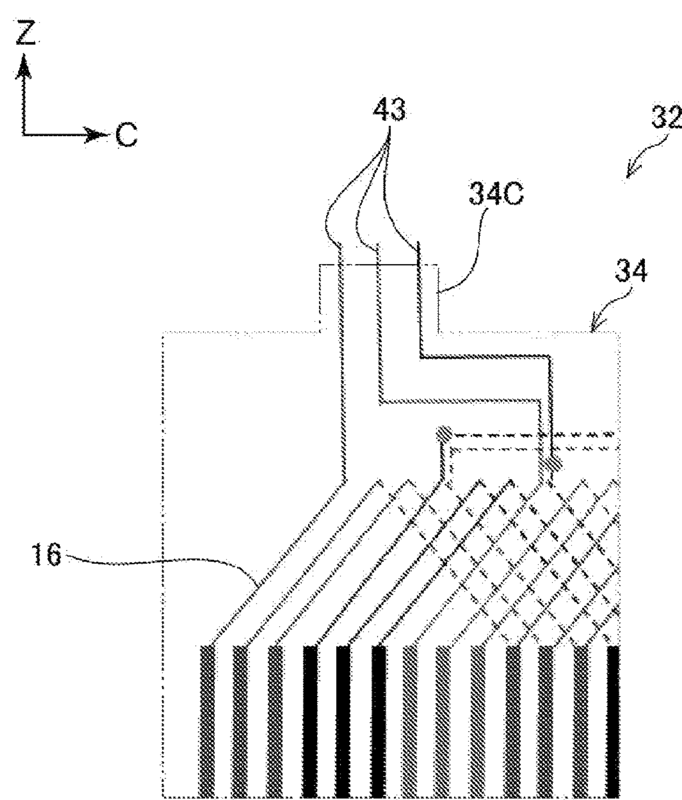
FIG. 41 is an enlarged view of part of a coil assembly of a motor according to a fourteenth embodiment.

FIG. 41, which corresponds to FIG. 9, shows part of a coil assembly 32 of the motor according to the fourteenth embodiment in an enlarged manner. As shown in FIG. 41, in the fourteenth embodiment, the band member 34 has tongue-shaped connection-portion holding portions 34C each protruding from an annularly-rolled part of the band member 34 to the first side in the axial direction. Moreover, in each of the connection-portion holding portions 34C, there are formed three connection portions 43. In addition, an insulating layer (i.e., a part of the connection-portion holding portion 34C) is removed from end parts of the three connection portions 43 on the first side in the axial direction.

Figure 42:
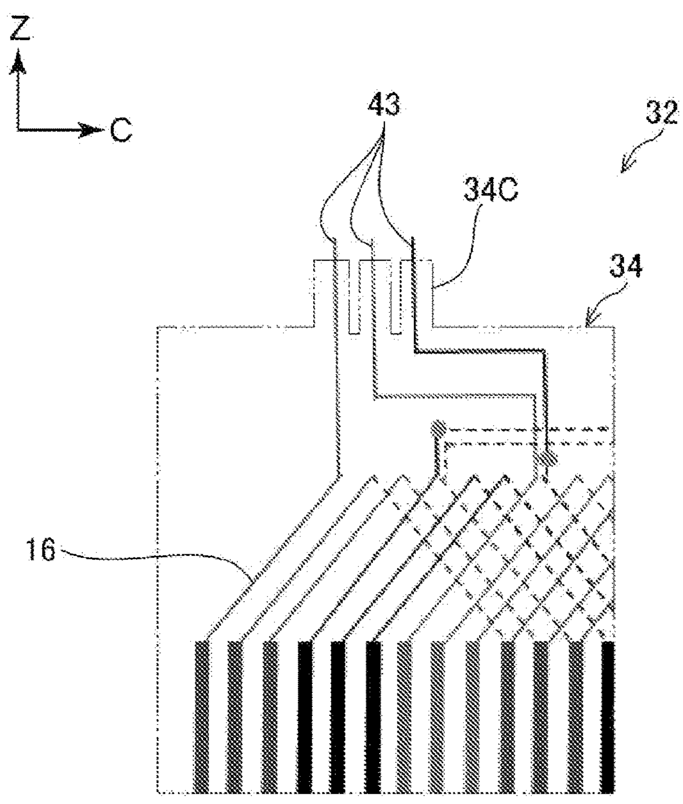
FIG. 42 is an enlarged view of part of a coil assembly of a motor according to a fifteenth embodiment.

FIG. 42, which corresponds to FIG. 41, shows part of a coil assembly 32 of the motor according to the fifteenth embodiment in an enlarged manner. As shown in FIG. 41, in the fifteenth embodiment, each of the connection-portion holding portions 34C is divided into three parts in the circumferential direction; the three parts respectively correspond to the three connection portions 43.

In the motors according to the fourteenth and fifteenth embodiments described above, the intervals between the three connection portions 43 can be easily kept at predetermined intervals.

Sixteenth Embodiment

Next, a motor according to the sixteenth embodiment will be described. It should be noted that: members and parts of the motor according to the sixteenth embodiment corresponding to those of the motor 10 according to the first embodiment are designated by the same reference signs as the corresponding members and parts of the motor 10 according to the first embodiment; and description of these parts and members will be omitted hereinafter.

Figure 43:
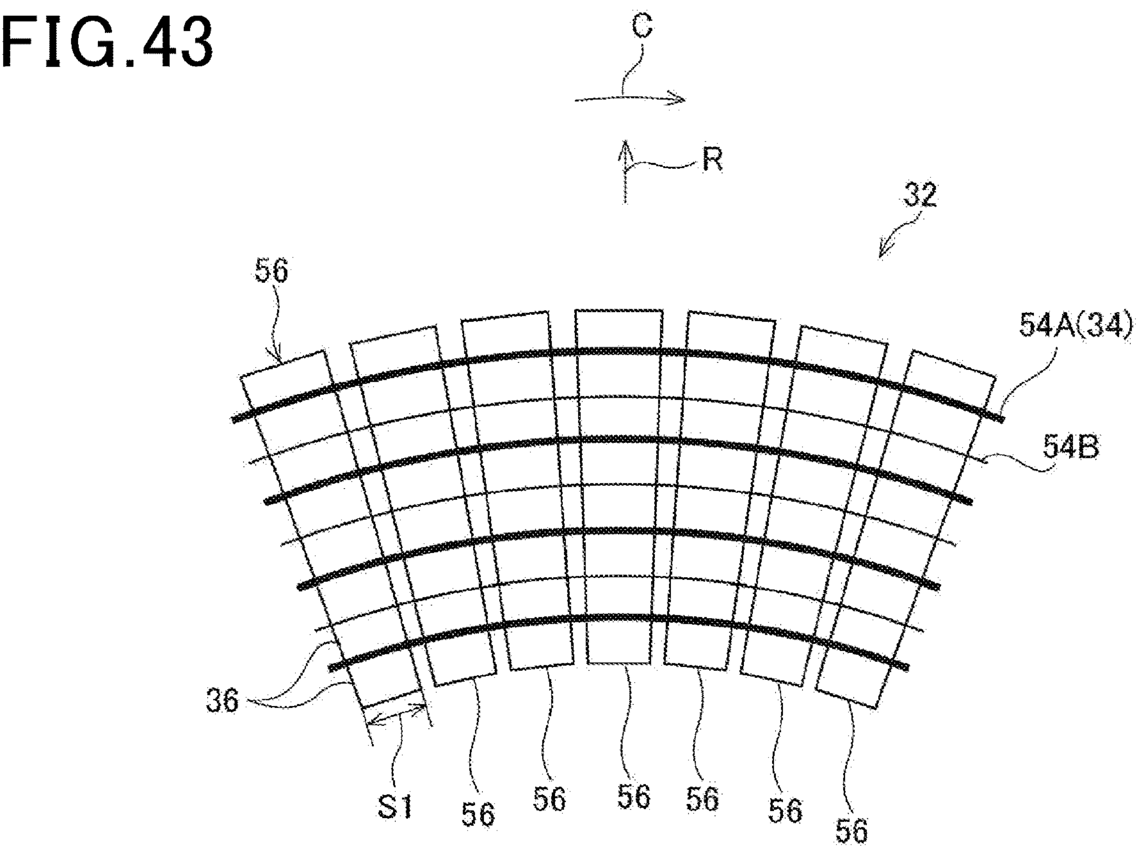
FIG. 43 is a cross-sectional view, taken along a radial direction, of a coil assembly of a motor according to a sixteenth embodiment.

As shown in FIG. 43, in the motor according to the sixteenth embodiment, the circumferential dimensions S1 of the vertical portions 36 constituting the vertical-portion laminates 56 gradually increase toward the outer side in the radial direction. Consequently, each of the vertical-portion laminates 56 has a substantially fan-shaped cross-section taken along the radial direction. With this configuration, the cross-sectional area of each of the vertical-portion laminates 56 can be increased in comparison with that in the motor 10 according to the first embodiment. Consequently, the electrical resistance of each of the vertical-portion laminates 56 can be lowered in comparison with that in the motor 10 according to the first embodiment. That is, the space factor of the coils 16 can be improved in comparison with that in the motor 10 according to the first embodiment.

Seventeenth Embodiment

Next, a motor according to the seventeenth embodiment will be described. It should be noted that: members and parts of the motor according to the seventeenth embodiment corresponding to those of the motor 10 according to the first embodiment are designated by the same reference signs as the corresponding members and parts of the motor 10 according to the first embodiment; and description of these parts and members will be omitted hereinafter.

Figure 44:
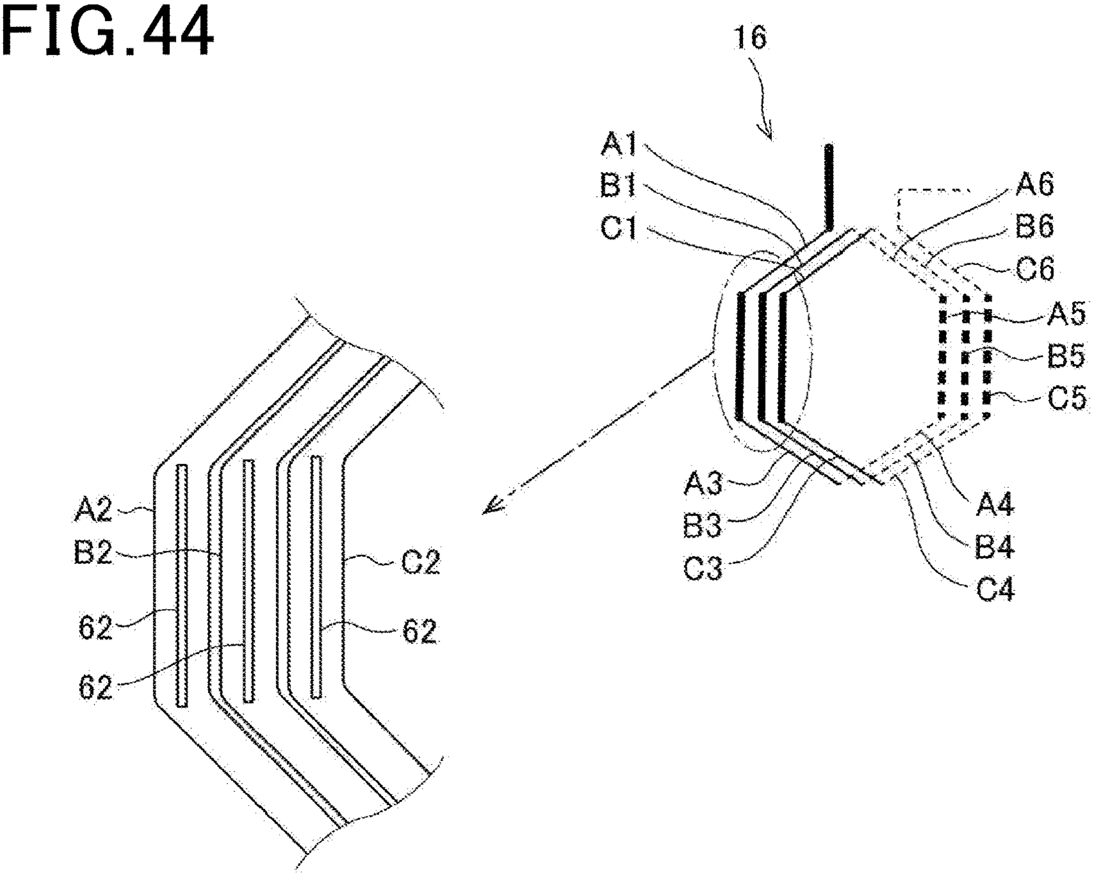
FIG. 44 is a diagram showing a coil of a motor according to a seventeenth embodiment in an enlarged manner.

As shown in FIG. 44, in the motor according to the seventeenth embodiment, slits 62 are formed respectively in the second straight portion A2, the second straight portion B2 and the second straight portion C2 of each of the coils 16, which constitute vertical portions 36 of the coil 16. Consequently, the second straight portion A2, the second straight portion B2 and the second straight portion C2 are divided in the circumferential direction by the respective slits 62. It should be noted that slits 62 may also be formed respectively in the fifth straight portion A5, the fifth straight portion B5 and the fifth straight portion C5 of each of the coils 16, which also constitute vertical portions 36 of the coil 16.

Moreover, it also should be noted that slits 62 may also be formed respectively in the first straight portions A1, B1 and C1 and the sixth straight portions A6, B6 and C6 of each of the coils 16, which constitute the first coil end portions 38 of the coil 16. Furthermore, it also should be noted that slits 62 may also be formed respectively in the third straight portions A3, B3 and C3 and the fourth straight portions A4, B4 and C4 of each of the coils 16, which constitute the second coil end portions 38 of the coil 16.

In the motor according to the seventeenth embodiment described above, by forming the slits 62 in the vertical portions 36 of the coils 16, generation of eddy current in the coils 16 can be suppressed in comparison with a configuration where no slits 62 are formed in the coils 16.

Eighteenth to Twentieth Embodiments

Next, motors according to the eighteenth to the twentieth embodiments will be described. It should be noted that: members and parts of the motors according to the eighteenth to the twentieth embodiments corresponding to those of the motor 10 according to the first embodiment are designated by the same reference signs as the corresponding members and parts of the motor 10 according to the first embodiment; and description of these parts and members will be omitted hereinafter.

Figure 45:
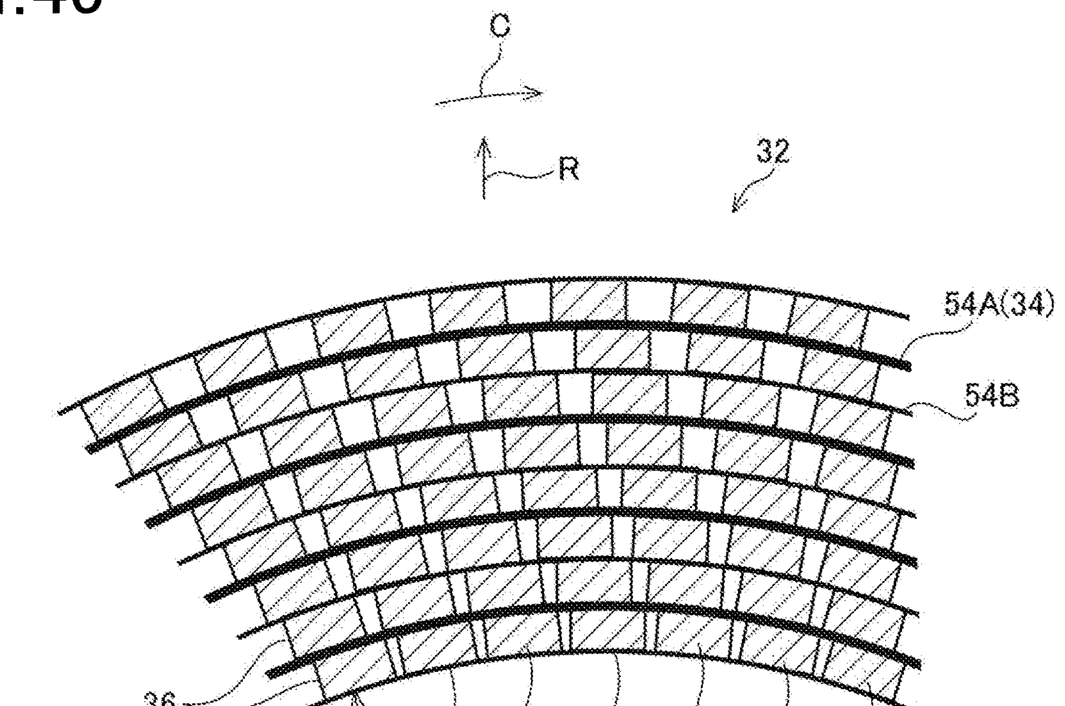
FIG. 45 is a cross-sectional view, taken along a radial direction, of a coil assembly of a motor according to an eighteenth embodiment.

As shown in FIG. 45, in the motor according to the eighteenth embodiment, in each of the vertical-portion laminates 56, the circumferential positions of the vertical portions 36 constituting the vertical-portion laminate 56 are offset from one another. Specifically, in the motor according to the eighteenth embodiment, for each radially-adjacent pair of the vertical portions 36, the circumferential position of that one of the pair of the vertical portions 36 which is located on the radially outer side is offset to the second side in the circumferential direction from the circumferential position of the other of the pair of the vertical portions 36 which is located on the radially inner side.

Figure 46:
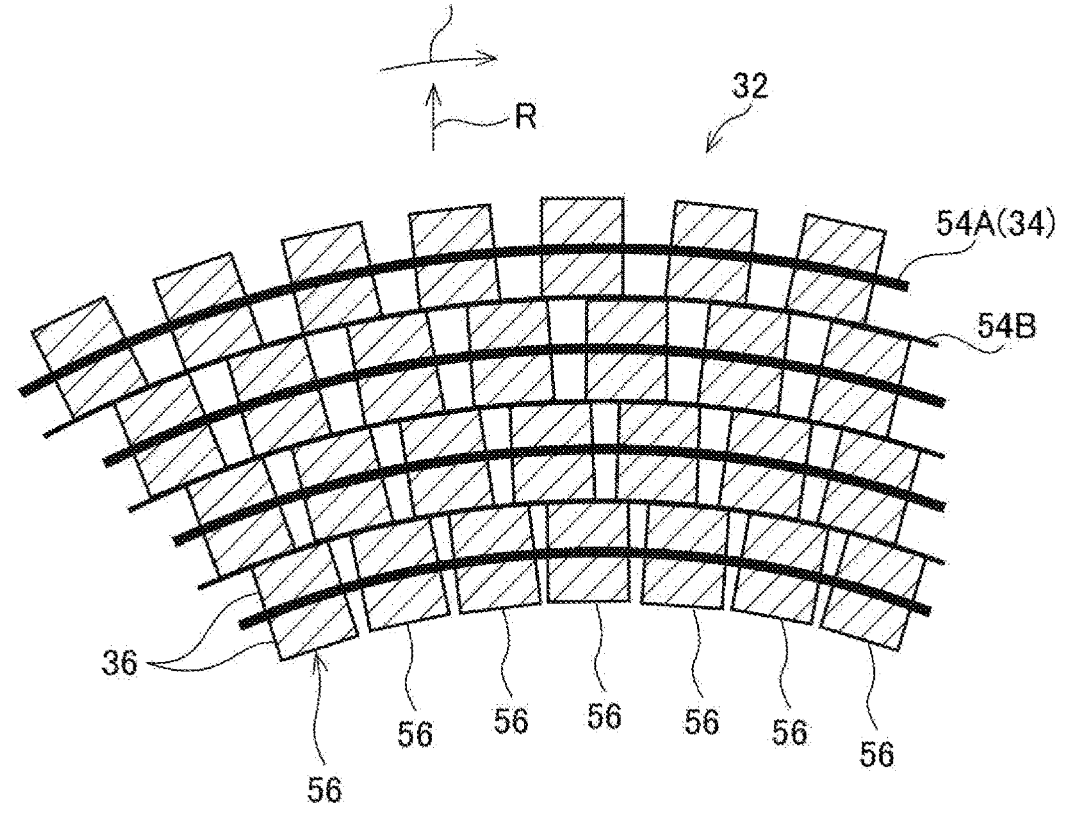
FIG. 46 is a cross-sectional view, taken along a radial direction, of a coil assembly of a motor according to a nineteenth embodiment.

As shown in FIG. 46, in the motor according to the nineteenth embodiment, in each of the vertical-portion laminates 56, the circumferential positions of the vertical portions 36 constituting the vertical-portion laminate 56 are also offset from one another. Specifically, in the motor according to the nineteenth embodiment, the circumferential positions of each adjacent pair of the vertical portions 36 formed on the second lap of the band member 34 are offset to the second side in the circumferential direction from the circumferential positions of a corresponding pair of the vertical portions 36 formed on the first lap of the band member 34. Moreover, the circumferential positions of each adjacent pair of the vertical portions 36 formed on the third lap of the band member 34 are offset to the second side in the circumferential direction from the circumferential positions of a corresponding pair of the vertical portions 36 formed on the second lap of the band member 34. Furthermore, the circumferential positions of each adjacent pair of the vertical portions 36 formed on the fourth lap of the band member 34 are offset to the second side in the circumferential direction from the circumferential positions of a corresponding pair of the vertical portions 36 formed on the third lap of the band member 34.

Figure 47:
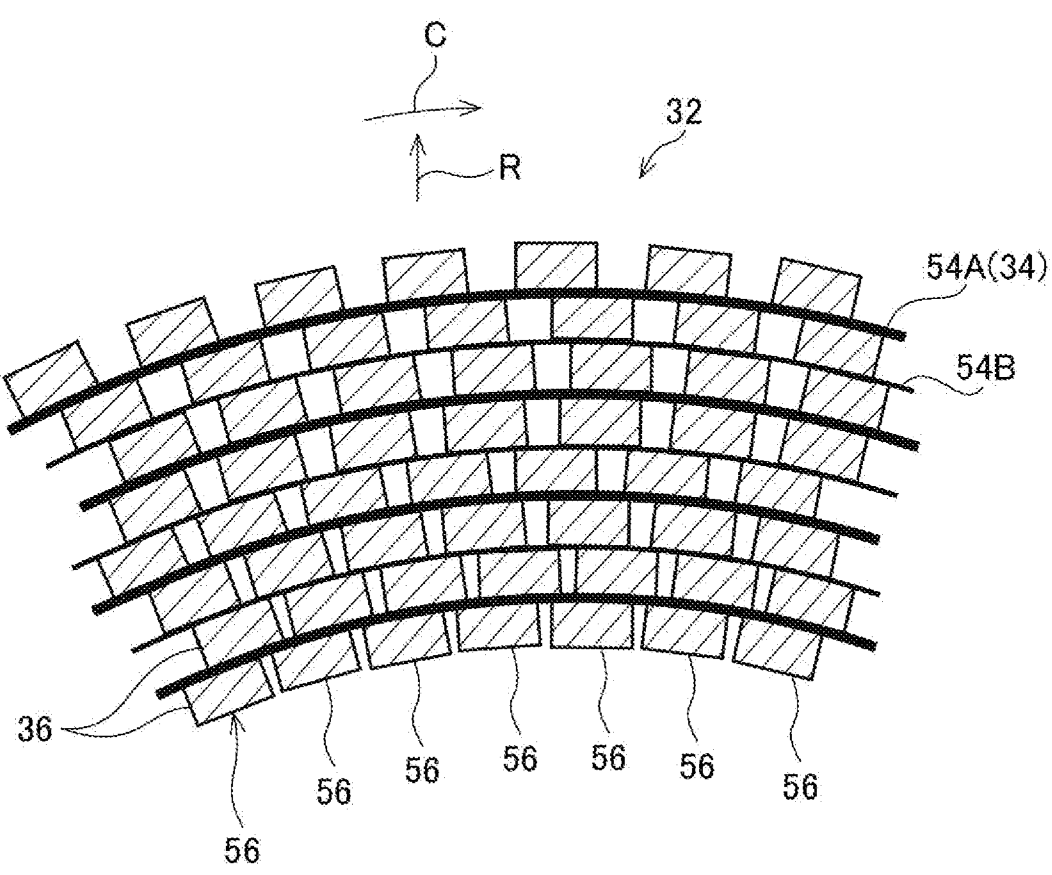
FIG. 47 is a cross-sectional view, taken along a radial direction, of a coil assembly of a motor according to a twentieth embodiment.

As shown in FIG. 47, in the motor according to the twentieth embodiment, in each of the vertical-portion laminates 56, the circumferential positions of the vertical portions 36 constituting the vertical-portion laminate 56 are also offset from one another. Specifically, in the motor according to the twentieth embodiment, in each of the vertical-portion laminates 56, the vertical portions 36 constituting the vertical-portion laminate 56 are arranged, from the radially inner side to the radially outer side, in a zigzag shape toward the first side and the second side in the circumferential direction.

In the motors according to the eighteenth to the twentieth embodiments described above, in each of the vertical-portion laminates 56, the circumferential positions of the vertical portions 36 constituting the vertical-portion laminate 56 are offset from one another, thereby making it possible to control torque ripple of the motor.

Twenty-First Embodiment

Next, a motor according to the twenty-first embodiment will be described. It should be noted that: members and parts of the motor according to the twenty-first embodiment corresponding to those of the motor 10 according to the first embodiment are designated by the same reference signs as the corresponding members and parts of the motor 10 according to the first embodiment; and description of these parts and members will be omitted hereinafter.

Figure 48:
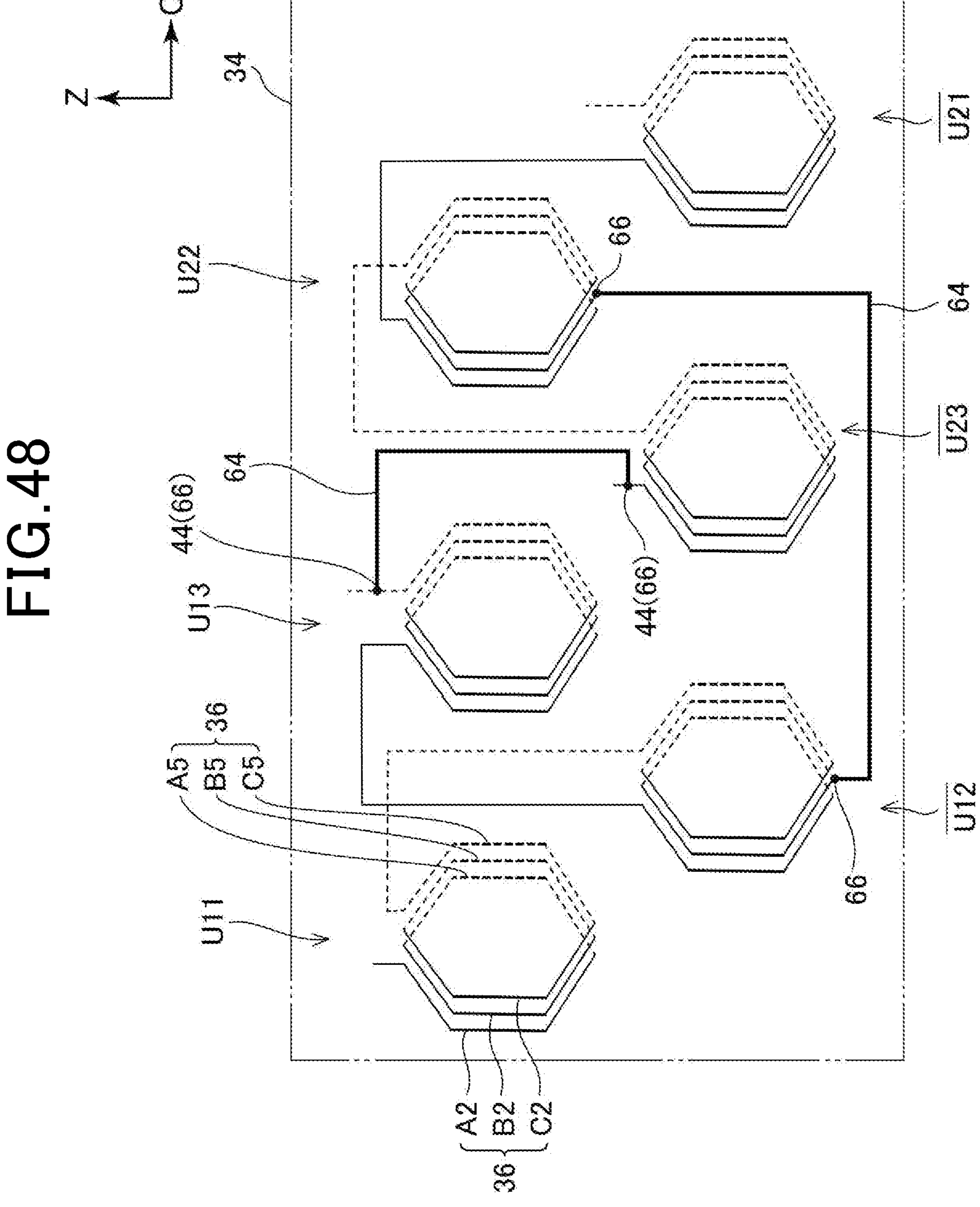
FIG. 48 is a schematic view showing U-phase coil subgroups of a motor according to a twenty-first embodiment, which are offset from each other in an axial direction.

FIG. 48, which corresponds to FIG. 19, shows six U-phase coils 16 formed on the first lap of a band member 34 of the motor according to the twenty-first embodiment. As shown in FIG. 48, the motor according to the twenty-first embodiment, a portion of one of the coils 16 and a portion of another one of the coils 16 are connected with each other via a voltage-equalizing connection portion 64. It should be noted that the configuration of the motor according to the twenty-first embodiment is identical to that of the motor according to the second embodiment, except that a portion of one of the coils 16 and a portion of another one of the coils 16 are connected with each other via a voltage-equalizing connection portion 64.

Specifically, in the motor according to the twenty-first embodiment, a boundary portion between the third straight portion B3 and the fourth straight portion B4 of the U-phase coil U12 and a boundary portion between the third straight portion B3 and the fourth straight portion B4 of the U-phase coil U22 constitute a pair of equipotential portions 66 having no or only a small difference in electric potential between them. Moreover, the equipotential portions 66 of the U-phase coils U12 and U22 are connected with each other via a voltage-equalizing connection portion 64. Similarly, an end portion of the U-phase coil U13 connected to the neutral point 44 and an end portion of the U-phase coil U23 connected to the neutral point 44 together constitute a pair of equipotential portions 66 having no or only a small difference in electric potential between them. Moreover, the equipotential portions 66 of the U-phase coils U13 and U23 are connected with each other via a voltage-equalizing connection portion 64. In addition, in the present embodiment, the voltage-equalizing connection portions 64 are also formed on the band member 34.

Although not shown in the drawings, U-phase coils U31, U32, U33, U43, U42 and U41 formed on the second lap of the band member 34 are arranged and connected in the same manner as the U-phase coils U11, U12, U13, U23, U22 and U21 formed on the first lap of the band member 34. Moreover, U-phase coils U51, U52, U53, U63, U62 and U61 formed on the third lap of the band member 34 are also arranged and connected in the same manner as the U-phase coils U11, U12, U13, U23, U22 and U21 formed on the first lap of the band member 34. Furthermore, U-phase coils U71, U72, U73, U83, U82 and U81 formed on the fourth lap of the band member 34 are also arranged and connected in the same manner as the U-phase coils U11, U12, U13, U23, U22 and U21 formed on the first lap of the band member 34.

V-phase coils V11 to V83 are also arranged and connected on the band member 34 in the same manner as the U-phase coils U11 to U83. Moreover, W-phase coils W11 to W83 are also arranged and connected on the band member 34 in the same manner as the U-phase coils U11 to U83.

In the motor according to the twenty-first embodiment described above, the equipotential portions 66 of each corresponding pair of the coils 16 are connected with each other via a voltage-equalizing connection portion 64. Consequently, it becomes possible to control partial electric potential imbalance between the coil groups which are connected in parallel with each other and each include a plurality of coils 16 connected in series with each other; the partial electric potential imbalance is due to variation in the magnets 18 of the rotor 12 and/or variation in the coils 16. As a result, it becomes possible to realize stable operation of the motor.

It should be noted that the voltage-equalizing connection portions 64, which are formed on the band member 34 in the present embodiment, may alternatively be implemented in other manners. For example, the voltage-equalizing connection portions 64 may alternatively be implemented by dedicated wirings provided as separate members from the coil assembly 32. Moreover, the equipotential portions 66 may alternatively be connected using vias or through-holes. Alternatively, the insulating layers may be removed from the equipotential portions 66; and each corresponding pair of the equipotential portions 66 may be arranged in contact with each other.

It also should be noted that: the maximum value of electric currents flowing through the voltage-equalizing connection portions 64 is less than the maximum value of electric currents flowing through the coils 16; therefore, the cross-sectional areas of electrical conductors constituting the voltage-equalizing connection portions 64 may be set to be less than the cross-sectional areas of electrical conductors constituting the coils 16.

It also should be noted that the equipotential portions 66 may be connected via the voltage-equalizing connection portions 64 across the first to the fourth laps of the band member 34.

Twenty-Second Embodiment

Next, a motor according to the twenty-second embodiment will be described. It should be noted that: members and parts of the motor according to the twenty-second embodiment corresponding to those of the motor 10 according to the first embodiment are designated by the same reference signs as the corresponding members and parts of the motor 10 according to the first embodiment; and description of these parts and members will be omitted hereinafter.

Figure 49:
FIG. 49 is a block diagram of a motor control system which includes a motor according to a twenty-second embodiment.
Figure 49:
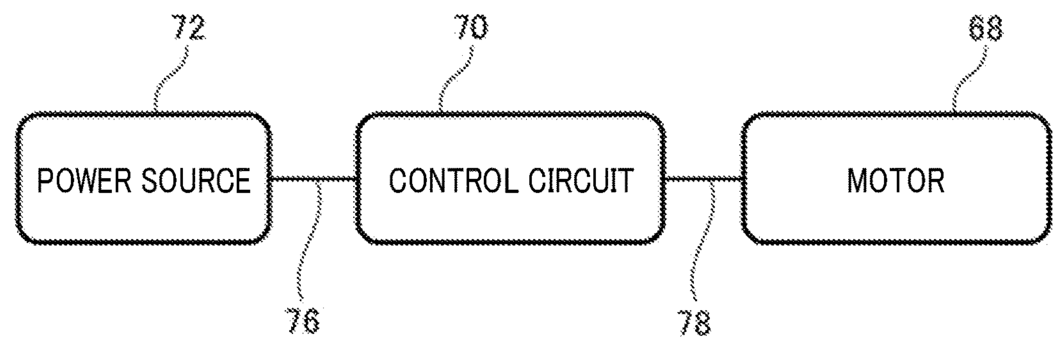

As shown in FIG. 49, the motor 68 according to the twenty-second embodiment constitutes, together with a control circuit 70 and a power source 72, a motor control system 74. The control circuit 70 is connected with the power source 72 via first connection lines 76. The control circuit 70 is activated by electric power from the power source 72. The control circuit 70 controls rotation of the rotor 12 by controlling each of the coils 16 constituting a part of the motor 68.

Figure 50:
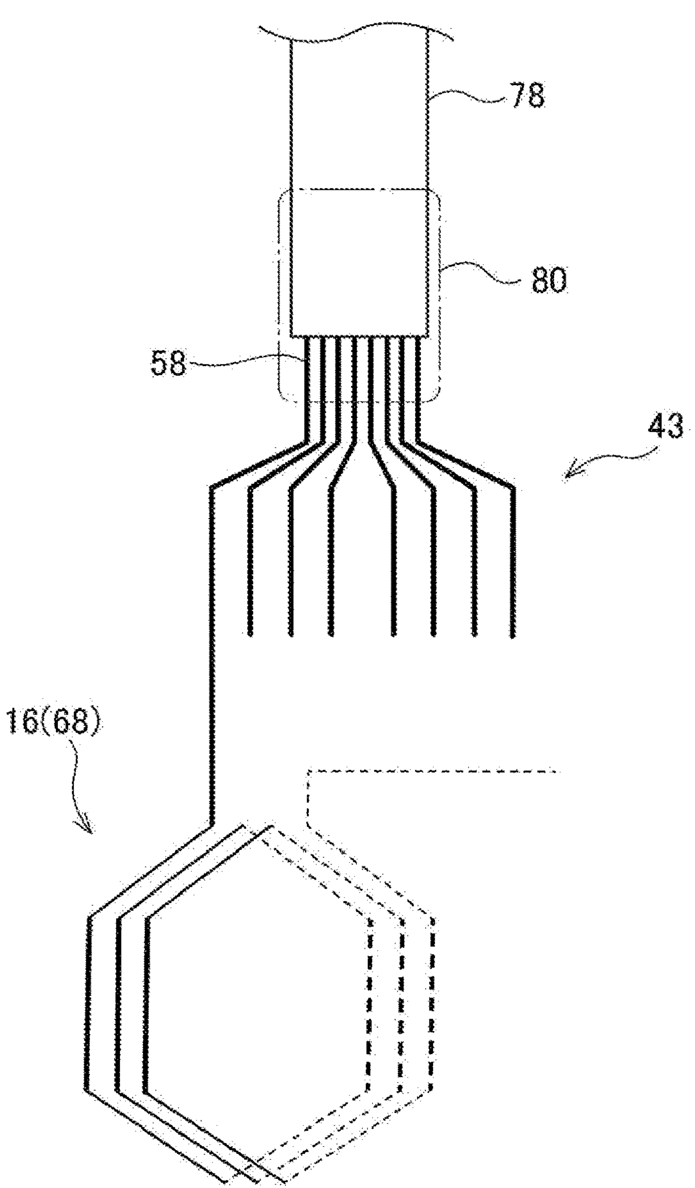
FIG. 50 is a diagram showing a connection member provided between coils and a second connection line.

As shown in FIGS. 49 and 50, the motor 68 is connected with the control circuit 70 via second connection lines 78. Each of the second connection lines 78 may be implemented, for example, by a lead wire formed of metal wires that are bundled together, or by a metal bar formed by blanking, bending or the like. Between each of the second connection lines 78 and the corresponding connection terminal part 58, there is provided a connection member 80. That is, the connected state between each of the second connection lines 78 and the corresponding connection terminal part 58 is maintained by the connection member 80 provided therebetween. Moreover, in the present embodiment, for each of the second connection lines 78, in at least a part of the second connection line 78 which is connected with the corresponding connection terminal part 58, the area of a cross section of the second connection line 78 perpendicular to the current direction is set to be greater than or equal to the area of a cross section of the corresponding connection terminal part 58 perpendicular to the current direction. Consequently, it becomes possible to suppress the output of the motor 68 from being lowered due to a voltage drop caused by the resistance of the second connection line 78.

In addition, the connection member 80 may be implemented, for example, by an annular member formed of an electroconductive material, or by a crimp contact. It is desirable that the connection member 80 also has a cross-sectional area greater than or equal to that of the corresponding connection terminal part 58. Moreover, the connection member 80 may be formed integrally with the second connection line 78. Furthermore, soldering or welding may be used instead of the connection member 80.

Twenty-Third Embodiment

Next, a motor according to the twenty-third embodiment will be described. It should be noted that: members and parts of the motor according to the twenty-third embodiment corresponding to those of the motor 10 according to the first embodiment are designated by the same reference signs as the corresponding members and parts of the motor 10 according to the first embodiment; and description of these parts and members will be omitted hereinafter.

Figure 51:
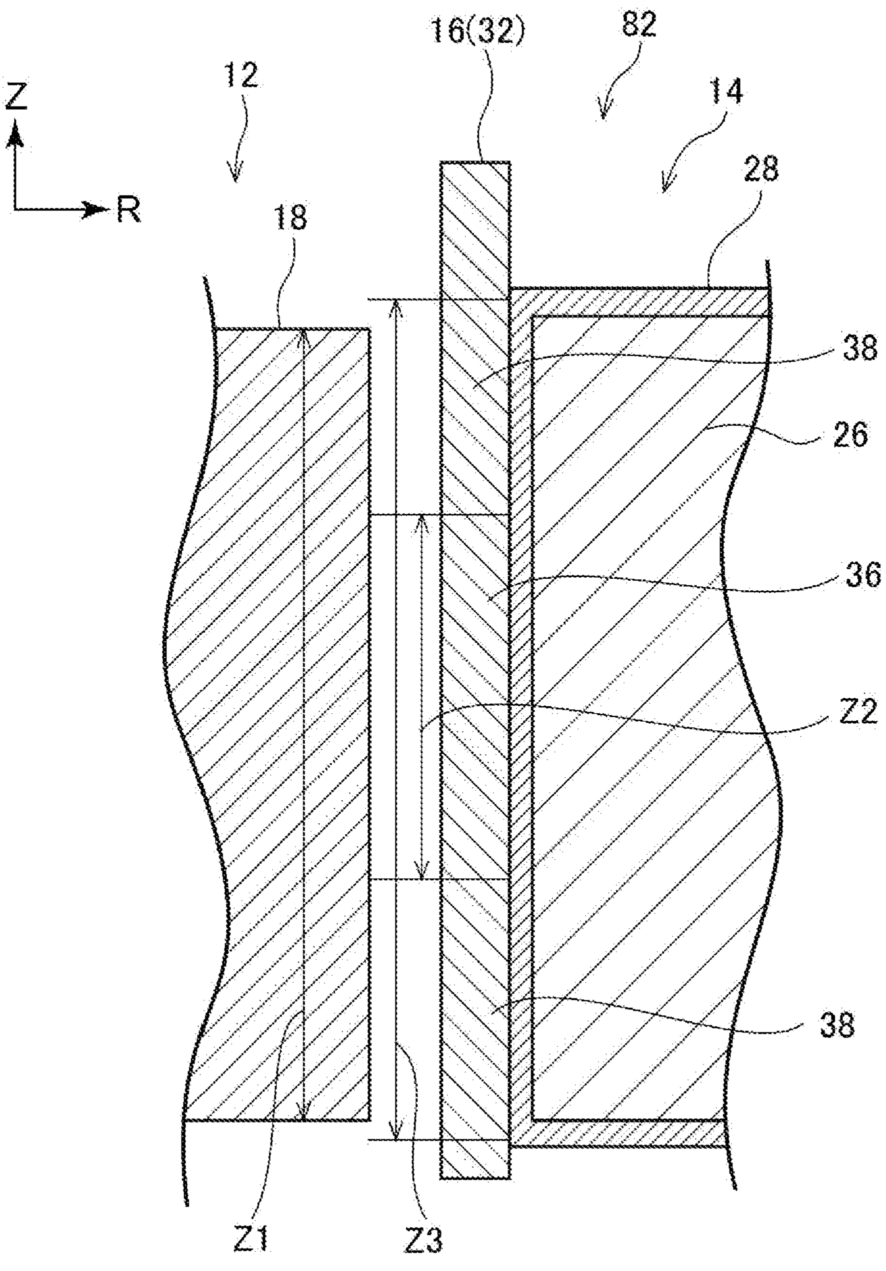
FIG. 51 is a cross-sectional view, taken along an axial direction, of a motor according to a twenty-third embodiment.

FIG. 51 shows a cross section, taken along the axial direction, of the motor 82 according to the twenty-third embodiment. It should be noted in FIG. 51, the illustration of the coil assembly 32 is simplified. In the motor 82 according to the twenty-third embodiment, the axial dimension Z1 of the magnets 18 of the rotor 12 is set to be greater than the axial dimension Z2 of the vertical portions 36 of the coils 16 and less than the axial dimension Z3 of the coils 16 including the first coil end portions 38, the vertical portions 36 and the second coil end portions 38. Consequently, the motor 82 according to the twenty-third embodiment can be advantageous in terms of high output and reduction in size and weight in comparison with a motor in which the axial dimension Z1 of the magnets 18 is set to be outside the above-described range.

In addition, the greater the axial dimension Z1 of the magnets 18 is set to be, the greater the amount of magnetic flux generated by the magnets 18. However, in the motor 82 according to the present embodiment, the opposing area between the magnets 18 and the coils 16 is reduced toward the ends of the coil end portions 38 on the opposite side to the vertical portions 36. The axial dimensions Z1, Z2 and Z3 may be set properly in consideration of the above fact and the balance with the cost and mass of the magnets 18.

It should be noted that the axial dimension of the stator core 26 may be set to be either equal to or different from the axial dimension Z1 of the magnets 18.

Twenty-Fourth Embodiment

Next, a motor according to the twenty-fourth embodiment will be described. It should be noted that: members and parts of the motor according to the twenty-fourth embodiment corresponding to those of the motor 10 according to the first embodiment are designated by the same reference signs as the corresponding members and parts of the motor 10 according to the first embodiment; and description of these parts and members will be omitted hereinafter.

Figure 52:
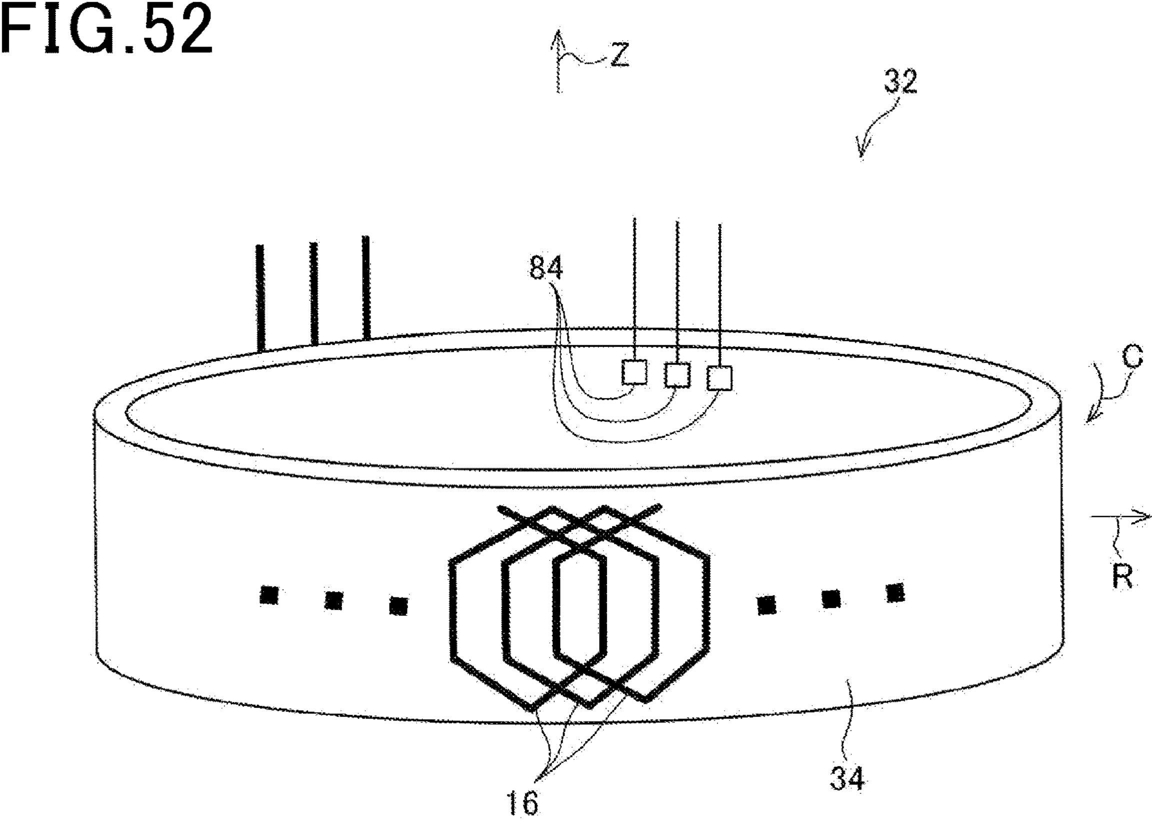
FIG. 52 is a perspective view of a coil assembly of a motor according to a twenty-fourth embodiment.

FIG. 52 shows a coil assembly 32 of the motor according to the twenty-fourth embodiment. As shown in FIG. 52, in the coil assembly 32, there are provided a plurality of sensors 84 for detecting rotation of the rotor 12. More particularly, in the present embodiment, there are three sensors 84 provided in the coil assembly 32. Each of the sensors 84 includes a sensor main body 84A formed in a rectangular block shape and a sensor wiring part 84B protruding from the sensor main body 84A.

Figure 53:
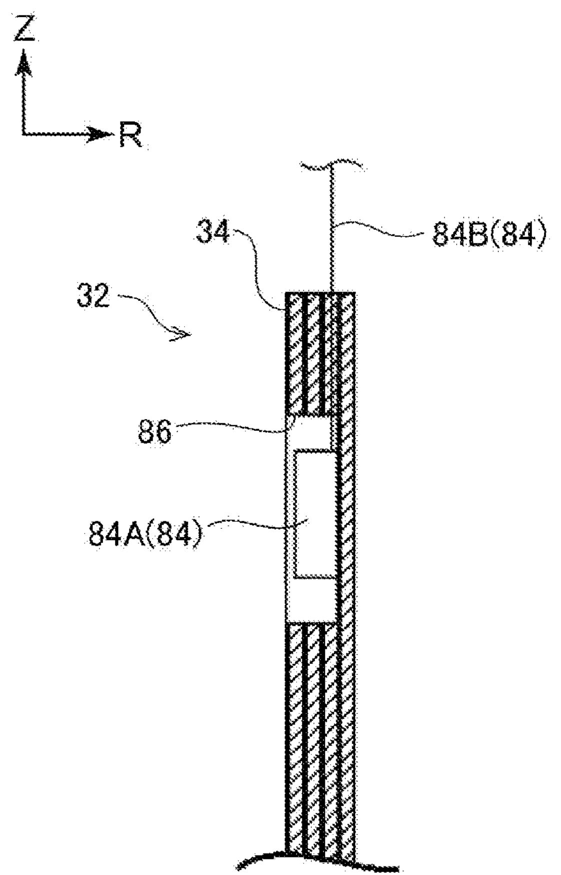
FIG. 53 is a cross-sectional view, taken along an axial direction, of a part of a coil assembly where a sensor is provided.
Figure 54:
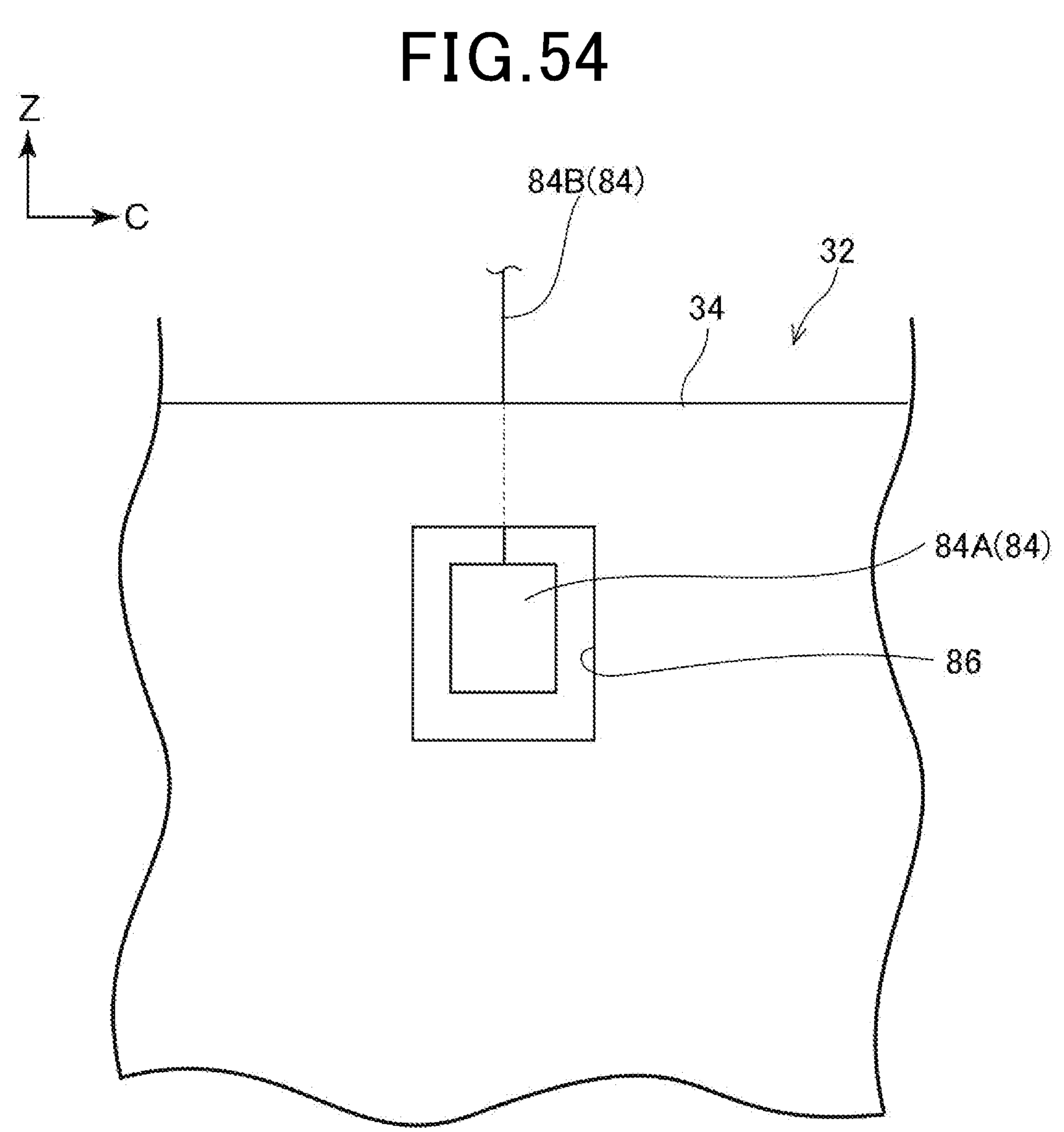
FIG. 54 is an enlarged view of the part of the coil assembly where the sensor is provided.

As shown in FIGS. 53 and 54, in the present embodiment, each of the sensors 84 is mounted to the radially inner surface of a portion of the band member 34 which constitutes the fourth lap. Moreover, in portions of the band member 34 which respectively constitute the first to the third laps, there is formed a sensor-receiving opening 86 in which the sensor main body 84A is arranged.

According to the present embodiment described above, the arrangement positions of the sensors 84 with respect to the coils 16 can be set accurately, thereby enabling reliable control of the motor. Moreover, since it is unnecessary to arrange the sensors 84 in a later stage, the assembly of the motor can be simplified. Furthermore, since it is unnecessary to provide extra sensor arrangement spaces in the motor, reduction in the overall size of the motor can be achieved.

It should be noted that the sensor wiring part 84B of each of the sensors 84 may be formed as a wiring pattern on the band member 34. It also should be noted that although there are provided in the motor the sensors 84 for detecting rotation of the rotor 12 in the present embodiment, other sensors may also be provided in the motor. For example, a temperature sensor for monitoring the temperature of the coils 16 and an acceleration sensor for detecting vibration may also be provided in the motor.

Twenty-Fifth to Twenty-Eighth Embodiments

Next, motors according to the twenty-fifth to the twenty-eighth embodiments will be described. It should be noted that: members and parts of the motors according to the twenty-fifth to the twenty-eighth embodiments corresponding to those of the motor 10 according to the first embodiment are designated by the same reference signs as the corresponding members and parts of the motor 10 according to the first embodiment; and description of these parts and members will be omitted hereinafter.

Figure 55:
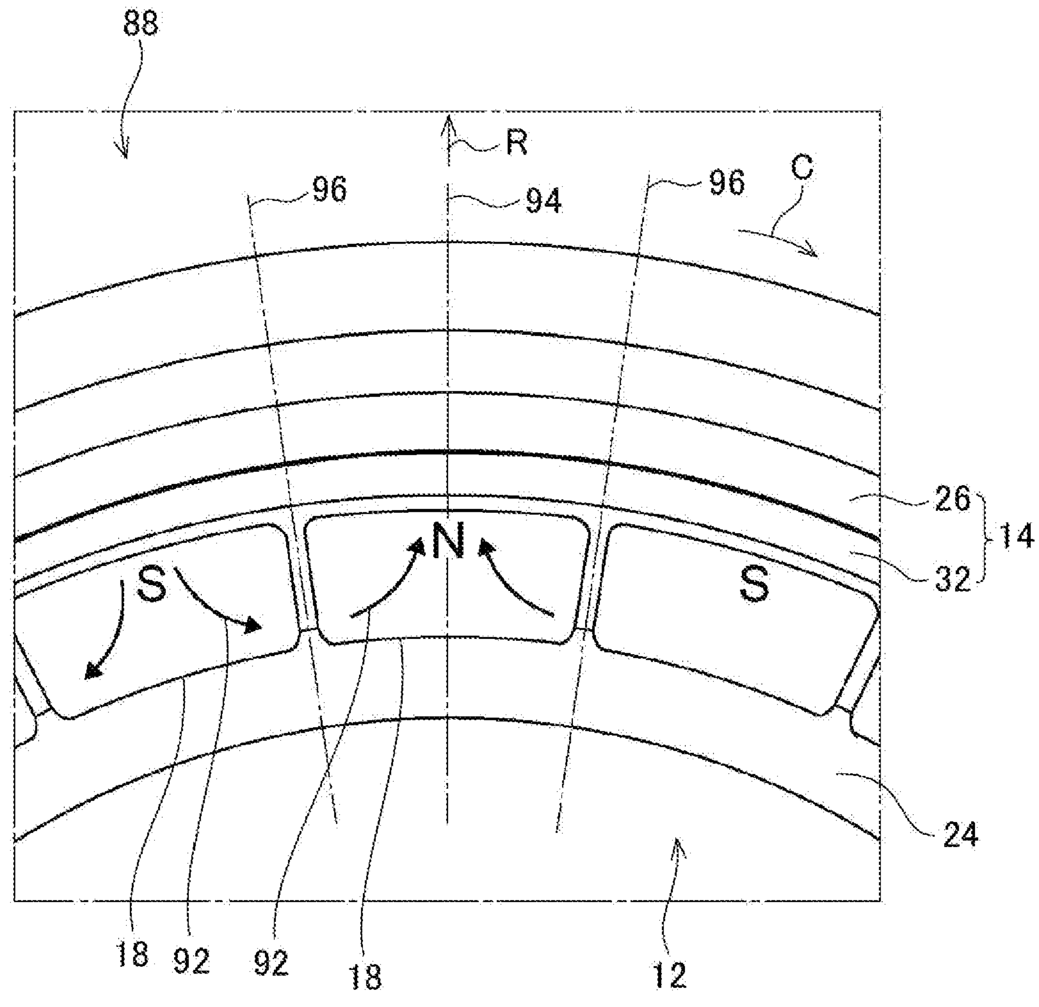
FIG. 55 is an enlarged view of part of a motor according to a twenty-fifth embodiment.
Figure 56:
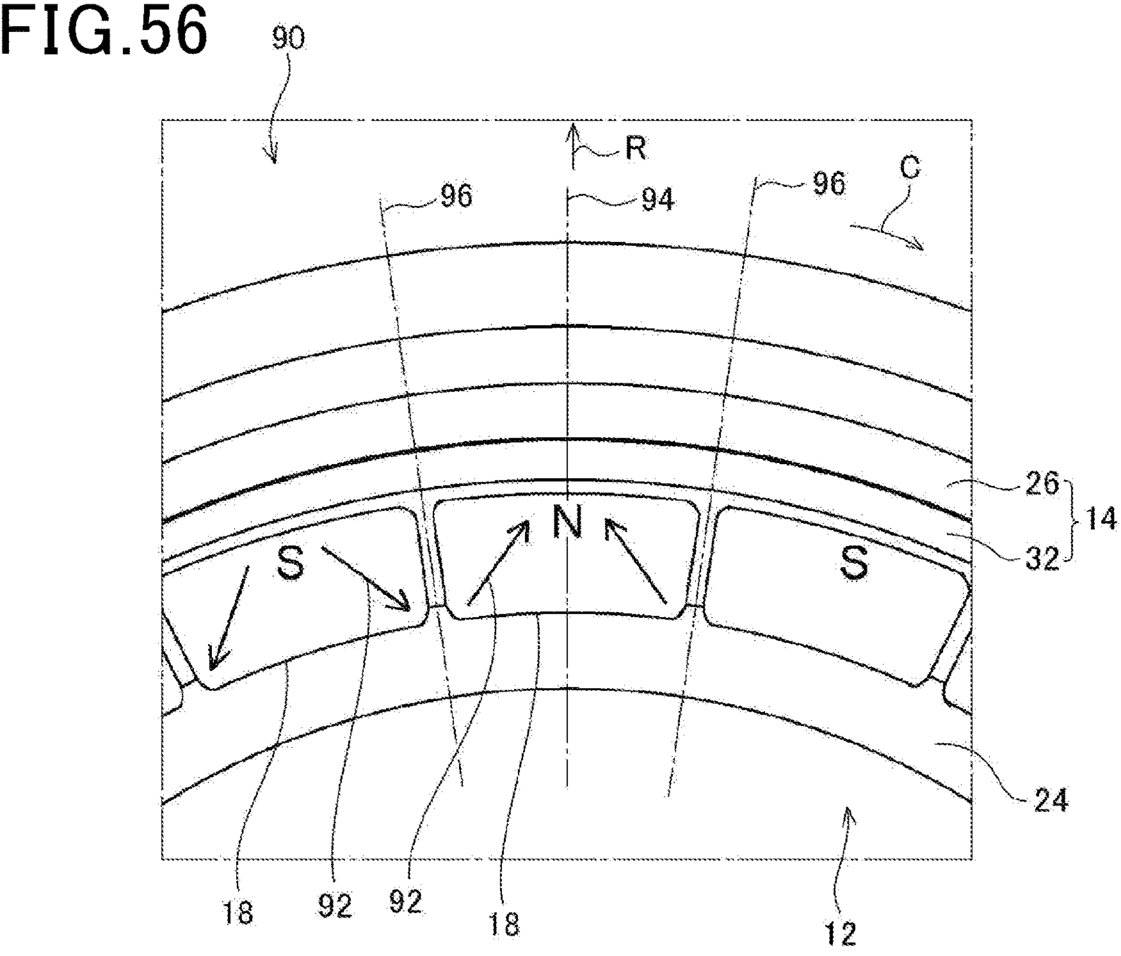
FIG. 56 is an enlarged view of part of a motor according to a twenty-sixth embodiment.

As shown in FIGS. 55 and 56, in the motor 88 according to the twenty-fifth embodiment and the motor 90 according to the twenty-sixth embodiment, when the magnets 18 are viewed in the axial direction, the angles between the directions of easy axes of magnetization 92 at the centers of magnetic poles formed by the magnets 18 and the radial direction (or the d-axis 94) are less than the angles between the directions of easy axes of magnetization 92 at the boundaries between the magnetic poles and the radial direction (or the q-axis 94), or the easy axes of magnetization 92 are inclined so as to concentrate on the d-axis 94 on the radial side where the surfaces of the magnets 18 face the coils 16. Consequently, it becomes possible to increase the magnetic flux density in an air gap between the rotor 12 and the stator 14. As a result, it becomes possible to reduce the sizes of the motors 88 and 90, increase the outputs of the motors 88 and 90 and reduce the volume of the magnets 18.

Figure 57:
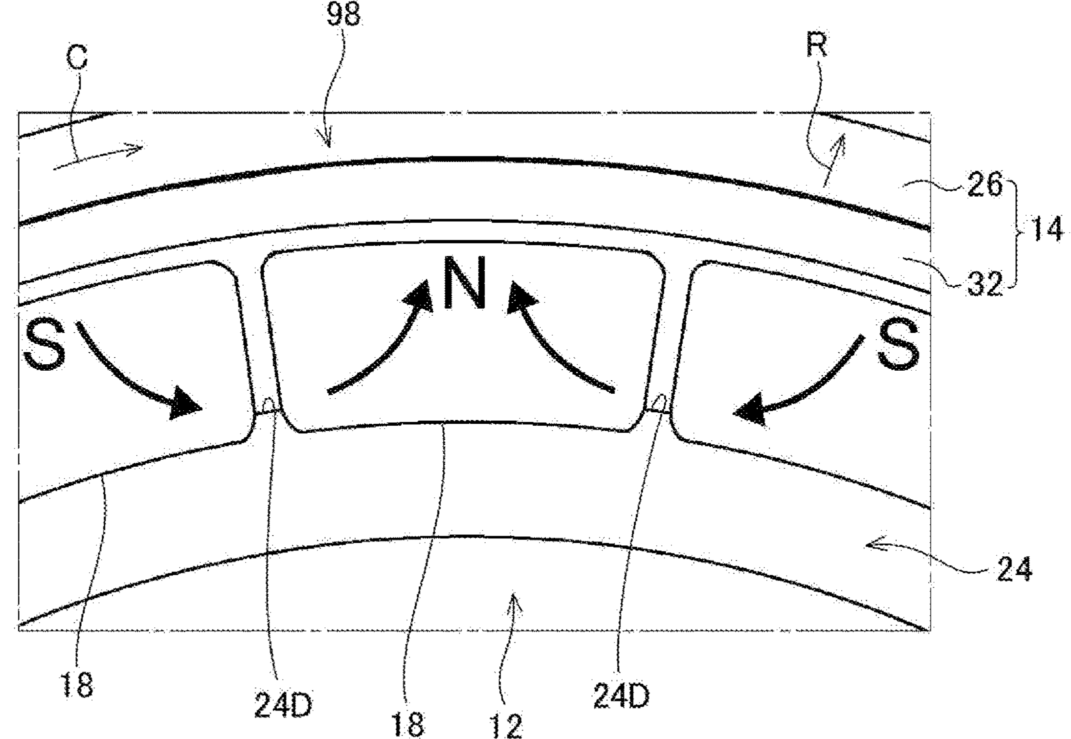
FIG. 57 is an enlarged view of part of a motor according to a twenty-seventh embodiment.

As shown in FIG. 57, in the motor 98 according to the twenty-seventh embodiment, for each circumferentially-adjacent pair of the magnets 18, a part of one of the pair of the magnets 18 on the coil assembly 32 side and a part of the other of the pair of the magnets 18 on the coil assembly 32 side are spaced apart in the circumferential direction. Moreover, an intervening part 24D, which is formed of a magnetic material, intervenes between a part of one of the pair of the magnets 18 on the opposite side to the coil assembly 32 and a part of the other of the pair of the magnets 18 on the opposite side to the coil assembly 32. The intervening part 24D may be formed, for example, integrally with the rotor core 24 into one piece.

Figure 58:
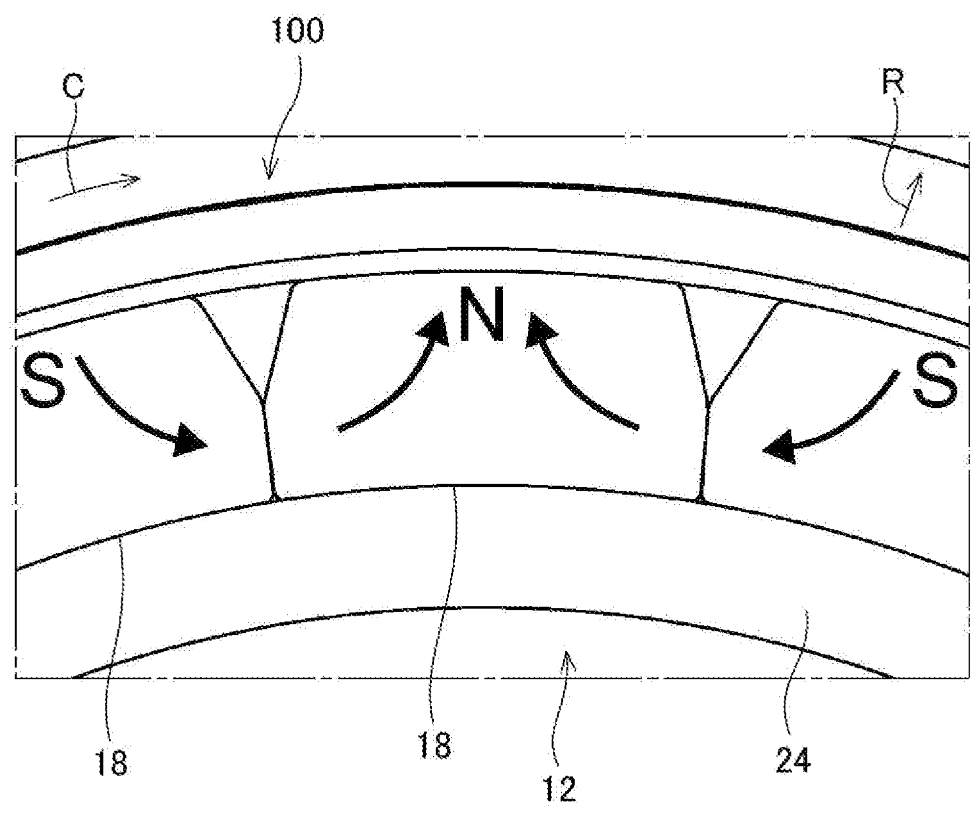
FIG. 58 is an enlarged view of part of a motor according to a twenty-eighth embodiment.

As shown in FIG. 58, in the motor 100 according to the twenty-eighth embodiment, for each circumferentially-adjacent pair of the magnets 18, a part of one of the pair of the magnets 18 on the coil assembly 32 side and a part of the other of the pair of the magnets 18 on the coil assembly 32 side are spaced apart in the circumferential direction. On the other hand, a part of one of the pair of the magnets 18 on the opposite side to the coil assembly 32 and a part of the other of the pair of the magnets 18 on the opposite side to the coil assembly 32 are in contact with or slightly spaced apart from each other in the circumferential direction.

With the above configurations of the motors 98 and 100 according to the twenty-seventh and twenty-eighth embodiments, it is possible to increase the magnetic flux density while reducing the magnetic reluctance between each circumferentially-adjacent pair of the magnets 18.

Twenty-Ninth Embodiment

Next, a motor according to the twenty-ninth embodiment will be described. It should be noted that: members and parts of the motor according to the twenty-ninth embodiment corresponding to those of the motor 10 according to the first embodiment are designated by the same reference signs as the corresponding members and parts of the motor 10 according to the first embodiment; and description of these parts and members will be omitted hereinafter.

Figure 59:
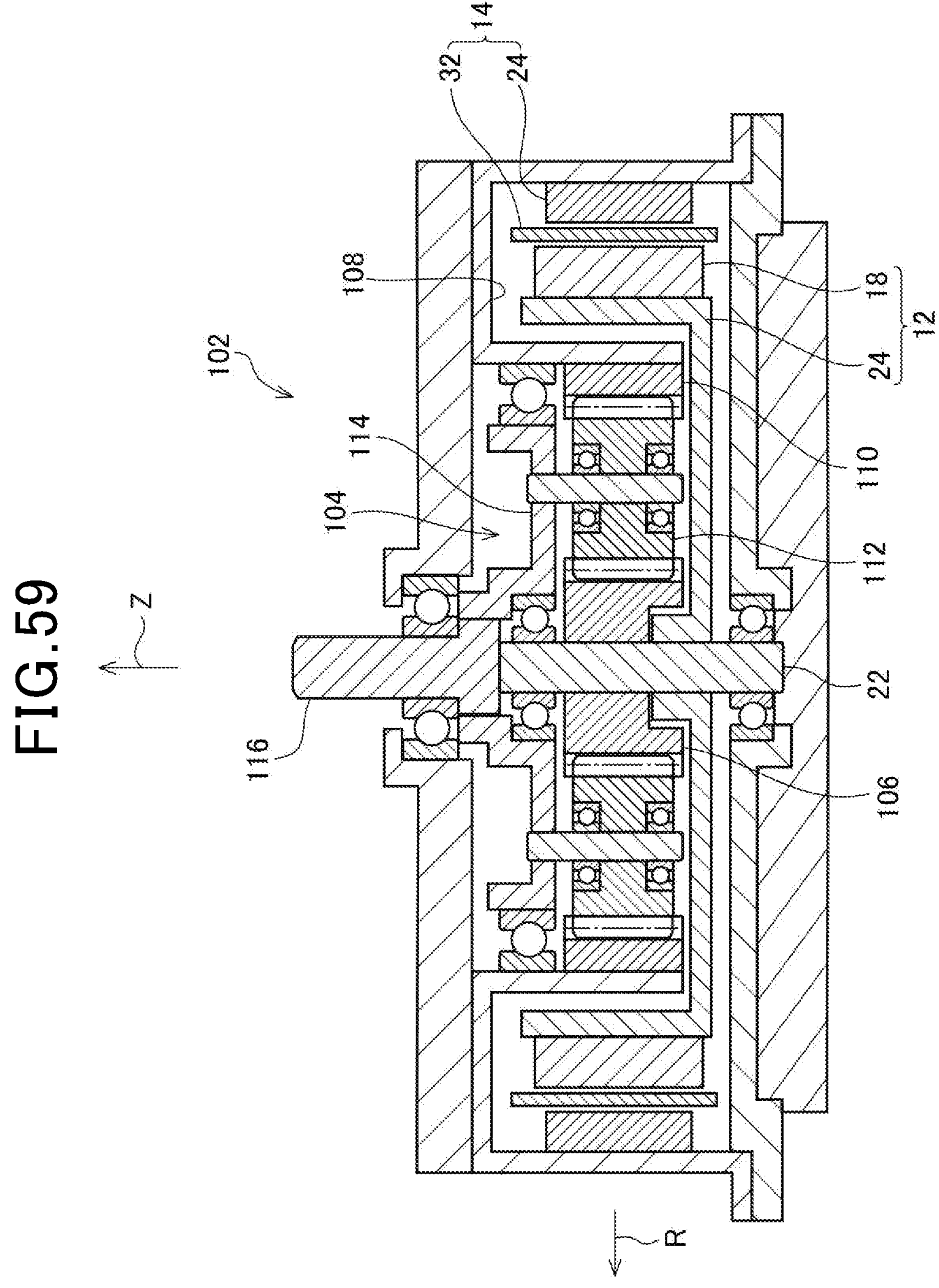
FIG. 59 is a cross-sectional view, taken along an axial direction, of a motor according to a twenty-ninth embodiment.

As shown in FIG. 59, the motor 102 according to the twenty-ninth embodiment is a speed reducer-equipped motor which includes a speed reducer 104. Most of the speed reducer 104 is arranged inside the rotor core 24. The speed reducer 104 includes an inner gear 106 fixed to the rotating shaft 22, and an outer gear 110 arranged radially outside the inner gear 106 and fixed to a housing 108 that supports the stator 14. Moreover, the speed reducer 104 further includes planet gears 112 that are arranged between the inner gear 106 and the outer gear 110 to mesh with the inner gear 106 and the outer gear 110, a carrier 114 that supports the planet gears 112, and an output shaft 116 that is fixed to the carrier 114. With this configuration, the motor 102 can transmit the rotation of the rotor 12 to the output shaft 116 through speed reduction by the speed reducer 104; and reduction in the size of the motor 102 in the axial direction can be achieved.

Thirtieth Embodiment

Next, a motor according to the thirtieth embodiment will be described. It should be noted that: members and parts of the motor according to the thirtieth embodiment corresponding to those of the motor 10 according to the first embodiment are designated by the same reference signs as the corresponding members and parts of the motor 10 according to the first embodiment; and description of these parts and members will be omitted hereinafter.

Figure 60:
FIG. 60 is a schematic cross-sectional view of an insulator of a motor according to a thirtieth embodiment.
Figure 60:
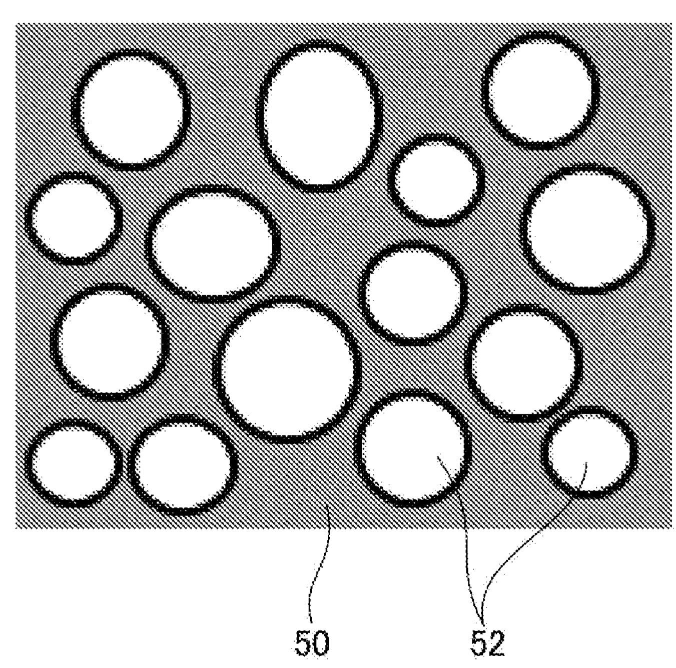

FIG. 60 is an enlarged cross-sectional view schematically showing a cross section of an insulator 28 that constitutes a part of the motor according to the thirtieth embodiment. As shown in FIG. 60, the insulator 28 includes a substrate 50 formed of an electrically-insulative material and soft-magnetic portions 52 formed of a soft-magnetic material in the substrate 50. It should be noted that in the present embodiment, the entire insulator 28 is configured to have the soft-magnetic portions 52 included in the substrate 50. As an example, the substrate 50 may be formed of a resin material. On the other hand, the soft-magnetic portions 52 may be formed of atomized powder of a soft-magnetic metal such as iron. With the above configuration, magnetic flux generated by the magnets 18 can be introduced to the stator core 26 via the soft-magnetic portions 52 of the insulator 28, thereby reducing the magnetic reluctance between the magnets 18 and the stator core 26. As a result, it becomes possible to effectively use the magnetic flux generated by the magnets 18, thereby achieving improvement in the torque of the motor and reduction in the size of the motor.

Thirty-First Embodiment

Next, a motor according to the thirty-first embodiment will be described. It should be noted that: members and parts of the motor according to the thirty-first embodiment corresponding to those of the motor 10 according to the first embodiment are designated by the same reference signs as the corresponding members and parts of the motor 10 according to the first embodiment; and description of these parts and members will be omitted hereinafter.

Figure 61:
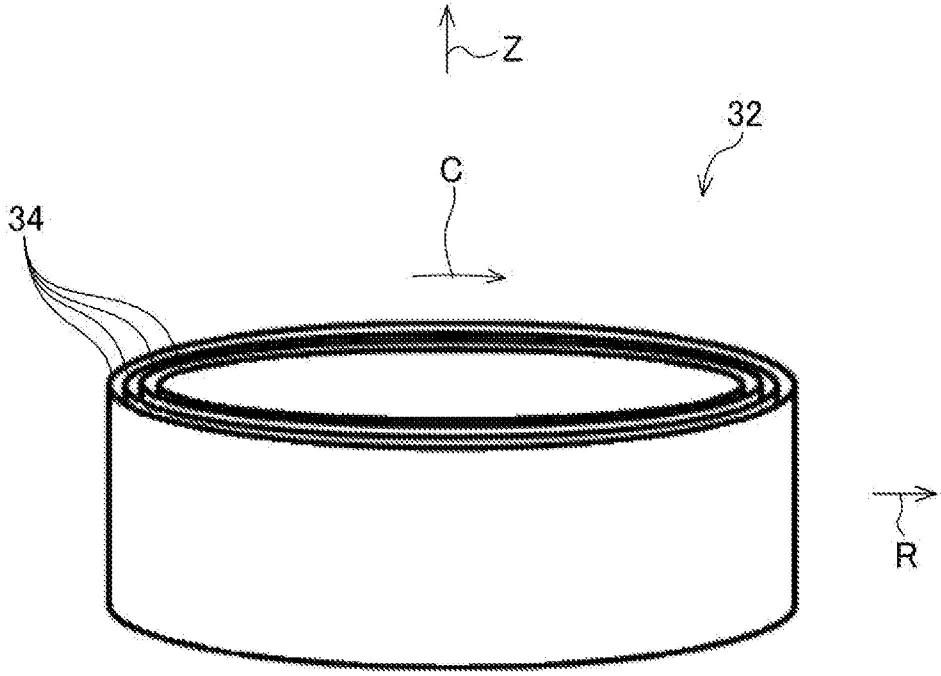
FIG. 61 is a perspective view of a coil assembly of a motor according to a thirty-first embodiment.
Figure 62:
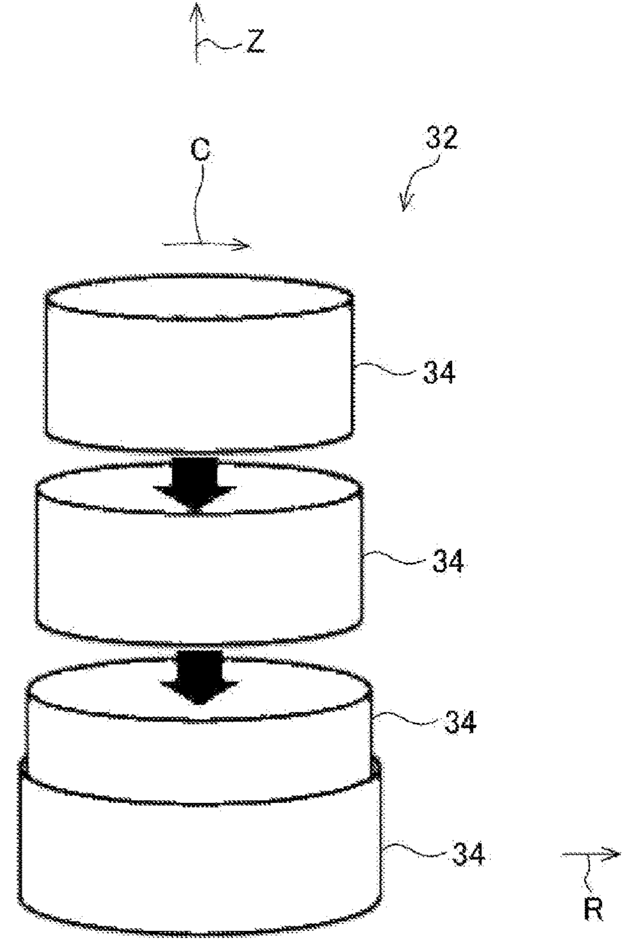
FIG. 62 is a schematic diagram illustrating a process of assembling a plurality of band members together.

FIGS. 61 and 62 schematically show a coil assembly 32 that constitutes a part of the motor according to the thirty-first embodiment. As shown in FIGS. 61 and 62, the coil assembly 32 is composed of a plurality of band members 34 rolled in an annular shape. More particularly, in the present embodiment, the coil assembly 32 is composed of four band members 34. Moreover, the four band members 34 have different inner and outer diameters from each other. By repeating the process of placing one of the band members 34 radially inside another one of the band members 34, the coil assembly 32 is formed which has four layers in the radial direction. As above, the coil assembly 32 can also be formed of a plurality of annularly-rolled band members 34.

Thirty-Second to Thirty-Fourth Embodiments

Next, motors according to the thirty-second to the thirty-fourth embodiments will be described. It should be noted that: members and parts of the motors according to the thirty-second to the thirty-fourth embodiments corresponding to those of the motor 10 according to the first embodiment are designated by the same reference signs as the corresponding members and parts of the motor 10 according to the first embodiment; and description of these parts and members will be omitted hereinafter.

Figure 63:
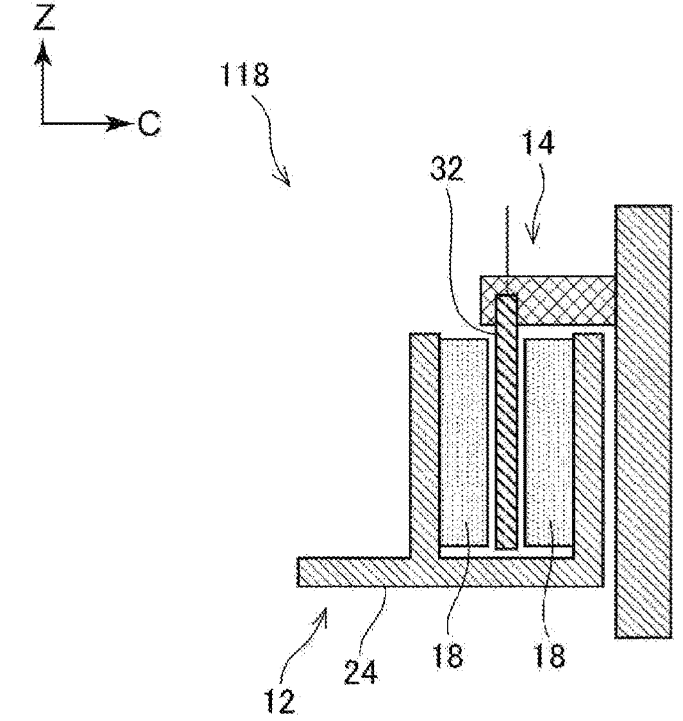
FIG. 63 is a cross-sectional view, taken along an axial direction, of a motor according to a thirty-second embodiment.

As shown in FIG. 63, the stator 14 of the motor 118 according to the thirty-second embodiment has a coreless structure including no stator core 26. Moreover, the rotor 12 of the motor 118 according to the thirty-second embodiment has inner magnets 18 arranged radially inside the coil assembly 32 and outer magnets 18 arranged radially outside the coil assembly 32.

Figure 64:
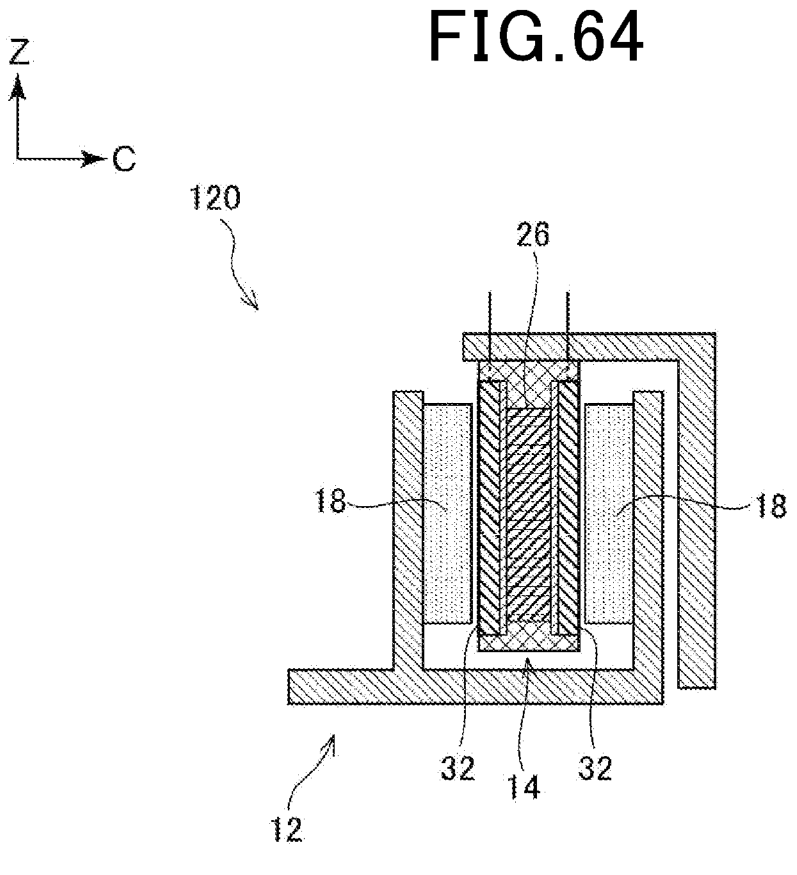
FIG. 64 is a cross-sectional view, taken along an axial direction, of a motor according to a thirty-third embodiment.

As shown in FIG. 64, the stator 14 of the motor 120 according to the thirty-third embodiment has an inner coil assembly 32 arranged radially inside the stator core 26 and an outer coil assembly 32 arranged radially outside the stator core 26. Moreover, the rotor 12 of the motor 120 according to the thirty-third embodiment has inner magnets 18 arranged radially inside the inner coil assembly 32 and outer magnets 18 arranged radially outside the outer coil assembly 32.

Figure 65:
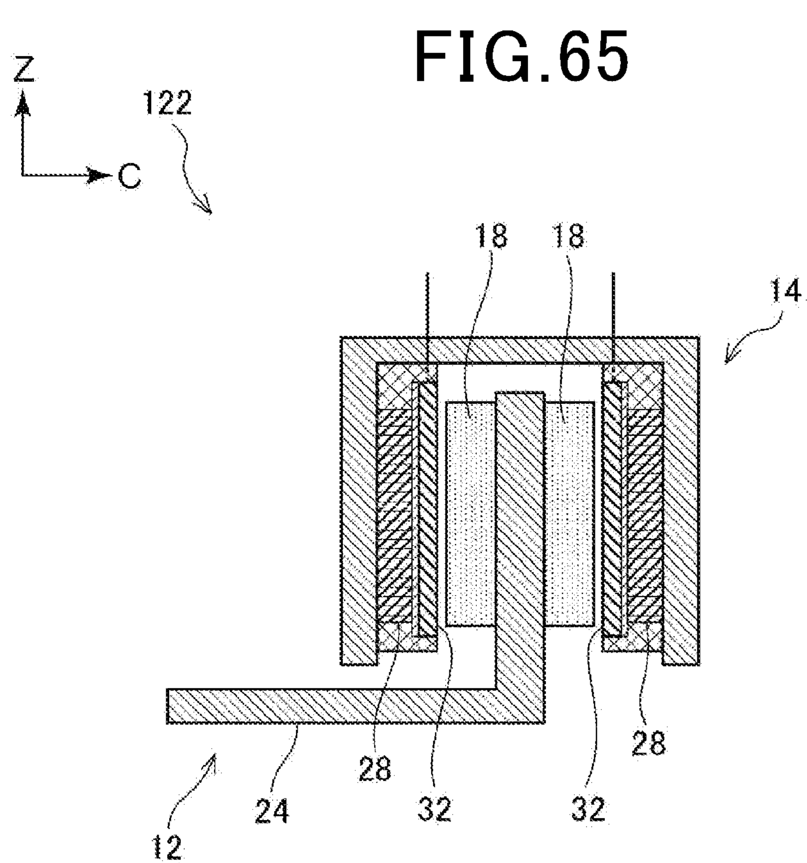
FIG. 65 is a cross-sectional view, along an axial direction, of a motor according to a thirty-fourth embodiment taken.

As shown in FIG. 65, the rotor 12 of the motor 122 according to the thirty-fourth embodiment has inner magnets 18 fixed to the inner circumferential surface of the second cylindrical part 24B of the rotor core 24 and outer magnets 18 fixed to the outer circumferential surface of the second cylindrical part 24B of the rotor core 24. Moreover, the stator 14 of the motor 122 according to the thirty-fourth embodiment has an inner stator core 26 and an inner coil assembly 32 arranged radially inside the inner magnets 18 and an outer stator core 26 and an outer coil assembly 32 arranged radially outside the outer magnets 18.

As in the motors 118, 120 and 122 according to the thirty-second to the thirty-fourth embodiments described above, the number and arrangement of coil assemblies 32 of the stator 14, the arrangement of magnets 18 of the rotor 12, the number of stator cores 26 of the stator 14 and the like may be set properly in consideration of the output characteristics and size required of the motor.

While the above embodiments of the present disclosure have been described, it will be understood by those skilled in the art that the present disclosure is not limited to the above embodiments, but may be carried out through various modifications without departing from the spirit of the present disclosure. Moreover, all or some of the configurations of the motors according the above embodiments may be combined with each other.

For example, a cylindrical coil assembly may be formed by splicing a plurality of band member segments 34 while rolling them multiple times. Moreover, the coils 16 may be star-connected on one lap of the rolled band member 34 and delta-connected on another lap of the rolled band member 34. Furthermore, the number of poles, the number of coils, the number of phases, the number of coils connected in series with each other, the number of coils connected in parallel with each other, and the like of the motor 10 may be set properly according to the application of the motor 10. Moreover, the configuration of the motor 10 can also be applied to an electric generator. Furthermore, the configuration of the motor 10 can also be applied to an outer rotor type brushless motor in which a rotor 12 is arranged radially outside a stator 14. Moreover, the configuration of the coil assembly 32 according to the present disclosure can also be applied to a rotor that includes a coil assembly 32.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A coil assembly comprising:

a band member formed of an electrically-insulative material into a band shape and rolled along a circumferential direction into an annular shape, the band member having a plurality of layers in a radial direction;

a plurality of coils formed of an electroconductive material on the band member and having vertical portions, the coils being located at predetermined positions in the circumferential direction and the radial direction on the band member and connected in a predetermined connection pattern; and a plurality of vertical-portion laminates constituted of the vertical portions of the coils which are radially laminated in a cross section of the band member and the coils taken along the radial direction, each of the vertical-portion laminates being configured so that each radially-adjacent pair of the vertical portions constituting the vertical-portion laminate have different electric potentials when the coils are energized, wherein:

the plurality of coils include a plurality of coils of a designated phase;

the coils of the designated phase are arranged in alignment with one another in the circumferential direction;

the plurality of vertical-portion laminates include a plurality of vertical-portion laminates of the designated phase;

each of the vertical-portion laminates of the designated phase is constituted of the vertical portions of the coils of the designated phase which are formed respectively on the plurality of layers of the band member and radially laminated together;

a first configuration or a second configuration is employed for the coils of the designated phase;

in the first configuration, every predetermined number of the coils of the designated phase are connected in series with each other, and the electric potential difference between each radially-adjacent pair of the vertical portions in each of the vertical-portion laminates of the designated phase is greater than or equal to $1.5\times V/s$, where V is the electric potential difference between two ends of each serial connection of the coils of the designated phase, and s is the number of the coils of the designated phase included in each serial connection; and in the second configuration, none of the coils of the designated phase are connected in series with the other coils of the designated phase, and the electric potential difference between each radially-adjacent pair of the vertical portions in each of the vertical-portion laminates of the designated phase is greater than or equal to $V/2$.

2. The coil assembly as set forth in claim 1, wherein:

the vertical-portion laminates of the designated phase constitute a conductor group of the designated phase; and a circumferential dimension of the conductor group is set to be greater than a radial dimension of each of the vertical-portion laminates constituting the conductor group.

3. The coil assembly as set forth in claim 1, wherein:

for each of the plurality of vertical-portion laminates, a radial dimension of the vertical-portion laminate is set to be greater than a circumferential dimension of the vertical-portion laminate.

4. The coil assembly as set forth in claim 1, wherein:

for each of the vertical portions of the plurality of coils, a circumferential dimension of the vertical portion is set to be greater than a radial dimension of the vertical portion.

5. The coil assembly as set forth in claim 1, wherein:

all the coils of the designated phase are physically wound in one direction; and the coils of the designated phase are connected so that when they are energized, they function identically to coils of the designated phase wound in a first direction and coils of the designated phase wound in a second direction which are arranged alternately in the circumferential direction, the second direction being opposite to the first direction.

6. The coil assembly as set forth in claim 1, wherein:

in a state of the band member having been rolled along the circumferential direction a plurality of times, a plurality of connection portions of the designated phase, which are connected with the coils of the designated phase, extend from an annularly-rolled part of the band member to one side in an axial direction; and the connection portions of the designated phase are arranged in radial alignment with each other and bundled together.

7. The coil assembly as set forth in claim 1, wherein:

in a state of the band member having been rolled along the circumferential direction a plurality of times, a plurality of connection portions of the designated phase, which are connected with the coils of the designated phase, extend from an annularly-rolled part of the band member to one side in an axial direction;

the connection portions of the designated phase are arranged in radial alignment with each other and bent to one side in the radial direction; and lengths of the connection portions of the designated phase gradually decrease toward the one side in the radial direction.

8. The coil assembly as set forth in claim 1, wherein:

circumferential dimensions of the vertical portions constituting the plurality of vertical-portion laminates gradually increase toward an outer side in the radial direction.

9. The coil assembly as set forth in claim 1, wherein:

at least a portion of each of the plurality of coils is divided by a slit.

10. The coil assembly as set forth in claim 1, wherein:

a portion of one of the coils of the designated phase and a portion of another one of the coils of the designated phase constitute a pair of equipotential portions; and the pair of equipotential portions are connected with each other via a voltage-equalizing connection portion.

11. The coil assembly as set forth in claim 1, wherein:

a sensor is mounted to the band member.

12. An armature comprising the coil assembly as set forth in claim 1.

13. A rotating electric machine comprising:

a stator; and a rotor, wherein:

one of the stator and the rotor includes the armature as set forth in claim 12, and the other of the stator and the rotor has magnets arranged to radially face the coil assembly.

14. The rotating electric machine as set forth in claim 13, wherein:

the plurality of coils have first coil end portions on a first side of the vertical portions in the axial direction and second coil end portions on a second side of the vertical portions in the axial direction; and an axial dimension of the magnets is set to be greater than an axial dimension of the vertical portions and less than an axial dimension of the plurality of coils including the first coil end portions, the vertical portions and the second coil end portions.

15. A coil assembly comprising:

a band member formed of an electrically-insulative material into a band shape and rolled along a circumferential direction into an annular shape, the band member having a plurality of layers in a radial direction;

a plurality of coils formed of an electroconductive material on the band member and having vertical portions, the coils being located at predetermined positions in the circumferential direction and the radial direction on the band member and connected in a predetermined connection pattern; and a plurality of vertical-portion laminates constituted of the vertical portions of the coils which are radially laminated in a cross section of the band member and the coils taken along the radial direction, each of the vertical-portion laminates being configured so that each radially-adjacent pair of the vertical portions constituting the vertical-portion laminate have different electric potentials when the coils are energized, wherein:

the plurality of coils include a plurality of coils of a designated phase;

in a state of the band member having been rolled along the circumferential direction a plurality of times, a plurality of connection portions of the designated phase, which are connected with the coils of the designated phase, extend from an annularly-rolled part of the band member to one side in an axial direction;

the connection portions of the designated phase are arranged in radial alignment with each other and bent to one side in the radial direction; and lengths of the connection portions of the designated phase gradually decrease toward the one side in the radial direction.

16. The coil assembly as set forth in claim 15, wherein:

circumferential dimensions of the vertical portions constituting the plurality of vertical-portion laminates gradually increase toward an outer side in the radial direction.

17. The coil assembly as set forth in claim 15, wherein:

at least a portion of each of the plurality of coils is divided by a slit.

18. The coil assembly as set forth in claim 15, wherein:

a portion of one of the coils of the designated phase and a portion of another one of the coils of the designated phase constitute a pair of equipotential portions; and the pair of equipotential portions are connected with each other via a voltage-equalizing connection portion.

19. The coil assembly as set forth in claim 15, wherein:

a sensor is mounted to the band member.

20. An armature comprising the coil assembly as set forth in claim 15.

21. A rotating electric machine comprising:

a stator; and a rotor, wherein:

one of the stator and the rotor includes the armature as set forth in claim 20, and the other of the stator and the rotor has magnets arranged to radially face the coil assembly.

22. The rotating electric machine as set forth in claim 21, wherein:

the plurality of coils have first coil end portions on a first side of the vertical portions in the axial direction and second coil end portions on a second side of the vertical portions in the axial direction; and an axial dimension of the magnets is set to be greater than an axial dimension of the vertical portions and less than an axial dimension of the plurality of coils including the first coil end portions, the vertical portions and the second coil end portions.

* * * * *